US011348195B2

(12) United States Patent
Lee et al.

(10) Patent No.: US 11,348,195 B2
(45) Date of Patent: May 31, 2022

(54) ANALYSIS OF INTELLECTUAL-PROPERTY DATA IN RELATION TO PRODUCTS AND SERVICES

(71) Applicant: AON RISK SERVICES, INC. OF MARYLAND, New York, NY (US)

(72) Inventors: Lewis C. Lee, Spokane, WA (US); Daniel Crouse, Seattle, WA (US); David Craig Andrews, Carnation, WA (US); Samuel Cameron Fleming, Spokane, WA (US)

(73) Assignee: AON RISK SERVICES, INC. OF MARYLAND, New York, NY (US)

( * ) Notice: Subject to any disclaimer, the term of this patent is extended or adjusted under 35 U.S.C. 154(b) by 0 days.

(21) Appl. No.: 16/503,144

(22) Filed: Jul. 3, 2019

(65) Prior Publication Data

US 2021/0004920 A1    Jan. 7, 2021

(51) Int. Cl.
*G10L 15/00*      (2013.01)
*G06Q 50/18*      (2012.01)
*G06N 20/00*      (2019.01)

(52) U.S. Cl.
CPC ........... *G06Q 50/184* (2013.01); *G06N 20/00* (2019.01)

(58) Field of Classification Search
CPC .. G06Q 50/184; G06Q 10/10; G06Q 10/0637; G06Q 50/18; G06F 40/30; G06F 16/93; G06F 2216/11; G06F 40/284; G06F 16/3344; G06F 16/345; G06F 16/35; G06F 40/137; G06F 40/194; G06F 40/253; G06F 40/205; G06F 40/289; G06F 16/24578;

(Continued)

(56) References Cited

U.S. PATENT DOCUMENTS 6,330,547 B1    12/2001 Martin
6,434,580 B1 *   8/2002 Takano ................. G06Q 10/10
                                                   715/255

(Continued)

OTHER PUBLICATIONS

Bouayad-Agha, N., Casamayor, G., Ferraro, G., Mille, S., Vidal, V., & Wanner, L. (Jun. 2009). Improving the comprehension of legal documentation: the case of patent claims. In Proceedings of the 12th International Conference on Artificial Intelligence and Law (pp. 78-87). ACM. (Year: 2009).*

(Continued)

*Primary Examiner* — Edgar X Guerra-Erazo

(74) *Attorney, Agent, or Firm* — Lee & Hayes, P.C.

(57) ABSTRACT

Techniques described herein are directed to analyzing intellectual-property data according to provide various intellectual property related services to organizations. In particular implementations, information related to products and/or services may be obtained from a number of data sources. Additionally, information related to intellectual-property assets, such as patents, trademarks, copyrights, trade secrets, and know-how, may be obtained. In various situations, the intellectual-property assets may be mapped to respective products and/or services. The mappings between the products and/or services and intellectual-property assets may be used to provide intellectual property related services that correspond to the intellectual-property assets, such as valuation services, strategy-related services, or risk-related services.

15 Claims, 14 Drawing Sheets

(58) Field of Classification Search
CPC ...... G06F 16/313; G06F 16/36; G06F 16/367; G06F 40/263; G06F 40/279; G06F 16/22; G06F 16/2228; G06F 16/31; G06F 16/41; G06F 16/9024; G06F 16/901; G06F 16/90; G06F 16/81; G06F 16/84; G06F 16/86; G06F 16/9027; G06F 16/906; G06F 16/909; G06F 16/908; G06F 16/907; G06F 40/00; G06F 40/10; G06F 40/103; G06F 40/106; G06F 40/149; G06F 40/14; G06F 40/146; G06F 40/151; G06F 40/154; G06F 40/157; G06F 40/16; G06F 40/20; G06F 40/211; G06F 40/216; G06F 40/237; G06F 40/242; G06F 40/247; G06F 40/274; G06F 40/268; G06F 40/295; G10L 15/00; G10L 15/01; G10L 15/02; G10L 2015/022; G10L 2015/025; G10L 15/06; G10L 15/063; G10L 2015/0631; G10L 2015/0633; G10L 2015/0635; G10L 2015/0636; G10L 2015/0638; G10L 15/065; G10L 15/07; G10L 15/075; G10L 15/083; G10L 2015/085; G10L 15/1807; G10L 15/18; G10L 15/1815; G10L 15/1822; G10L 15/183; G10L 15/187; G10L 15/19; G10L 15/193; G10L 15/20; G10L 15/22; G10L 2015/223; G10L 15/32; G10L 15/34
USPC ........ 705/310, 36 R, 7.31, 7.38; 707/17.014, 707/748, 17.108, 999.003, 999.005, 707/17.078, 17.089, 17.093, 754, 758, 707/797, 999.001, 17.015, 17.058, 707/17.062, 17.075, 17.084, 17.094, 707/17.097, 17.098, 17.099, 705, 737, 707/798, 802, 917, 924, 932; 706/46, 47

See application file for complete search history.

(56) References Cited

U.S. PATENT DOCUMENTS

| | | | |
|---|---|---|---|
| 7,634,435 | B2 | 12/2009 | Davidovitch et al. |
| 7,996,304 | B1 | 8/2011 | Thomas et al. |
| 8,041,739 | B2 * | 10/2011 | Glasgow ............... G06Q 10/10 707/791 |
| 8,355,932 | B2 | 1/2013 | Malackowski et al. |
| 8,423,444 | B1 | 4/2013 | Mackrell et al. |
| 8,671,043 | B2 | 3/2014 | Nishimaki |
| 8,788,390 | B2 | 7/2014 | Jhunjhunwala |
| 9,195,647 | B1 * | 11/2015 | Zhang ................... G06F 40/30 |
| 9,836,805 | B2 * | 12/2017 | Rau ..................... G06F 16/3338 |
| 2001/0049707 | A1 * | 12/2001 | Tran ..................... G06Q 50/184 715/256 |
| 2002/0004775 | A1 | 1/2002 | Kossovsky et al. |
| 2004/0143525 | A1 | 7/2004 | Nishimaki |
| 2004/0220842 | A1 | 11/2004 | Barney |
| 2005/0060140 | A1 * | 3/2005 | Maddox .................. G06F 40/30 704/4 |
| 2005/0071265 | A1 | 3/2005 | Nishimaki |
| 2005/0144177 | A1 * | 6/2005 | Hodes ................... G06F 40/237 |
| 2005/0261891 | A1 * | 11/2005 | Chan ..................... G06F 40/103 704/9 |
| 2006/0080136 | A1 | 4/2006 | Frank et al. |
| 2006/0190807 | A1 * | 8/2006 | Tran ..................... G06F 40/166 705/310 |
| 2007/0174039 | A1 * | 7/2007 | Lin ....................... G06F 40/205 704/1 |
| 2008/0033736 | A1 | 2/2008 | Bulman |
| 2008/0077448 | A1 | 3/2008 | Diamond |
| 2008/0154848 | A1 * | 6/2008 | Haslam ................. G06F 16/382 |
| 2008/0281860 | A1 * | 11/2008 | Elias ...................... H04W 4/02 |
| 2010/0114664 | A1 | 5/2010 | Jobin |
| 2010/0241462 | A1 | 9/2010 | Woodward |
| 2011/0289016 | A1 | 11/2011 | Fletcher |
| 2012/0109642 | A1 * | 5/2012 | Stobbs .................. G06F 40/30 704/9 |
| 2012/0174017 | A1 | 7/2012 | Tidwell et al. |
| 2014/0108273 | A1 | 4/2014 | Lundberg et al. |
| 2014/0136393 | A1 | 5/2014 | Nishimaki |
| 2014/0249801 | A1 * | 9/2014 | Jackson ................ G06F 40/40 704/9 |
| 2014/0297563 | A1 | 10/2014 | Jhunjhunwala |
| 2014/0365386 | A1 | 12/2014 | Carstens et al. |
| 2015/0026098 | A1 | 1/2015 | Ramos et al. |
| 2015/0348199 | A1 | 12/2015 | Ramos et al. |
| 2016/0232246 | A1 * | 8/2016 | Rau ..................... G06F 16/3338 |
| 2016/0350886 | A1 * | 12/2016 | Jessen ................... G06Q 10/10 |
| 2017/0075877 | A1 * | 3/2017 | Lepeltier ............... G06F 40/205 |
| 2021/0004918 | A1 | 1/2021 | Lee et al. |
| 2021/0004919 | A1 | 1/2021 | Lee et al. |
| 2021/0004921 | A1 | 1/2021 | Lee et al. |
| 2021/0004922 | A1 | 1/2021 | Lee et al. |

OTHER PUBLICATIONS

Office Action for U.S. Appl. No. 16/503,187, dated Feb. 19, 2021, Lee, "Analysis of Intellectual-Property Data in Relation to Products and Services", 8 pages.

PCT Search Report and Written Opinion dated Oct. 9, 2020 for PCT Application No. PCT/US20/40357, 10 pages.

Laurence, "The right way to build your SMSF's assets", The Australian, Canberra, A.C.T. ProQuest Document ID:897028258, 2011, 9 pgs.

* cited by examiner

ANALYSIS OF INTELLECTUAL-PROPERTY DATA IN RELATION TO PRODUCTS AND SERVICES

BACKGROUND

Intellectual property is obtained by organizations to help protect innovation within the organizations. Typically, information related to intellectual property of an organization can be difficult to effectively and efficiently analyze. For example, understanding the value of the intellectual property or understanding how intellectual property relates to products or services in the marketplace can be difficult to achieve in an accurate and efficient manner using computer-implemented techniques.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
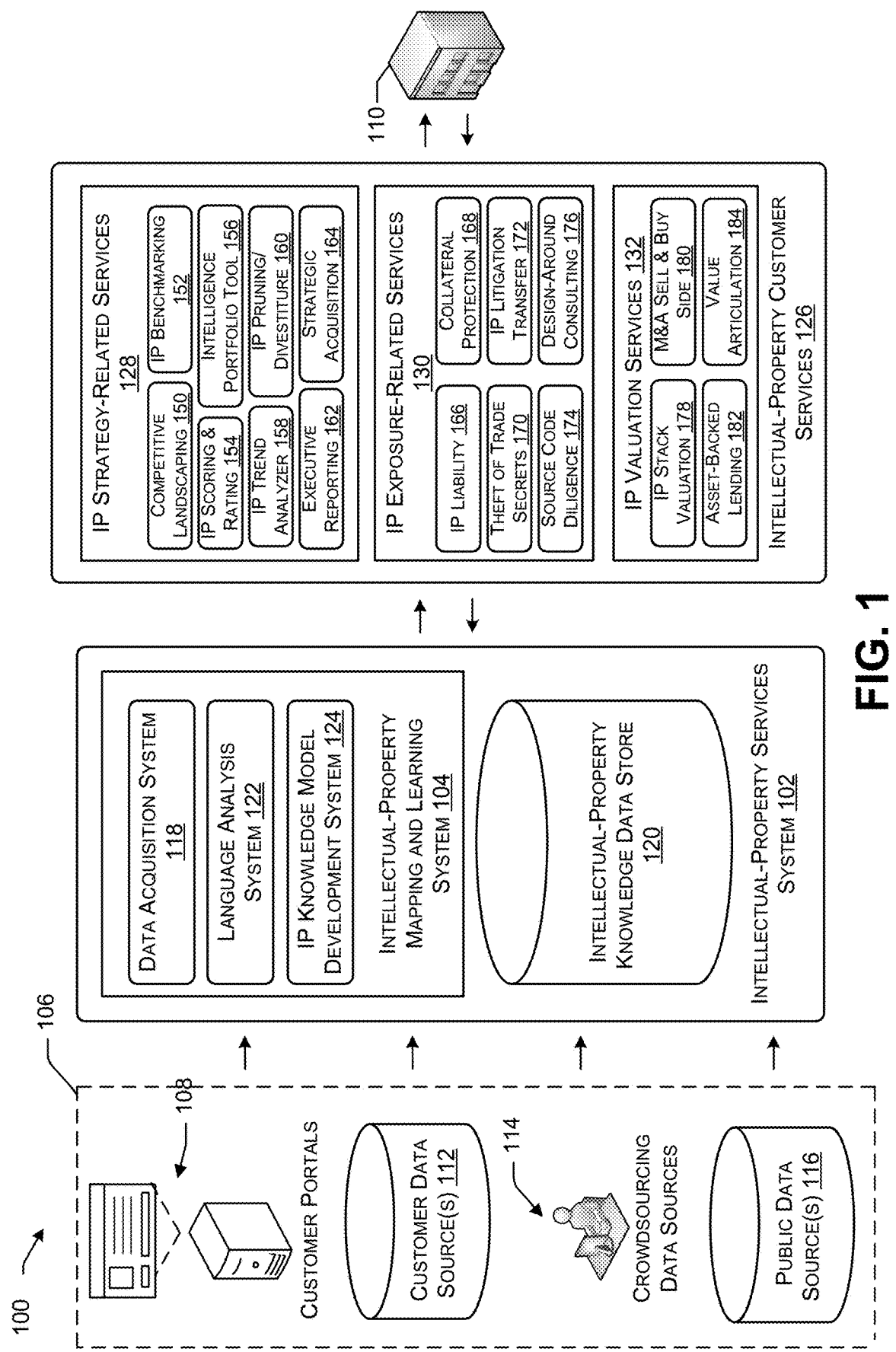
FIG. 1 illustrates an example architecture to analyze intellectual-property data and utilize the analysis of the intellectual-property data to provide a number of services according to some implementations.

Techniques described herein are directed to analyzing intellectual-property data in relation to products and/or services. As technological advancement has increased, and the value of organizations has been characterized by the shift from tangible assets to intangible assets, the importance of intellectual property has also increased. Thus, organizations have taken various measures to safeguard their intellectual property, which may include patents, trademarks, copyrights, trade secrets, and/or know-how, for example. However, there have been few techniques, architectures, and frameworks developed to analyze intellectual-property data and generate useful information from an organization's intellectual-property data. Additionally, the number of services provided to organizations using intellectual property is also limited due to the complexity of analyzing intellectual-property data and the inability of conventional systems to effectively provide information to organizations regarding their intellectual property that is of value to the organizations.

The implementations described herein are directed to techniques, systems, and architectures to analyze intellectual-property data to generate frameworks that may be used to provide services related to intellectual-property assets. In particular implementations, an intellectual-property services provider may obtain intellectual-property data from a number of data sources. In various implementations, at least a portion of the data sources may include public data sources. Public data sources storing intellectual-property data may include databases of patent offices of various jurisdictions, such as the Unites States Patent and Trademark Office (USPTO) database, the European Patent Office (EPO) database, and/or the World Intellectual Property Office (WIPO) database. Additionally, intellectual-property data may be stored in databases related to copyrights, such as the United States Copyright Office or the European Union Copyright Office. The intellectual-property data may also be obtained from private data sources. The private data sources may include databases that store information related to an organization that are maintained and/or controlled by the organization. The private data sources may also include databases of service providers that store information on behalf of an organization. Further, at least a portion of the intellectual-property data of an organization may be captured via one or more user interfaces. In some situations, the one or more user interfaces may be rendered as part of customer portals that are accessible to customers of the intellectual-property services provider. In examples, the data sources may include a digital-property registry, which may be maintained and/or generated by a system and/or entity other than the organization. For example, a digital property, such as a trade secret, may be registered with the digital-property registry utilizing one or more obfuscation values to represent the digital property and/or block values to represent a block in a distributed ledger where the obfuscation value is registered.

The intellectual-property services provider may also obtain data related to a number of products and/or services. The products and/or services may be offered for acquisition by a same organization for which the intellectual-property data is being obtained and analyzed. Additionally, the products and/or services may be offered for acquisition by organizations differing from an organization for which the intellectual-property data is being obtained and analyzed. The data related to the products and/or services may include at least one of economic data related to the products and/or services, manuals regarding the products and/or services, specification sheets for the products and/or services, descriptions of the products and/or services, and/or marketing materials related to the products and/or services.

The data related to products and/or services may be obtained from a number of data sources. In particular implementations, the data related to products and/or services may be obtained from various websites. In some scenarios, the data related to the products and/or services may be obtained from one or more websites of organizations that are offering the products and/or services for acquisition. In additional implementations, the data related to the products and/or services may be obtained from databases of the organizations offering the products and/or services for acquisition. Further, the data related to the products and/or services may be obtained via one or more user interfaces, such as user interfaces provided by the intellectual-property services provider as part of a customer portal.

Data related to intellectual property of an organization and data related to products and/or services may also be obtained through crowdsourcing. In particular implementations, the intellectual-property services provider may publish requests for information about intellectual-property assets and/or requests for information about products and/or services. The requests may be published on one or more websites, via one or more mobile device applications, sent to a group of individuals, or combinations thereof. In response to the requests, individuals may identify information that corresponds to the request and send the information to the intellectual-property services provider.

After obtaining information about products and/or services and obtaining intellectual-property information, an intellectual-property services provider may analyze the information and organize the information in such a way that the intellectual-property services provider may provide a number of services to customers of the intellectual-property services provider. The intellectual-property services provider may analyze the information obtained from the data sources using machine learning techniques. In particular implementations, the intellectual-property services provider may generate one or more models that may be utilized to determine properties, characteristics, metrics, and the like with respect to intellectual-property assets and products and/or services. In various implementations, the intellectual-property services provider may implement machine learning techniques to determine relationships between intellectual-property assets and products and/or services. In some examples, the intellectual-property services provider may utilize the relationships between intellectual-property assets and products and/or services to estimate the value of intellectual-property assets. The intellectual-property services provider may also utilize machine learning techniques to determine levels of exposure corresponding to intellectual-property assets. The levels of exposure associated with the intellectual-property assets may correspond to a probability that at least one of coverage of the intellectual-property assets may decrease or that a litigation event with respect to the intellectual-property assets occurs.

The intellectual-property services provider may utilize natural language processing techniques in order to analyze the information obtained from the data sources related to the intellectual-property assets and the products and/or services. To illustrate, the intellectual-property services provider may parse words included in information associated with products and/or services and information associated with the intellectual-property assets and determine parts of speech for the words. In certain examples, the intellectual-property services provider may determine relationships between words using the parts of speech of the words and grammatical relationships between the words. The intellectual-property services provider may utilize natural language processing techniques and/or machine learning techniques to also determine relationships between products and/or services and intellectual-property assets. That is, the intellectual-property services provider may utilize natural language processing techniques to determine intellectual-property documents that may cover one or more features of the products and/or services. In illustrative examples, the intellectual-property services provider may utilize natural language processing techniques and machine learning techniques to determine probabilities that intellectual-property assets may be enforced with respect to corresponding products and/or services.

In particular implementations, the intellectual-property services provider may generate linguistic structures that correlate to intellectual-property documents using natural language processing techniques and/or machine learning techniques to determine relationships between words included in the information related to the intellectual-property assets. For example, the intellectual-property services provider may determine verbs related to actions performed in a claim of a patent document and also determine nouns and/or adjectives that correspond to the actions. In some situations, the intellectual-property services provider may utilize natural language processing techniques and machine learning techniques to determine elements of claims of patent documents. In addition, the intellectual-property services provider may generate linguistic structures for products and/or services using natural language processing techniques and machine learning techniques. In illustrative examples, the intellectual-property services provider may determine actions performed with respect to products and/or services and generate linguistic structures that indicate verbs related to the actions and nouns, adjectives, and/or adverbs that are related to the verbs. In various implementations, the intellectual-property services provider may determine intellectual-property assets that correspond to various products and/or services by comparing the respective linguistic structures of the intellectual-property assets and the products and/or services.

The intellectual-property services provider may determine intellectual-property assets that correspond with features of products and/or services using a technology-classification framework. The technology-classification framework may include a taxonomy that includes a number of classifications with each of the classifications being associated with a number of criteria. Classifications for intellectual-property documents may be determined according to the technology-classification framework by performing a linguistic analysis of the intellectual-property documents and determining features of the intellectual-property documents. The intellectual-property services provider may then compare the features of the intellectual-property documents against the criteria for the classifications of the technology-classification framework to determine respective classifications for the intellectual-property documents. Additionally, the intellectual-property services provider may also determine classifications for products and/or services according to the technology-classification system. For example, the intellectual-property services provider may perform a linguistic analysis of information related to products and/or services and determine features of the products and/or services. The intellectual-property service provider may then compare features of the products and/or services in relation to criteria for the classifications of the technology-classification framework to determine respective classifications for the products and/or service. In particular implementations, the intellectual-property services provider may determine intellectual-property assets that correspond to products and/or services when the intellectual-property assets and the products and/or services are in a same or similar classification of the technology-classification framework.

In illustrative implementations, the intellectual-property services provider may generate one or more models that map products and/or services to a technology-classification framework and that map intellectual-property assets to the technology-classification framework. The intellectual-property services provider may then utilize natural language processing techniques and/or machine learning techniques to further develop the one or more models by determining intellectual-property assets that correspond to various products and/or services within a given classification. In this way, the intellectual-property services provider may receive requests to identify intellectual-property assets corresponding to a specified product and/or service and utilize the one or more models to identify the intellectual-property assets that correspond to the specified product and/or service. The intellectual-property services provider may then determine valuations for the intellectual-property assets based at least partly on revenue of the specified product and/or service. For example, the intellectual-property services provider may determine a portion of the revenue of a particular product and/or service that is attributable to an intellectual-property asset and estimate a value of the intellectual-property asset based at least in part on the portion of revenue of the product and/or service attributable to the intellectual-property asset. The intellectual-property services provider can also utilize the one or more models and the technology-classification framework to provide additional information to customers. To illustrate, the intellectual-property services provider may utilize the one or more models and the technology-classification framework to determine an amount of exposure and/or loss with respect to intellectual-property assets. The intellectual-property services provider may also provide services to customers using the one or more models and the technology-classification framework related to providing metrics for a portfolio of intellectual-property assets of an organization. The metrics may indicate measures of breadth and coverage with respect to the intellectual-property documents. The intellectual-property services provider may also generate reports using the one or more models and the technology-classification framework indicating technology features around which an organization may acquire and/or develop additional intellectual-property assets. Additionally, the intellectual-property services provider may generate reports using the one or more models and the technology-classification system indicating intellectual-property assets of competitors of customers of the intellectual-property services provider and/or indicating metrics of the intellectual-property assets of competitors of customers of the intellectual-property services provider.

Conventional techniques and systems that analyze intellectual-property documents with respect to products and/or services are performed by individuals with the use of computers. For example, the individuals may perform manual searches of intellectual-property databases and online searches to identify information about products and/or services. The individuals may then perform a manual analysis to determine intellectual-property documents that correspond to products and/or services. In certain situations, individuals may also access online resources related to the sale of intellectual-property assets, litigation verdicts for intellectual-property assets, and/or settlement agreements for litigation proceedings with respect to intellectual-property assets to determine the value of one or more intellectual-property assets.

However, the conventional techniques and systems used to determine relationships between intellectual-property assets and various products and/or services and to determine valuations for intellectual-property assets are inefficient and, often, inaccurate. To illustrate, individuals are often unable to search and retrieve large amounts of data relating to intellectual-property assets and products and/or services. Typically, information is overlooked or not found in manual searches performed online by individuals, where the information may be useful in identifying intellectual-property assets that correspond to respective goods and/or services and in determining valuations of intellectual-property assets. Further, a human-based analysis of the information collected may often miss relationships between intellectual-property assets and products and/or services or may miss features covered by intellectual-property assets that correspond to various products and/or services. Thus, conventional techniques and systems are labor intensive and often do not provide information that is usable by organizations to evaluate the intellectual-property assets of the organizations.

Additionally, implementing the techniques and systems described herein is more than simply collecting and organizing large amounts of data. The systems and techniques described herein not only provide useful information regarding intellectual-property assets that correspond to products and/or services in a more efficient way with respect to conventional techniques and systems, but the implementations described herein also utilize techniques and systems that generate accurate information that is supported by an analytical basis formed from the unconventional use of machine learning and natural language processing.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates an example architecture 100 to analyze intellectual-property data and utilize the analysis of the intellectual-property data to provide a number of services according to some implementations. The architecture 100 may include an intellectual-property services system 102 that analyzes data related to intellectual-property assets. The data analyzed by the intellectual-property services system 102 may be used by an intellectual-property services provider to provide services related to intellectual-property assets. The intellectual-property assets may include patents, trademarks, copyrights, trade secrets, and know-how. In various implementations, the intellectual-property assets may include a portion of a patent, such as a claim of a patent. Additionally, the intellectual-property assets may include a portion of a copyright that is directed to a portion of software code that corresponds to a particular feature that is performed when the software code is executed.

In particular implementations, intellectual-property assets may be associated with various forms of documentation that indicate features of the intellectual-property assets. In situations where the intellectual-property assets include patents, the patents may include utility patents, design patents, and/or plant patents. The patents may also include patent applications, such as provisional patent applications, utility patent applications, design patent applications, plant patent applications, or combinations thereof. In various scenarios, the intellectual-property assets may include trademark applications and granted trademark registrations. The intellectual-property assets may also include documentation corresponding to copyright registrations and documentation including aspects of trade secrets. To illustrate, formulas, processes, and/or algorithms and software code that are the subject of trade secrets may be documented. Actions taken to preserve the secrecy of trade secrets may also be documented and included in the intellectual-property assets. In addition, the intellectual-property assets may include documentation of know-how of the organization, such as process improvements and innovations, new product designs, product improvements, brand names, logos, ad slogans, website design, product appearance, product packaging, manufacturing processes, engineering drawings, instruction manuals, product catalogs, customer and supplier lists, and so forth.

The intellectual-property services system 102 may include an intellectual-property mapping and learning system 104. The intellectual-property mapping and learning system 104 may obtain information from a number of data sources, such as data sources 106, and analyze the information to determine relationships between intellectual-property assets and products and/or services. The data sources 106 may include customer portals 108. The customer portals 108 may include one or more user interfaces generated by the intellectual-property services system 102 that include one or more user interface elements to capture information related to intellectual-property assets of customers of an intellectual-property services provider, such as a customer 110. The user interfaces associated with the customer portals 108 may be displayed as part of one or more websites of an intellectual-property services provider and/or via one or more mobile device applications of the intellectual-property services provider. In various implementations, information may be entered into the customer portals 108 by a representative of the customer 110. In additional implementations, information may be entered into the customer portals 108 by representatives of an intellectual-property services provider.

The data sources 106 may also include one or more customer data sources 112. The one or more customer data sources 112 may be accessible to the customers of the intellectual-property services provider and store data under the direction of the customers of the intellectual-property services provider. That is, the data stored by the one or more customer data sources 112 may be under the control of respective customers of the intellectual-property services provider. In some illustrative examples, at least one customer data source 112 may be maintained on premises of the customer 110. In additional illustrative examples, at least one customer data source 112 may be maintained by an additional organization, such as an organization that provides remote data storage services. For example, a customer data source 112 may include a cloud-based data storage system that is accessible by the customer 110.

Additionally, the data sources 106 may include crowdsourcing data sources 114. The crowdsourcing data sources 114 may include a number of individuals that provide information to the intellectual-property services system 102. In various implementations, the intellectual-property services system 102 may publish requests for information about intellectual-property assets via at least one of one or more websites or one or more mobile device applications. The intellectual-property service system 102 may also publish requests for information about products and/or services that may correspond to intellectual-property assets. In various implementations, individuals included in the crowdsourcing data sources 114 may access the requests published by the intellectual-property services system 102 using at least one computing device and provide responses to the requests. The responses may include information about at least one of intellectual-property assets or products and/or services that were the subject of the requests.

Further, the data sources 106 may include one or more public data sources 116. The one or more public data sources 116 may include data sources that store data that is accessible to the general public. In some implementations, the one or more public data sources 106 may store data that is accessible to individuals without any credentials. In additional implementations, the one or more public data sources 106 may store data that is accessible to individuals with credentials that are made available to the public by organizations maintaining the one or more public data sources 116. The data sources 116 that store data related to intellectual-property assets may be accessible via one or more websites and/or one or more mobile device applications.

The one or more public data sources 116 may include data sources that store data related to intellectual-property assets. For example, the one or more public data sources 116 may include intellectual property organizations of various governmental jurisdictions, such as the United States Patent and Trademark Office, the European Patent Office, the World Intellectual Property Organization, or the Japanese Patent Office. The intellectual-property data stored by the one or more public data sources 116 may include content of intellectual-property documents. For example, the intellectual-property data may include information contained in patent documents, such as claims, drawings, backgrounds, abstracts, descriptions of drawings, and the like. In other examples, the intellectual-property data may include content of trademark documents, such as descriptions of goods and services and/or classifications of goods and services. Additionally, the intellectual-property data may include information included in copyright documents. Further, the intellectual-property data may include information related to the examination of intellectual-property documents. To illustrate, the intellectual-property data may include prosecution histories of patent applications and/or prosecution histories of trademark applications. The intellectual-property data may also include bibliographic information related to intellectual-property documents, such as classification of patent documents, examiners assigned to examine patent and trademark applications, priority dates, filing dates, assignees, inventors, applicants, combinations thereof, and the like. In various implementations, the intellectual-property data may include data related to at least one of administrative proceedings, litigation proceedings, settlement information, or licensing information for intellectual-property assets.

The one or more public data sources 116 may also include data sources that store market and financial data. The market and financial data may be related to organizations offering products and/or services for acquisition. For example, the market and financial data may include financial performance of organizations over a period of time. Additionally, the market and financial data may also indicate classifications and industries for certain organizations. The market and financial data may also include financial performance of one or more industries over a period of time. Further, the market and financial data may include data for financial markets, such as stock markets, over time.

In addition, the one or more public data sources 116 may include data sources that store information about products and/or services. To illustrate, the one or more public data sources 116 may store data that includes descriptions of products and/or services, specifications for products, features of products and/or services, images of products, videos related to products and/or services, pricing of products and/or services, organizations that provide products and/or services, combinations thereof, and so forth.

In particular implementations, the intellectual-property services system 102 may include a data acquisition system 118 to obtain data from the data sources 106. In various implementations, the data acquisition system 118 may extract information from a number of websites. For example, the data acquisition system 118 may include one or more web crawlers that access websites and search for information that corresponds to a given set of criteria and extracts the information from the websites that correspond to the criteria. In illustrative examples, the data acquisition system 118 may obtain data from the one or more data sources 106 corresponding to various products and/or services. Additionally, the data acquisition system 118 may obtain data from the one or more data sources 106 corresponding to a number of intellectual-property assets.

Further, the data acquisition system 118 may perform one or more operations with respect to the data obtained from the one or more data sources 106 before the data is stored by the intellectual-property knowledge data store 120. For example, the data acquisition system 118 may perform optical character recognition operations with respect to at least a portion of the data obtained from the one or more data sources 106. In other examples, the data acquisition system 118 may remove information embedded in certain forms of data obtained from the one or more data sources 106, such as embedded scripts or fonts. The data acquisition system 118 may also add information to data obtained from the one or more data sources 106. To illustrate, the data acquisition system 118 may add time stamps to data obtained from the one or more data sources 106. The data acquisition system 118 may also add one or more tags to data obtained from the one or more data sources 106. The one or more tags may be related to at least one of one or more organizations that correspond to the extracted data, one or more technology classifications utilized by the intellectual-property services system 102, or one or more categories of intellectual-property assets (e.g., patents, trademarks, copyrights, trade secrets, know-how). Additionally, the data acquisition system 118 may apply tags to data obtained from the one or more data sources 106 indicating that the data is economic data, market data, financial data, product and/or service description data, litigation related data, licensing related data, combinations thereof, and so forth. By applying tags to data obtained from the one or more data sources 106, the data acquisition system 118 may store the data in the intellectual-property knowledge data store 120 in such a way that the data may be retrieved and analyzed efficiently.

The intellectual-property mapping and learning system 104 may utilize natural language processing techniques and machine learning techniques to identify relationships between intellectual-property assets and products and/or services. The intellectual-property mapping and learning system 104 may also generate data for providing intellectual property customer services 126 to customers of an intellectual-property services provider, such as the customer 110. In particular implementations, the intellectual-property mapping and learning system 104 may include a language analysis system 122. The language analysis system 122 may analyze words included in information obtained from the one or more data sources 106 to determine parts of speech of the words. For example, the language analysis system 122 may determine that words included in information obtained from the one or more data sources 106 may be nouns, verbs, adverbs, adjectives, pronouns, articles, prepositions, conjunctions, and so forth. The language analysis system 122 may also determine relationships between words. To illustrate, the language analysis system 122 may identify nouns and adjectives that modify the nouns in addition to verbs and adverbs that modify the verbs. Further, the language analysis system 122 may determine nouns and/or pronouns that are performing actions corresponding to verbs.

In various implementations, the language analysis system 122 may analyze information obtained from the one or more data sources 106 to identify portions of intellectual-property documents. For example, the language analysis system 122 may analyze a patent document to identify at least one of a claims portion of the patent document, a detailed description of the patent document, a background of the patent document, a summary of the patent document, an abstract of the patent document, and so forth. Additionally, the language analysis system 122 may determine individual elements of claims included in patent documents. In particular implementations, the language analysis system 122 may determine features included in claims that may be directed to physical features of a device or system. In various implementations, the features may be directed to actions that are being performed in relation to the methods or processes or actions performed by devices or systems. Further, in scenarios where the claims are directed to compositions of matter that correspond to molecules, the features may be directed to various arrangements of atoms included in the compositions of matter, such as a phenyl functional group or a carboxyl functional group. In some situations, the elements of a claim may include a number of individual features. In additional examples, the language analysis system 122 may also analyze a trademark document to identify at least one of a description of goods and services or international class of the trademark.

In certain implementations, the language analysis system 122 may analyze intellectual-property documents obtained from the one or more data sources 106 and generate modified intellectual-property documents. The language analysis system 122 may generate the modified intellectual-property documents by removing portions of the original intellectual-property documents. For example, the language analysis system 122 may remove at least one of conjunctions or articles from intellectual-property documents. In additional examples, the language analysis system 122 may generate the modified intellectual-property documents by indicating parts of speech and/or relationships between words in the original intellectual-property documents.

Additionally, the language analysis system 122 may analyze information related to products and/or services and determine features of the products and/or services. To illustrate, the language analysis system 122 may determine physical components of devices and/or systems. The language analysis system 122 may also determine technical features of devices and/or systems. Further, the language analysis system 122 may also determine features of processes and/or methods performed in relation to products and/or services.

In particular implementations, the language analysis system 122 may determine at least one of features of intellectual-property assets, features of products, or features of services by analyzing words related to intellectual-property assets, products, and/or services with respect to a library of words related to features of intellectual-property assets, products, and/or services. For example, the intellectual-property mapping and learning system 104 may determine a particular set of words that are related to each of a number of individual features that may be associated with at least one of an intellectual-property document, a product, or a service. To illustrate, the intellectual-property mapping and learning system 104 may determine that words, such as "screen", "panel", and "display" may indicate a display device feature of an electronic device. Continuing with this example, the language analysis system 122 may parse intellectual-property documents and/or information about products and/or services to identify words that correspond to the words associated with a display device feature. In situations where at least a threshold number of words included in the intellectual-property documents and/or the information about products and/or services corresponds to the words associated with the display device feature, the language analysis system 122 may determine that a particular intellectual-property document or a particular product and/or service includes the display device feature.

In various implementations, the language analysis system 122 may also determine that proximity between words associated with a feature may indicate that a feature is present in an intellectual-property document or in information about a product and/or service. In some examples, when a number of words associated with a feature are within 3 words, within 5 words, within 10 words, or within 20 words of each other, the language analysis system 122 may determine that the feature is included in an intellectual-property document or in a product and/or service. In additional examples, when a number of words associated with a feature are within a same sentence or within a same paragraph, the language analysis system 122 may determine that the feature is included in an intellectual-property document or in a product and/or service.

The language analysis system 122 may also generate linguistic structures for intellectual-property documents and linguistic features for information related to products and/or services. In illustrative examples, the language analysis system 122 may generate linguistic structures for claims of patent documents. In particular scenarios, the language analysis system 122 may generate linguistic structures for elements of claims of patent documents or features of claims of patent documents. For example, the language analysis system 122 may identify a verb that corresponds to an action of an element of a claim of a patent document. The language analysis system 122 may also determine one or more nouns related to the verb and, in some situations, one or more adjectives that correspond to the one or more nouns. The language analysis system 122 may then generate a linguistic structure that shows relationships between the verb, the one or more nouns, and/or the one or more adjectives. Additionally, the language analysis system 122 may generate linguistic structures that correspond to actions performed with respect to products and/or services offered by an organization for acquisition. In particular implementations, the linguistic structure may include a tree structure with a single node as an initial node or root node at the top of the tree structure and subsequent nodes branching from the root node. The root node may include a verb that corresponds to an action and the branch nodes may correspond to nouns related to the verb, adjectives related to the nouns, other words related to the verb and/or nouns, or combinations thereof.

Additionally, the intellectual-property mapping and learning system 104 may include an intellectual-property (IP) model development system 124 that determines relationships between intellectual-property documents and products and/or services. In various implementations, the IP knowledge model development system 124 may identify intellectual-property assets that correspond to respective products and/or services. For example, the IP knowledge model development system 124 may identify one or more patent claims, an element of a patent claim, and/or a feature of a patent claim that corresponds to at least a portion of a product and/or service. In additional examples, the IP knowledge model development system 124 may identify a trademark that corresponds to a product and/or a service, at least a portion of a copyright that corresponds to a product and/or service, or at least portion of a trade secret that corresponds to a product and/or service.

The IP knowledge model development system 124 may determine that an intellectual-property asset corresponds to a product and/or service by comparing linguistic structures of intellectual-property assets with linguistic structures of products and/or services. In particular implementations, the IP knowledge model development system 124 may generate a first linguistic structure for a feature of an intellectual-property asset and a second linguistic structure for a feature of a product and/or service. The IP knowledge model development system 124 may compare the first linguistic structure with the second linguistic structure to determine a similarity metric between the first linguistic structure and the second linguistic structure. In scenarios where the similarity metric between the first linguistic structure and the second linguistic structure is at least a threshold similarity metric, the IP knowledge model development system 124 may determine that the feature of the intellectual-property asset corresponds to the feature of the product and/or service.

The similarity metric may be based at least partly on words included in the first linguistic structure and words included in the second linguistic structure. The similarity metric may also be based at least partly on relationships between words included in the first linguistic structure and words included in the second linguistic structure. In illustrative implementations, the first linguistic structure may include a first tree structure with a root node and a number of branch nodes arranged in a first configuration and the second linguistic structure may include a second tree structure with a root node and an additional number of branch nodes. In these situations, the IP knowledge model development system 124 may compare the first tree structure and the second tree structure to determine the similarity metric between the first linguistic structure and the second linguistic structure. To illustrate, the IP knowledge model development system 124 may compare words included in the nodes of the first tree structure and words included in the nodes of the second tree structure to determine at least a portion of the similarity metric for the first linguistic structure and the second linguistic structure. Additionally, the IP knowledge model development system 124 may compare the first configuration of the first tree structure with the second configuration of the second tree structure to determine at least a portion of the similarity metric for the first linguistic structure and the second linguistic structure. In various implementations, the IP knowledge model development system 124 may compare the locations of words and/or locations of nodes within the first tree structure and the second tree structure to determine a similarity metric between the first linguistic structure and the second linguistic structure.

The IP knowledge model development system 124 may also determine relationships between intellectual-property assets and products and/or services using a classification system. The classification system may include a number of classifications with individual classifications having one or more criteria to identify intellectual-property assets, products, and/or services to include in the respective classifications. In various implementations, the classifications of the classification system may include a number of technology groups. The classification system may be generated by the intellectual-property mapping and learning system 104, in some examples. In additional examples, the classification system may be generated by another entity, such as a governmental entity, an educational institution, a non-profit organization, a for-profit organization, or combinations thereof. In particular implementations, the IP knowledge model development system 124 may compare features of individual intellectual-property assets with criteria of a number of classifications included in the classification system and determine one or more classifications to associate with the intellectual-property assets. Additionally, the IP knowledge model development system 124 may compare features of products and/or services with criteria of a number of classifications of the classification system and determine one or more classifications to associate with the products and/or services.

In particular implementations, the IP knowledge model development system 124 may determine intellectual-property assets and products and/or services included in a same classification of the classification system. The IP knowledge model development system 124 may then determine one or more relationships between intellectual-property assets and products and/or services included in the same classification of the classification system. In this way, the IP knowledge model development system 124 may develop one or more models indicating intellectual-property assets that correspond to products and/or services within a classification of the classification system. In an illustrative example, the IP knowledge model development system 124 may develop a model to determine patent claims that correspond to display features of mobile devices. In another illustrative example, the IP knowledge model development system 124 may develop a model to determine trademarks that correspond to fitness tracker devices. In various implementations, the classification system(s), the relationships between intellectual-property assets and products and/or services, and the models used to determine intellectual-property assets that may be related to particular products and/or services may be stored by the intellectual-property knowledge data store 120.

The relationships determined by the IP knowledge model development system 124 between products and/or services and intellectual-property assets within particular classifications and the models developed by the IP knowledge model development system 124 to determine intellectual-property assets that correspond with products and/or services within a classification of the classification system may be used to provide a number of intellectual property customer services 126. The intellectual-property services 126 may include IP strategy-related services 128, IP exposure-related services 130, and IP valuation services 132. In various implementations, the intellectual property customer services 126 may be provided based on requests sent to the intellectual-property services system 102 for information regarding one or more intellectual-property assets or one or more products and/or services. The intellectual-property services system 102 may then utilize the models, frameworks, and/or relationships between intellectual-property assets and products and/or services generated by the intellectual-property mapping and learning system 104 to respond to the requests. The requests may be sent, in some situations, by individuals associated with an intellectual-property services provider, while in additional situations, the request may be sent by individuals associated with one or more customers 110.

The intellectual property customer services 126 may include intellectual property (IP) strategy-related services 128. The IP strategy-related services 128 may include analysis of groups of intellectual-property assets. In examples, the IP strategy-related services 128 may include competitive landscaping 150, IP benchmarking 152, IP scoring & rating 154, an intelligence portfolio tool 156, an IP trend analyzer 158, IP pruning and/or divestiture 160, executive reporting 162, and/or strategic acquisition 164. In particular implementations, the IP strategy-related services 128 may include the analysis of a portfolio of intellectual-property assets of an organization, such as the analysis of a portfolio of intellectual-property assets of the customer 110. In illustrative examples, the IP strategy-related services 128 may include analyzing a portfolio of patent documents and/or analyzing a portfolio of trademark documents. In various implementations, the IP strategy-related services 128 may include analyzing a portfolio of intellectual-property documents of competitors of the customer 110, such as by using the competitive landscaping 150. For example, the intellectual-property services system 102 may determine technology classifications for intellectual-property assets of a competitor of the customer 110 and generate one or more documents or a report that provides a landscape analysis showing the intellectual-property documents of the competitor with respect to individual technology classifications. In some instances, the intellectual-property assets of the customer 110 may be mapped against the intellectual-property assets of a competitor of the customer 110 with regard to their respective technology classifications.

In other examples, the IP strategy-related services 128 may include determining scores and/or ratings of intellectual-property assets, such as by the IP scoring and rating component 154. To illustrate, the intellectual-property services system 102 may determine measures of breadth and/or measures of coverage of intellectual-property assets of the customer 110 or intellectual-property assets of another organization. The intellectual-property services system 102 may then rank the intellectual-property assets based on the measures of breadth and/or measures of coverage. The IP strategy-related services 128 may also include identifying technology areas in which the customer 110 may want to develop intellectual-property assets, such as by using the IP benchmarking component 152. For example, the intellectual-property services system 102 may determine technology classifications in which the customer 110 has few or no intellectual-property assets, but are related to technology areas that are being developed by the customer 110. Additionally, the intellectual-property services system 102 may identify future areas of research and development for the customer 110, such as by using the IP portfolio tool 156, based on a number of intellectual-property assets of the customer and/or a number of intellectual-property assets of one or more competitors of the customer 110 in certain technology areas.

Further, the IP strategy-related services 128 may include identifying intellectual-property assets of the customer to offer for sale or license to other organizations. The intellectual-property service system 102 may also generate recommendations for intellectual-property assets of the customer 110 that may be abandoned or no longer maintained, such as by the IP pruning and/or divestiture component 160. In particular implementations, the intellectual-property services system 102 may determine at least one of measures of value, measures of breadth, or measures of coverage for at least a portion of the intellectual-property assets of the customer 110 and utilize the respective measures to generate recommendations, such as via the executive reporting component 162, regarding at least one of sales opportunities, licensing opportunities, or cost savings opportunities (e.g., abandonment) of one or more intellectual-property assets of the customer 110. The intellectual-property services system 102 may also determine potential organizations and/or intellectual-property assets that may be acquired, such as by the strategic component 164, by the customer based on at least one of the measures of value, measures of breadth, measures of coverage, or the technology areas associated with the organizations and/or the intellectual-property assets. In addition, the IP strategy-related services 128 may include determining metrics for intellectual-property documents of the customer 110, such as by utilizing the IP trend analyzer 158. The metrics may indicate trends in at least one of the number of intellectual-property assets of the customer 110 being filed or the number of intellectual-property assets of the customer 110 being granted.

The intellectual-property services system 102 may also be utilized to provide IP risk-related services 130 to the customer 110. The IP Exposed-Related Services 130 may include IP liability 166, collateral protection 168, theft of trade secrets 170, IP litigation transfer 172, source code diligence 174, and/or design-around consulting. The IP exposure-related services 130 may be related to determining, utilizing the IP liability component 166, measures of risk of loss related to intellectual-property assets of the customer 110. The risk of loss may correspond to at least one of a decrease in value of an intellectual-property assets, invalidation of at least a portion of an intellectual-property asset, or theft of an intellectual-property asset. In various implementations, the IP exposure-related services 130 may include determinations of measures liability with respect to intellectual-property assets of the customer 110. The intellectual-property services system 102 may determine measures of liability of intellectual-property assets based on at least one of a number of litigation events of intellectual-property assets of the customer 110 or a number of litigation events of intellectual-property assets that are in a same technology classification as one or more intellectual-property assets of the customer 110. A litigation event may include filing of a request to initiate an action against an intellectual-property asset. Actions against intellectual-property assets may include at least one of opposition proceedings, proceedings decided by an administrative body, or proceedings in a judicial jurisdiction. In particular implementations, measures of liability with respect to intellectual-property assets may correspond to a number of litigation events related to intellectual-property assets of the customer 110 or intellectual-property assets of another organization that have taken place within a specified period of time. In some instances, measures of liability with respect to intellectual-property assets may be used to determine, utilizing the collateral protection component 168, terms of insurance policies issued to protect loans made with intellectual-property assets as collateral.

The IP exposure-related services 130 may also include determining measures to reduce risk of loss with respect to intellectual-property assets. For example, the IP risk-related services 130 may include determining, utilizing the theft of trade secrets component 170, an amount of risk for the theft of trade secrets of the customer 110. In particular implementations, the intellectual-property services system 102 may analyze security protocols or other security processes implemented by the customer 110 to protect trade secrets and determine an amount of risk of trade secret theft based at least partly on the analysis. The IP exposure-related services 130 may also include determining, utilizing the source code diligence component 174, processes and/or procedures to safeguard source code developed by the customer and actions for the customer 110 and processes and/or procedures to take to protect the intellectual property rights related to the source code. Additionally, the IP exposure-related services 130 may include determining, utilizing the design-around consulting component 176, options for the customer 110 to design around intellectual-property assets of competitors and/or options for competitors of the customer 110 to design around intellectual-property assets of the customer 110. In particular implementations, the intellectual-property services system 102 may analyze a number of intellectual-property assets and determine features of the intellectual-property assets that correspond to features of products and/or services. The intellectual-property services system 102 can then identify features of the products and/or services that can be modified to avoid the features of the intellectual-property assets related to the products and/or services.

Further, the IP exposure-related services 130 may include determining, utilizing the IP litigation transfer component 172, strategy in intellectual property litigation actions. To illustrate, the intellectual-property services system 102 may analyze a series of events that has taken place with respect to a pending litigation action in relation to the events that took place in previous litigation actions to determine recommendations for future decisions in the pending litigation. In illustrative examples, the intellectual-property services system 102 may determine that motions to file in a pending litigation to increase the probability of a favorable outcome for the customer. The intellectual-property services system 102 may also determine recommendations for settlement negotiations, such as amounts to offer in relation to settlement negotiations and/or timing of settlement offers. In addition, the intellectual-property services system 102 may generate recommendations for litigation counsel to retain in a particular litigation action and/or generate recommendations regarding modifications to the litigation counsel being retained.

In various implementations, the intellectual property customer services 126 provided via the intellectual-property services system 102 may include IP valuation services 132.

The IP valuation services 132 may include IP stack valuation 178, M&A sell-side and buy-side services 180, asset-backed lending 182, and/or value articulation 184. The IP valuation services 132 may include determining, utilizing the IP stack valuation 178, measures of value of intellectual-property assets. In particular implementations, the intellectual-property services system 102 may determine measures of value of intellectual-property assets for the customer or determine measures of value of intellectual-property assets of another organization. In some examples, the intellectual-property services system 102 may determine measures of value of intellectual-property assets that may be purchased or licensed by the customer 110. The intellectual-property services system 102 may also determine, utilizing the M&A sell-side and buy-side services 180, measures of value of intellectual-property assets of an organization that may be purchased or otherwise acquired by the customer 110. In additional implementations, the intellectual-property services system 102 may determine measures of value of intellectual-property assets of the customer 110 in conjunction with an acquisition of the customer 110 by another organization or merger of the customer 110 with another organization. Further, the intellectual-property services system 102 may determine, utilizing the asset-backed lending services 182, measures of value of intellectual-property assets of the customer 110 in relation to one or more loans made to the customer 110 with the intellectual-property assets of the customer 110 being used as collateral for at least a portion of the loan amount.

The intellectual-property services system 102 may determine, utilizing the value articulation services 184, measures of value of intellectual-property assets based on measures of breadth of the intellectual-property assets. Additionally, the intellectual-property services system 102 may determine measures of value of intellectual-property assets based on revenue of products and/or services that correspond to the intellectual-property assets. In order to determine the measures of breadth and/or portions of revenue of the products and/or services corresponding to the intellectual-property assets, the intellectual-property services system 102 may utilize one or more linguistic analysis techniques and one or more machine learning techniques.

Figure 2:
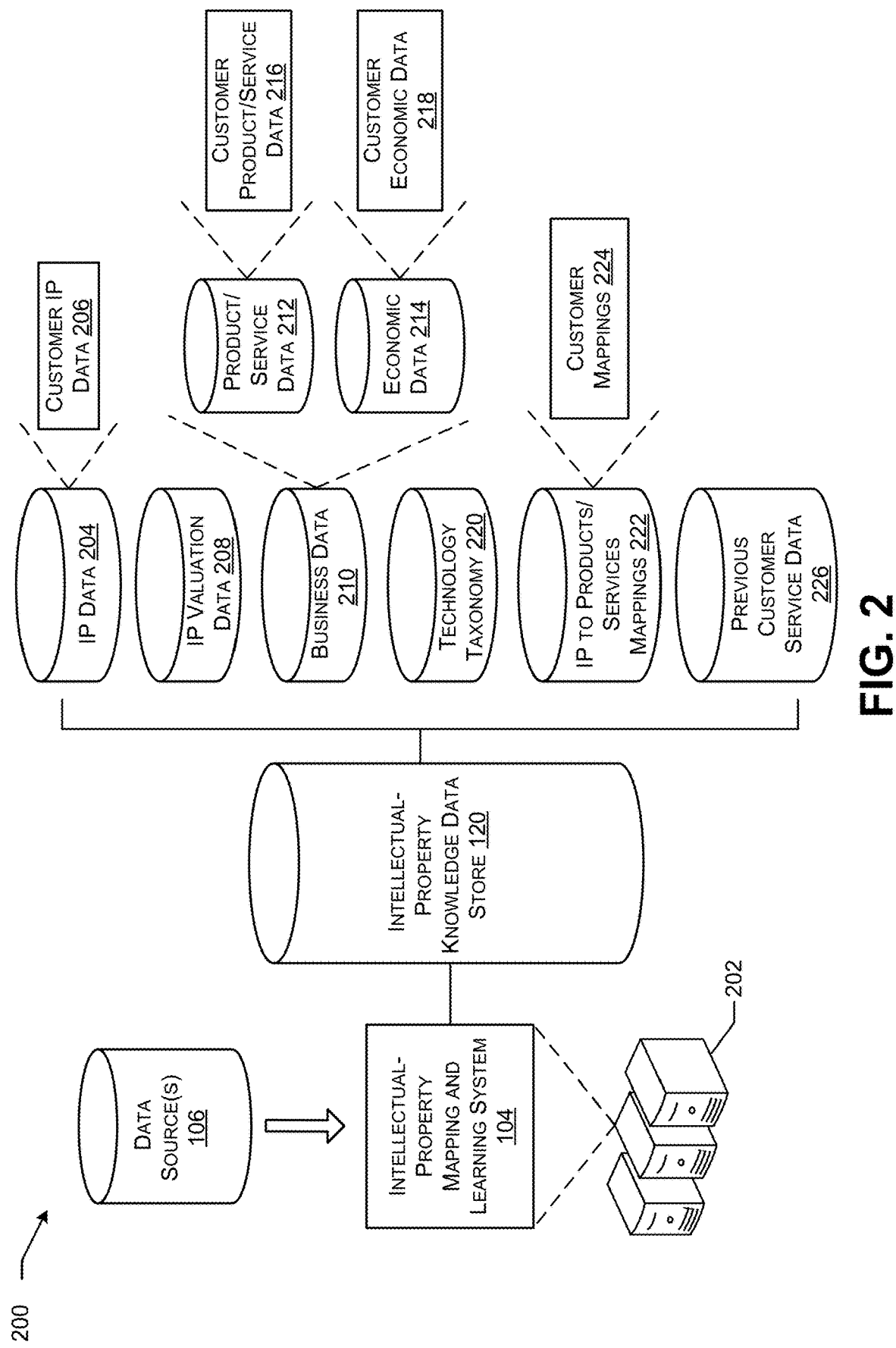
FIG. 2 illustrates an example environment to analyze types of intellectual-property data and product/service data to provide services related to intellectual property according to some implementations.

FIG. 2 illustrates an example environment 200 to analyze a number of types of intellectual-property data and product/service data to provide services related to intellectual property according to some implementations. The environment 200 may include the intellectual-property mapping and learning system 104, the one or more data sources 106, and the intellectual-property knowledge data store 120. The intellectual-property mapping and learning system 104 may be implemented by one or more computing devices 202. The one or more computing devices 202 can be included in a cloud computing architecture that operates the one or more computing devices 202 on behalf of an intellectual-property services provider. In these scenarios, the cloud computing architecture may implement one or more virtual machine instances on behalf of the intellectual-property services provider on the one or more computing devices 202. The cloud computing architecture may be located remotely from the intellectual-property services provider. In additional implementations, the one or more computing devices 202 can be under the direct control of the intellectual-property services provider. For example, the intellectual-property services provider may maintain the one or more computing devices 202 in one or more geographic locations to perform operations related to analyzing intellectual-property data and data related to products and/or services.

The intellectual-property knowledge data store 120 may store information that may be utilized by the intellectual-property mapping and learning system 104 in providing services related to intellectual-property assets. In particular implementations, the intellectual-property knowledge data store 120 may store intellectual-property (IP) data 204. The IP data 204 may include data related to intellectual-property assets. The IP data 204 may be obtained via one or more publicly accessible data sources, one or more private data sources, or combinations thereof. The IP data 204 may also include customer IP data 206 that corresponds to data stored by the intellectual-property knowledge data store 120 that is related to customers obtaining services from the intellectual-property services provider. In some implementations, the customer IP data 216 may be stored separately from IP data of other organizations in the intellectual-property knowledge data store 120.

In various implementations, the IP data 204 may include data related to intellectual-property assets, such as trademarks, copyrights, patents, and trade secrets. The IP data 204 may include documents that include information related to various types of intellectual property. For example, the IP data 204 may include patent applications, published patent applications, and issued or granted patents. The IP data 204 may also include trademark applications and submissions made in conjunction with the protection of copyrights. Additionally, the IP data 204 may include documents that include trade secrets and documents that support the protection of trade secrets. To illustrate, the IP data 204 may include employment agreements, employee manuals, policies, and/or procedures of organizations that may be used to support the trade secret status of innovation of the organizations.

The IP data 204 may also include bibliographic information for intellectual-property documents. In illustrative examples, the IP data 204 may include information particular dates related to intellectual-property documents (e.g., filing dates, issue dates, priority dates), assignees of intellectual-property documents, assignment history of intellectual-property documents, significant individuals related to the intellectual-property documents (e.g., inventors, examiners, etc.), third-party classifications related to intellectual-property documents, indications of priority documents for certain intellectual-property documents, status of an intellectual-property document with an intellectual property jurisdiction or examining organization, combinations thereof, and the like. In addition, the IP data 204 may include information related to prosecution history of intellectual-property documents. The prosecution history may include various events that took place with respect to the examination of intellectual-property documents. To illustrate, the IP data 204 may include dates that documents were filed during examination of intellectual-property documents, such as dates when responses were filed, dates that examiners issued office actions or examination reports, dates of allowance, dates of issuance, combinations thereof, and so forth. Further, the IP data 204 may include documents that were filed and/or submitted during prosecution of intellectual-property documents. In illustrative examples, the IP data 204 may include office actions, office action responses, information disclosure statements, application data sheets, declarations, specimens to support use of trademarks, appeal briefs, examiner answers to appeal briefs, reply briefs, decisions on appeal, notices of allowances, opposition documents, copyright submissions, interview summary documents, combinations thereof, and the like.

The IP data 204 may also include statistics and/or metrics related to individual examiners that examine intellectual-property assets. To illustrate, the IP data 204 may include number of intellectual-property assets allowed over a period of time, average number of office actions provided during examination of intellectual-property assets, number of appeals over a period of time, decisions on appeal, average length of time to provide office actions, years of experience, number of intellectual-property assets examined over a period of time, combinations thereof, and so forth. Further, the IP data 204 may include statistics and/or metrics related to groups of examiners that examiner intellectual-property assets. The IP data 204 may also include statistics and/or metrics of individual examiners with respect to the statistics and/or metrics of a group of examiners. For example, the IP data 204 may include number of office actions provided per allowed matter for an individual patent examiner with respect to an average number of office actions provided per allowed matter for a group of patent examiners that includes the individual patent examiner, such as a group of patent examiners in a particular art unit or a particular technology classification.

In various implementations, the IP data 204 may include data related to litigation proceedings and/or pseudo-litigation proceedings associated with intellectual-property assets. In certain implementations, the IP data 204 may include documents filed during litigation proceedings, such as petitions, answers, pleadings, motions, discovery requests, discovery responses, expert opinions, decisions by a court, jury verdicts, jury charges, combinations thereof, and the like. In additional implementations, the IP data 204 may include transcripts of litigations proceedings. For example, the IP data 204 may include transcripts of court proceedings and/or transcripts of depositions. In further implementations, the IP data 204 may include documents filed during pseudo-litigation proceedings, such as inter parts review proceedings in the United States Patent and Trademark Office or opposition proceedings in the European Patent Office.

The intellectual-property knowledge data store 120 may also store IP valuation data 208. The IP valuation data 208 may be used by the intellectual-property mapping and learning system 104 to determine the value of intellectual-property assets or portions of intellectual-property assets. In particular implementations, the IP valuation data 208 may include values reached during settlement negotiations that took place during litigation proceedings or pseudo-litigation proceedings. Additionally, the IP valuation data 208 may include terms of licenses obtained with respect to intellectual-property assets or portions of intellectual-property assets. The IP valuation data 208 may also include verdicts provided by judges, juries, other judicial bodies, or administrative bodies that indicate value of intellectual-property assets or portions of intellectual-property assets. In various implementations, at least a portion of the IP valuation data 208 may include information related to customers of the intellectual-property services provider that is not publicly available. In additional implementations, the IP valuation data 208 may include information that may be used to determine the value of intellectual-property assets or portions of intellectual-property assets that is publicly available.

In addition, the intellectual-property knowledge data store 120 may store business data 210. The business data 210 may include product/service data 212 and economic data 214. The product/service data 212 may include data associated with products and/or services that are offered for acquisition by various organizations. The product/service data 212 may include descriptions of products and/or services, specifications of products and/or services, product manuals, pricing of products and/or services, number of sales of products and/or services, descriptions of organizations that provide various products and/or services, combinations thereof, and the like. The product/service data 212 may include customer product/service data 216 that includes information that is related to products and/or services offered by customers of the intellectual-property services provider. In some implementations, the customer product/service data 216 may be stored separately from product/service data of other organizations in the intellectual-property knowledge data store 120.

The economic data 214 may include information indicating financial performance of organizations offering products and/or services for acquisition. The financial performance information may include revenue of organizations over a period of time, profit of organizations over a period of time, expenses of organizations over a period of time, projections of financial performance, or combinations thereof. The economic data 214 may also include amount of revenue of organizations that corresponds to sales of one or more products and/or services. The economic data 214 may include customer economic data 218 that includes economic data that corresponds to customers of the intellectual-property services provider. In some implementations, the customer economic data 218 may be stored separately from economic data of other organizations in the intellectual-property knowledge data store 120.

Additionally, the economic data 204 may also include industry financial data. For example, the economic data 204 may include revenue, profit, expenses, and the like for certain industries that provide goods and/or services for acquisition, such as a retail industry, a semiconductor industry, or transportation industry. Further, the economic data 204 may include economic data of various states, counties, countries, or other political jurisdictions. To illustrate, the economic data 204 may include gross domestic product data, employment data, trade data, combinations thereof, and so forth. In some instances, the economic data 204 may indicate an amount of gross domestic product of a country or political jurisdiction attributed to one or more industry segments.

Further, the intellectual-property knowledge data store 120 may store at least one technology taxonomy 220. The technology taxonomy 220 may include a number of classifications for products and/or services. The technology taxonomy 220 may also include one or more criteria associated with individual classifications of the technology taxonomy 220. For example, to be classified according to a particular classification of the technology taxonomy 220, a product and/or service may correspond to at least a threshold number of criteria of a particular classification. In various implementations, the technology taxonomy 220 may indicate products and/or services that are associated with individual classifications. That is, products and/or services that have previously been assigned to a classification may be included in the technology taxonomy 220.

The technology taxonomy 220 may be generated by the intellectual-property mapping and learning system 104, in some implementations. In addition, in particular implementations, at least a portion of the technology taxonomy 220 may be generated by an additional organization. To illustrate, the technology taxonomy 220 may include classifications that are included in classification systems of governmental organizations and/or classification systems of industry organizations. In illustrative examples, at least a portion of the classifications of the technology taxonomy 220 may correspond to technology classifications of the United States Patent and Trademark Office. In other illustrative examples, at least a portion of the classifications included in the technology taxonomy 220 may correspond to technology classifications included in the International Patent Classification (IPC), the Locamo Classification, the Nice Classification, and/or the Vienna Classification.

In various implementations, the intellectual-property knowledge data store 120 may store intellectual property (IP) to products and/or services mappings 222. The IP to products and/or services mappings 222 may indicate intellectual-property assets or portions of intellectual-property assets that have been mapped to a product and/or service. In an illustrative example, the IP to products and/or services mappings 222 may indicate a claim of a patent document that corresponds to a feature of a mobile device, such as a microphone of the mobile device. In another illustrative example, the IP to products and/or services mappings 222 may indicate a trademark that corresponds to a remote data storage service. The IP to products/services mappings 222 may also indicate an organization that offers the respective products and/or services for acquisition. Additionally, the IP to products and/or services mappings 222 may indicate the owners of the intellectual-property assets mapped to particular products and/or services.

The IP to products and/or services mappings 222 may include customer mappings 224 that indicate mappings between products and/or services of customers of an intellectual-property services provider and intellectual-property assets of customers of the intellectual-property services provider. In additional implementations, the customer mappings 224 may include mappings between intellectual-property assets of customers of the intellectual-property services provider and products and/or services offered by organizations that are not customers of the intellectual-property services provider. Further, the customer mappings may include mappings between products and/or services offered by customers of the intellectual-property services provider and intellectual-property assets of organizations that are not customers of the intellectual-property services provider.

The intellectual-property knowledge data store 120 may also store previous customer service data 226. The previous customer service data 226 may include data that was generated by an intellectual-property services provider when providing services to one or more customers. For example, the previous customer service data 226 may include data generated by the intellectual-property services provider in providing the IP strategy-related services 128, the IP exposure-related services 130, and/or the IP valuation services 132 described in relation to FIG. 1. In illustrative examples, the previous customer service data 226 may include valuations of intellectual-property assets that were determined by the intellectual-property services provider. In additional illustrative examples, the previous customer service data 226 may include determinations of risk with respect to intellectual-property assets of customers of the intellectual-property services provider. In further illustrative examples, the previous customer service data 226 may include claim charts, strategic IP analyses, and/or portfolio analysis data generated by the intellectual-property services provider when providing services to customers. In certain implementations, the previous customer service data 226 may be utilized to provide subsequent services to customers of the intellectual-property services provider. In this way, the knowledge generated by the intellectual-property services provider may increase and be used to more efficiently and accurately provide services to customers of the intellectual-property services provider.

Figure 3:
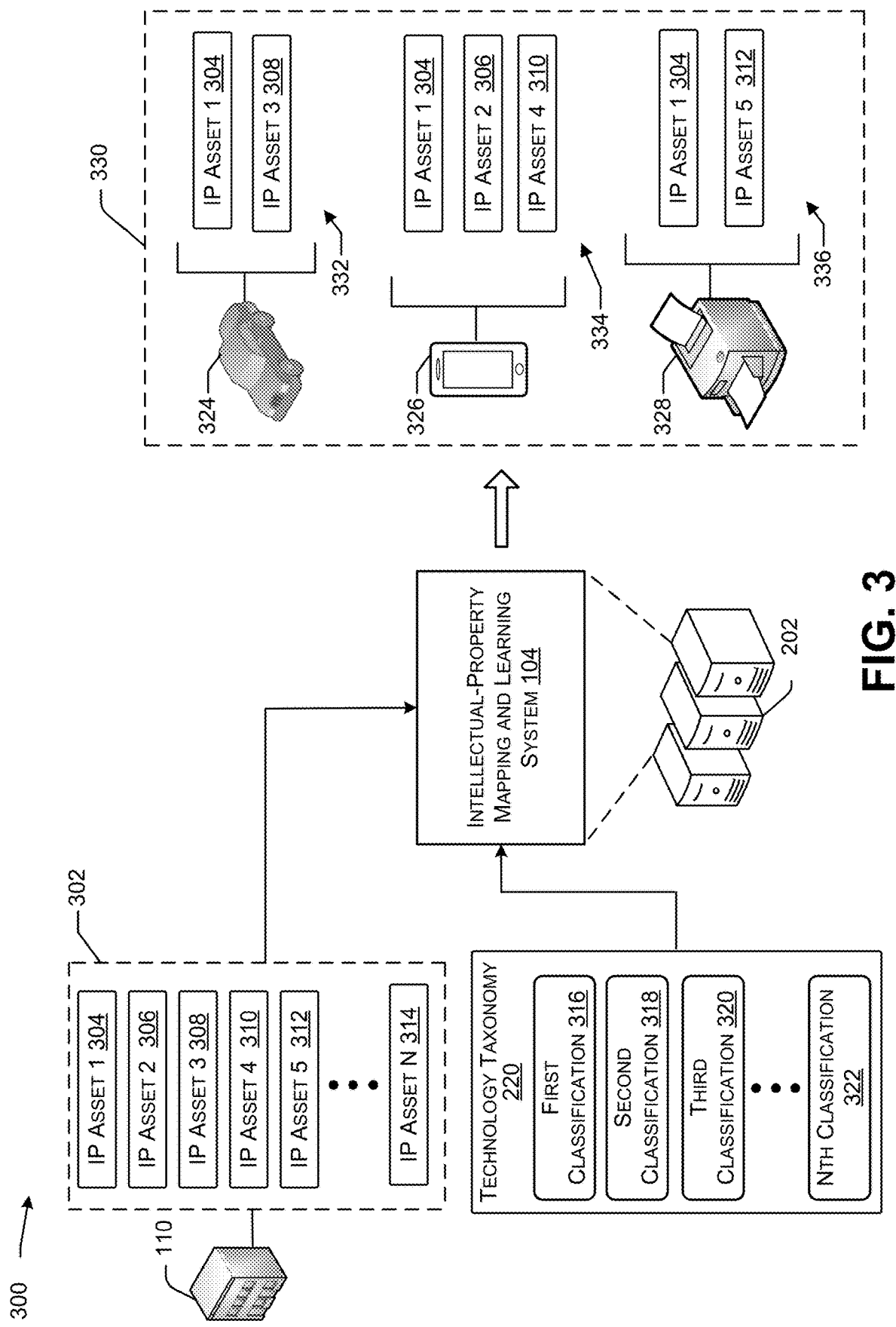
FIG. 3 illustrates an example environment to generate mappings between products and intellectual-property assets using a technology taxonomy according to some implementations.

FIG. 3 illustrates an example environment 300 to generate mappings between products and intellectual-property assets using a technology taxonomy according to some implementations. The environment 300 may include the intellectual-property mapping and learning system 104 that is implemented via one or more computing devices 202. The environment 300 may also include the customer 110 of the intellectual-property services provider and a group of intellectual-property assets 302 of the customer 110. The group of intellectual-property assets 302 may include a first IP asset 304, a second IP asset 306, a third IP asset 308, a fourth IP asset 310, a fifth IP asset 312, up to an Nth IP asset 314. The IP assets 304, 306, 308, 310, 312, 314 may include various types of intellectual property. For example, the IP assets 304, 306, 308, 310, 312, 314 may include trademarks, patents, trade secrets, copyrights, know-how, or other classifications of intellectual property. In additional examples, at least a portion of the IP assets 304, 306, 308, 310, 312, 314 may correspond to a portion of an intellectual-property asset, such as one or more claims of a set of claims of a patent document.

In various implementations, one or more of the IP assets 304, 306, 308, 310, 312, 314 may correspond to a different classification of intellectual property than at least another one of the IP assets 304, 306, 308, 310, 312, 314. For example, the first IP asset 304 may correspond to a trademark and the second IP asset 306 may correspond to a trade secret. Additionally, in some implementations, each of the IP assets 304, 306, 308, 310, 312, 314 may correspond to a same type of classification of intellectual property. To illustrate, the IP assets 304, 306, 308, 310, 312, 314 may each correspond to patents or patent applications, such as at least a portion of a patent portfolio of the customer 110. In another illustrative example, the IP assets 304, 306, 308, 310, 312, 314 may each correspond to claims of a patent or patent application. In an additional illustrative example, the IP assets 304, 306, 308, 310, 312, 314 may each correspond to trade secrets. In a further illustrative example, the IP assets 304, 306, 308, 310, 312, 314 may each correspond to trademarks. In other illustrative examples, the IP assets 304, 306, 308, 310, 312, 314 may each correspond to copyrights.

Additionally, the environment 300 may include the technology taxonomy 220 of FIG. 2. The technology taxonomy 220 may include a number of classifications, such as a first classification 316, a second classification 318, a third classification 320, up to an Nth classification 322. The individual classifications 316, 318, 320, 322 of the technology taxonomy 220 may be related to individual sets of criteria that characterize items associated with a particular classification of the technology taxonomy 220. At least one of intellectual-property assets, products, or services may be classified according to at least one classification of the technology taxonomy 220. In illustrative implementations, the intellectual-property mapping and learning system 104 may determine features of the first intellectual-property asset 304 and compare the features of the first intellectual-property asset 304 to the set of criteria of the first classification 316. In particular implementations, the intellectual-property mapping and learning system 104 may determine a metric indicating an amount of similarity between the features of the first intellectual-property asset 304 and the set of criteria of the first classification 316.

In various implementations, the amount of similarity between the features of the first IP asset 304 and the set of criteria of the first classification 316 may indicate a number of features of the first IP asset 304 that correspond to one or more criteria of the first classification 316. In illustrative implementations, the intellectual-property mapping and learning system 304 may determine the amount of similarity between a feature of the first IP asset 304 and the first classification 316 by comparing words of one or more features of the first IP asset 304 with words of the first classification 316. The intellectual-property mapping and learning system 304 may determine that a feature of the first IP asset 304 corresponds to the first classification 316 based on at least a threshold number of words of a feature of the first IP asset 304 corresponding to words of the first classification 316. In some scenarios, the intellectual-property mapping and learning system 304 may determine that a word of a feature of the first IP asset 304 corresponds to a word of the first classification when a spelling of the word of the first IP asset 304 is the same as a word of the first classification 316. In additional situations, the intellectual-property mapping and learning system 304 may determine that a word of a feature of the first IP asset 304 corresponds to a word of the first classification 316 based on the word of the first IP asset 304 being a synonym of the word of the first classification 316. In further examples, the intellectual-property mapping and learning system 104 may determine that a word of a feature of the first IP asset 304 corresponds to a word of the first classification 316 based on the word of the first IP asset 304 being a derivative of the word of the first classification 316. For example, the word of the first IP asset 304 may be a different tense of the word of the first classification 306. In other examples, the word of the first IP asset 304 may be a plural or singular version of the word of the first classification 316.

The intellectual-property mapping and learning system 104 may determine a first amount of similarity between a feature of the first IP asset 304 and the first classification 316 based on determining that a single feature of the first IP asset 304 corresponds to a single criteria of the first classification 316. Additionally, the intellectual-property mapping and learning system 104 may determine a second amount of similarity between the first IP asset 304 and the first classification 316 based on determining that two features of the first intellectual-property asset 304 correspond to at least one criteria of the first classification 316. In certain implementations, the intellectual-property mapping and learning system 104 may determine that the first IP asset 304 corresponds to the first classification 316 based on an amount of similarity between a feature of the first IP asset 304 and the criteria of the first classification 316 being above a threshold amount of similarity. In additional implementations, the intellectual-property mapping and learning system 104 may determine that the first IP asset 304 corresponds to the first classification based on an amount of similarity between a feature of the first IP asset 304 and the first classification 316 is greater than amounts of similarity between the feature of the first IP asset 304 and respective sets of criteria of the additional classifications of the technology taxonomy 220, such as the sets of criteria of the second classification 318, the third classification 320, up to the Nth classification 322.

The intellectual-property mapping and learning system 104 may also determine classifications of the technology taxonomy 220 for a number of products and/or services, such as a first product 324, a second product 326, and a third product 328. The intellectual-property mapping and learning system 104 may determine classifications of the technology taxonomy 220 for the products 324, 326, 328 themselves. In additional implementations, the intellectual-property mapping and learning system 104 may determine classifications of the technology taxonomy 220 that correspond to one or more features of the products 324, 326, 328. In an illustrative example, the intellectual-property mapping and learning system 104 may determine that the first product 324 corresponds to a transportation classification of the technology taxonomy 220, the second product 326 corresponds to a mobile communication device classification of the technology taxonomy 220, and the third product 328 corresponds to a printing device classification of the technology taxonomy 220. In additional illustrative examples, the intellectual-property mapping and learning system 104 may determine a classification for a feature common to the products 324, 326, 328, such as a display device included in the first product 324, a display device of the second product 326, and a display device of the third product 328. The intellectual-property mapping and learning system 104 may also determine classifications of additional individual features of the products 324, 326, 328 with respect to the technology taxonomy 220.

In particular implementations, the intellectual-property mapping and learning system 104 may determine classifications of the technology taxonomy 220 for the products 324, 326, 328 and/or features of the products 324, 326, 328 based at least partly on words describing the products 324, 326, 328 and/or words describing the features of the products 324, 326, 328 in relation to the sets of criteria of the classifications of the technology taxonomy 220, such as the respective sets of criteria of the classifications 316, 318, 320, 322. For example, the intellectual-property mapping and learning system 104 may determine an amount of similarity between descriptions of the products 324, 326, 328 and/or features of the products 324, 326, 328 and the criteria of the classifications of the technology taxonomy 220.

In illustrative implementations, the amount of similarity between a feature of the first product 324 and the set of criteria of the first classification 316 may indicate a number of words describing the feature of the first product 324 that correspond to one or more criteria of the first classification 316. That is, the intellectual-property mapping and learning system 104 may compare one or more words describing the feature of the first product 324 with words related to the first classification 316 and determine a number of words of the description of the feature of the first product 324 that correspond to words of one or more criteria of the first classification 316. The intellectual-property mapping and learning system 304 may determine that a word describing a feature of the first product 324 corresponds to a word associated with the first classification 316 when a spelling of the word of the feature of the first product 324 is the same as a word associated with the first classification 316. In additional situations, the intellectual-property mapping and learning system 104 may determine that a word describing a feature of the first product 324 corresponds to a word associated with the first classification 316 based on the word describing the feature of the first product 324 being a synonym of the word associated with the first classification 316. In further examples, the intellectual-property mapping and learning system 104 may determine that a word describing a feature of the first product 324 corresponds to a word associated with the first classification 316 based on the word describing the feature of the first product 324 being a derivative of the word associated with the first classification 316. For example, the word describing the feature of the first product 324 may be a different tense of the word associated with the first classification 306. In other examples, the word describing the feature of the first product 324 may be a plural or singular version of the word associated with the first classification 316.

The intellectual-property mapping and learning system 304 may determine that a feature of the first product 324 corresponds to the first classification 316 based on at least a threshold number of words describing the feature of the first product 324 corresponding to words associated with the first classification 316. In some scenarios, the intellectual-property mapping and learning system 104 may determine an amount of similarity between words describing a feature of the first product 324 and words associated with the first classification 316 to determine whether or not the features of the first product 324 is to be classified according to the first classification 316. In particular implementations, the intellectual-property mapping and learning system 104 may determine that a feature of the first product 324 corresponds to the first classification 316 based on an amount of similarity between words describing the feature of the first product 324 and words of the first classification 316 being above a threshold amount of similarity. In additional implementations, the intellectual-property mapping and learning system 104 may determine that a feature of the first product 324 corresponds to the first classification 316 based on an amount of similarity between words describing a feature of the first product 324 and words of the first classification 316 being greater than amounts of similarity between the words describing the feature of the first product 324 and words associated with the respective criteria of the additional classifications of the technology taxonomy 220, such as words associated with the sets of criteria of the second classification 318, the third classification 320, up to the Nth classification 322.

The intellectual-property mapping and learning system 104 may also determine mappings 330 between products and/or services and the group of intellectual-property assets 302. In particular implementations, the intellectual-property mapping and learning system 104 may utilize the technology taxonomy 220 to determine features of the group of IP assets 302 that correspond to features of one or more products and/or services. In various implementations, the intellectual-property mapping and learning system 104 may determine mappings between features of an intellectual-property asset included in the group of intellectual-property assets 302 and features of a product and/or service that are classified according to a same classification of the technology taxonomy 220. The mappings 330 may indicate that an intellectual-property asset may cover a feature of a product. In illustrative implementations, the mappings 330 may indicate that an intellectual-property asset may be asserted in a judicial proceeding and/or an administrative proceeding against the corresponding product.

The illustrative example of FIG. 3 includes a first mapping 332 between the first product 324 and a group of intellectual-property assets that includes the first IP asset 304 and the third IP asset 308. The mappings 330 may also include a second mapping 334 between the second product 326 and another group of intellectual-property assets that includes the first IP asset 304, the second IP asset 306, and the fourth IP asset 310. In addition, the mappings 330 may include a third mapping 336 between the third product 328 and an additional group of intellectual-property assets including the first IP asset 304 and the fifth IP asset 312.

The intellectual-property mapping and learning system 104 may determine the mappings 332, 334, 336 by determining similarities between the products 324, 326, 328 and/or features of the products 324, 326, 328 and the IP assets 304, 306, 308, 310, 312, 314 and/or features of the IP assets 304, 306, 308, 310, 312, 314. In particular implementations, the intellectual-property mapping and learning system 104 may determine mappings between features of intellectual-property assets 304, 306, 308, 310, 312, 314 and features of products 324, 326, 328 that are classified according to a same classification of the technology taxonomy 220. In various implementations, the intellectual-property mapping and learning system 104 may determine the mapping between a feature of the first IP asset 304 and a feature of the first product 324 by determining an amount of similarity between words of the feature of the first IP asset 304 and words describing the feature of the first product 324.

In an illustrative example, the intellectual-property mapping and learning system 104 may determine an amount of similarity between an element of a claim related to the first IP asset 304 and a feature of the first product 324. In another illustrative example, the intellectual-property mapping and learning system 104 may determine an amount of similarity between a trademark related to the first IP asset 304 and a word or group of words used in the marketing and branding of the first product 324. The intellectual-property mapping and learning system 104 may determine the amount of similarity between the first words of the feature of the first IP asset 304 and second words of a feature of the first product 324 by performing a comparison between the first words and the second words. The amount of similarity between the first words and the second words may be based on a number of words that are the same between the first words and the second words, a number of words that are synonyms between the first words and the second words, and/or a number of words that are derivatives between the first words and the second words.

In additional implementations, the intellectual-property mapping and learning system 104 may determine mappings between intellectual-property assets and products and/or services based at least partly on linguistic structures generated for the intellectual-property assets and linguistic structures generated for the products and/or services. The linguistic structures may indicate relationships between words of the intellectual-property assets and words describing the products. In various implementations, the intellectual-property mapping and learning system 104 may generate linguistic structures for features of the intellectual-property assets and generate linguistic structures for features of the products and compare the linguistic structures of the features of the intellectual-property assets and the features of the products.

In particular implementations, the intellectual-property mapping and learning system 104 may determine an amount of similarity between a linguistic structure of a feature of an intellectual-property asset and a linguistic structure of a feature of a product. In certain implementations, the intellectual-property mapping and learning system 104 may compare words included in the linguistic structure of the feature of the intellectual-property asset, such as a feature of the first intellectual-property asset 304, with words included in the linguistic structure of a feature of a product, such as a feature of the first product 324. Additionally, the intellectual-property mapping and learning system 104 may compare a configuration of the linguistic structure of the feature of the first intellectual-property asset 104 with a configuration of the linguistic structure of the feature of the first product 324. The configuration of the linguistic structure of the feature of the first intellectual-property asset 304 may indicate first relationships between words related to the feature of the first intellectual-property asset 304 and the configuration of the linguistic structure of the feature of the first product 324 may indicate relationships between words describing the feature of the first product 324. The intellectual-property mapping and learning system 104 may generate a mapping between a feature of an intellectual-property asset and a feature of a product based at least partly on an amount of similarity between a linguistic structure of the feature of the intellectual-property asset and a linguistic structure of a feature of the product being greater than a threshold amount of similarity.

Figure 4:
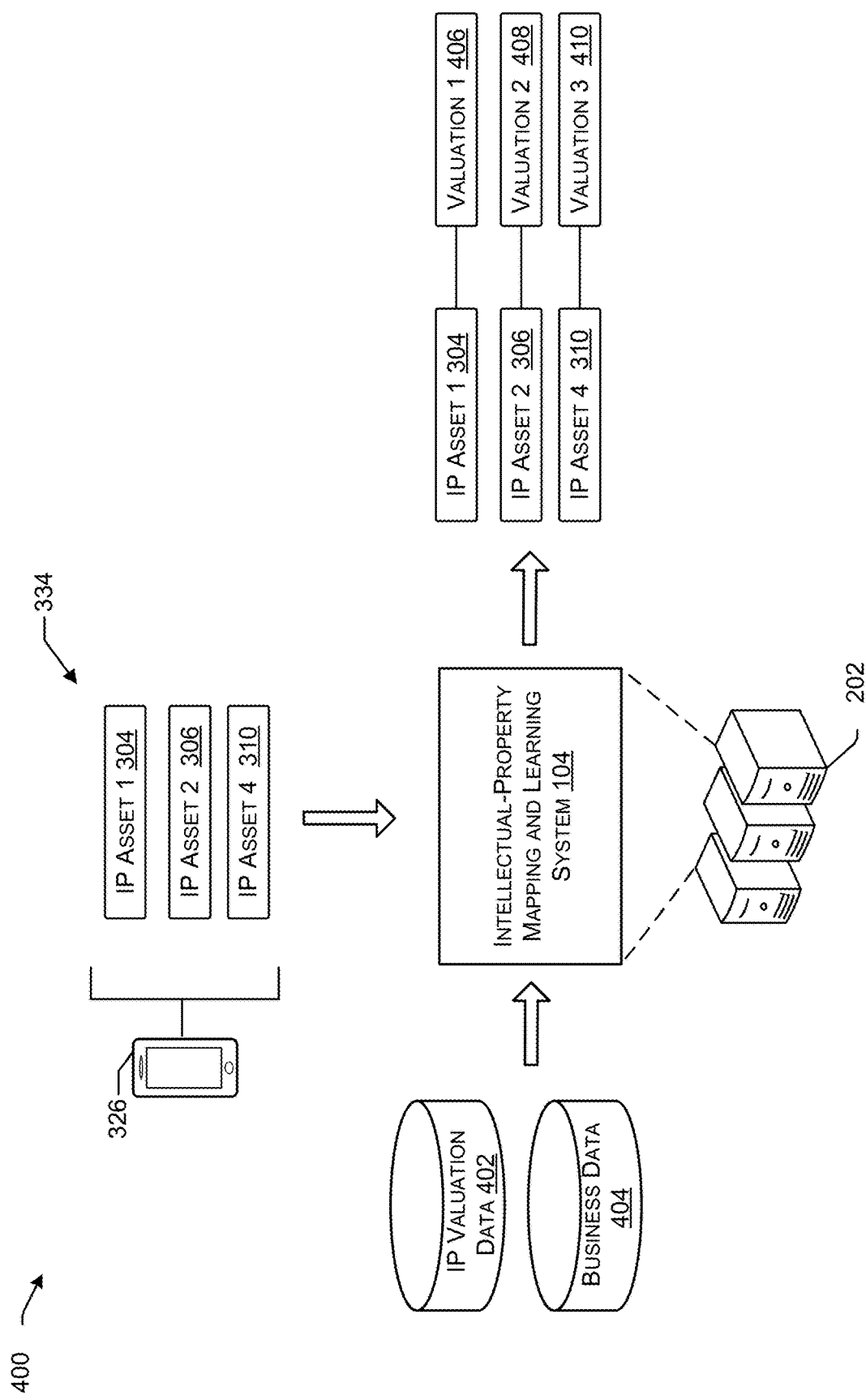
FIG. 4 illustrates an example system to generate valuations for intellectual-property assets according to some implementations.

FIG. 4 illustrates an example system 400 to generate valuations for intellectual-property assets according to some implementations. The system 400 may include the intellectual-property mapping and learning system 104 and one or more computing devices 202 that may implement the intellectual-property mapping and learning system 104. The system 400 may also include a first data store that stores intellectual-property (IP) valuation data 402 and a second data store that stores business data 404. The IP valuation data 402 and the business data 404 may include information corresponding to customers of an intellectual-property service provider. The IP valuation data 402 and the business data 404 may also include information corresponding to organizations that are not customers of the intellectual-property services provider.

The IP valuation data 402 may include information that may be used to determine values of intellectual-property assets. In particular implementations, the IP valuation data 402 may include verdicts indicating damages awarded during judicial proceedings related to intellectual-property assets. The IP valuation data 402 may also include amounts for licensing intellectual-property assets. In addition, the IP valuation data 402 may include amounts paid as part of settlements related to judicial proceedings and/or administrative proceedings that took place with regard to intellectual-property assets. The business data 404 may include information indicating revenue obtained by organizations with respect to products and/or services offered by the organizations. The business data 404 may also include other financial information related to organizations, such as overall revenue over a period of time, amount of revenue within a particular technology area over a period of time, profit obtained over a period of time, expenditures over a period of time, combinations thereof, and so forth. In various implementations, the expenditures included in the business data 404 may indicate expenditures of an organization to offer one or more products and/or services for acquisition to consumers.

The intellectual-property mapping and learning system 104 may utilize at least one of the IP valuation data 402 or the business data 404 to determine valuations for one or more intellectual-property assets. In an illustrative example, the intellectual-property mapping and learning system 104 may determine valuations for intellectual-property assets that corresponds to the second product 326 of FIG. 3. In particular, the intellectual-property mapping and learning system 104 may determine valuations for intellectual-property assets that are mapped to features of the second product 326, such as the first IP asset 304, the second IP asset 306, and the fourth IP asset 310. For example, the intellectual-property mapping and learning system 104 may determine a first valuation 406 for the first IP asset 304, a second valuation 408 for the second IP asset 306, and a third valuation 410 for the fourth IP asset 310. The valuations 406, 408, 410 may indicate a monetary value that the organization(s) that own the rights to the respective IP assets 304, 306, 310 may obtain from one or more additional organizations in exchange for rights to the IP assets 304, 306, 310. In various implementations, the valuations 406, 408, 410 may indicate one or more monetary values that the organization(s) that own the rights to the respective IP assets 304, 306, 310 may obtain in one or more licensing transactions that involve the IP assets 304, 306, 310. In additional implementations, the valuations 406, 408, 410 may indicate one or more monetary values that the organization(s) that own the rights to the respective IP assets 304, 306, 310 may obtain with respect to a sale of the IP assets 304, 306, 310. Further, the valuations 406, 408, 410 may indicate one or more monetary values of the respective IP assets 304, 306, 310 during a merger or an acquisition of an organization that owns the rights to the IP assets 304, 306, 310 with respect to an additional organization. In still other implementations, the valuations 406, 408, 410 may indicate one or more monetary values of the respective IP assets 304, 306, 310 as collateral for a loan to an organization that owns the rights to the IP assets 304, 306, 310.

The intellectual-property mapping and learning system 104 may determine valuations of intellectual-property assets by determining an amount of revenue of a product and/or service to attribute to the intellectual-property assets. In particular implementations, the intellectual-property mapping and learning system 104 may determine an amount of revenue of a product and/or service to attribute to an intellectual-property asset based at least partly on a breadth of the intellectual-property asset covering the product and/or service with respect to other intellectual-property assets included in a same classification of a framework of classifications, such as the technology taxonomy 220 of FIG. 2. In additional implementations, the intellectual-property mapping and learning system 104 may determine an amount of revenue of a product and/or service to attribute to an intellectual-property asset based at least partly on a breadth of an intellectual-property asset covering the product and/or service with respect to other intellectual-property assets covering the product and/or service.

Breadth of an intellectual-property asset may be determined based on word count of the intellectual-property asset and/or commonality of words of the intellectual-property asset. In particular implementations, the number of unique words and the frequency with which those words appear in other intellectual-property assets may be utilized to determine a breadth value for a given intellectual-property asset. For example, for a given intellectual-property asset, the word count of the intellectual-property asset is compared to the word count of other intellectual-property assets, such as a number of additional intellectual-property assets included in a same classification as the given intellectual-property asset or a number of additional intellectual-property assets covering a same product and/or service as the given intellectual-property asset. Additionally, a commonness score may be determined for a given intellectual-property asset based on the commonality of words in the intellectual-property asset as compared to the commonality of words in other intellectual-property assets.

In situations where a given intellectual-property asset is a patent claim, the breadth value of the claim may represent an estimated scope of an intellectual property right relative to other patent claims, such as other patent claims that cover a same product and/or service as the given patent claim or other patent claims that are classified according to a same classification as the given patent claim. In particular implementations, the breadth value of a patent claim may be based at least partly on a type of preamble included in the patent claim. For example, a patent claim including a preamble having a closed transition phrase may have a breadth value that is less than a patent claim including a preamble having an open transition phrase. Additionally, patent claims that include certain words, such as an absolute word, exemplary word, or relative word, may have lower breadth values than patent claims that do not include these types of words.

Word count may include the number of words of an intellectual-property asset or a portion of an intellectual-property asset. In various implementations, a word count may be determined after duplicate words are removed from an initial list of words included in the intellectual-property asset. In this way, the word count may be a count of unique words of an intellectual-property asset. Additionally, a word count may include a number of words of the intellectual-property asset after the removal of stop words. Stop words may include the most common words in a language. To illustrate, stop words may include short function words such as "the" "is," "at," "which," and "on," as well as others. The intellectual-property mapping and learning system 104 may have access to one or more lists of stop words for one or more languages. Further, a word count may be determined before or after converting acronyms and abbreviations into their full word representations. The word count may also include or exclude words in the preamble. In some implementations, a number of different word counts may be used to determine breadth of an intellectual-property asset, such as a first word count that includes a number of unique words and a second word count that excludes stop words.

Commonality of words may correspond to the frequency that a given word is found within a corpus of documents or within a group of intellectual-property assets. Words that have a higher commonality, that is words that are more common words within a corpus of words, may correspond to greater breadth while the presence of infrequently used words within a corpus of words may indicate reduced breadth. In the context of patent claims, words that are often found in the technical field are generally considered broader, or less limiting, than uncommon words.

In illustrative implementations, the intellectual-property mapping and learning system 104 may determine a breadth value of the first intellectual-property asset 304 relative to breadth values of other intellectual-property assets included in a same classification of the technology taxonomy 220 as the first intellectual-property asset 304. The intellectual-property mapping and learning system 104 may utilize the relative breadth score of the first intellectual-property asset 304 to determine a portion of the revenue of the second product 326 to attribute to the first intellectual-property asset 304. The intellectual-property mapping and learning system 104 may also determine an additional relative breadth score for the first intellectual-property asset 304 by determining an additional breadth value for the first intellectual-property asset 304 relative to breadth values of other intellectual-property assets that cover the second product 326, such as the second intellectual-property asset 306 and the fourth intellectual-property asset 310. In a particular illustrative example, the intellectual-property mapping and learning system 104 may determine that the portion of revenue of the second product 326 to attribute to the first intellectual-property asset 304 is 0.00625%.

In additional implementations, the intellectual-property mapping and learning system 104 may determine valuations for intellectual-property assets based on licensing information, settlement information, damages awards, or combinations thereof. For example, the intellectual-property mapping and learning system 104 may analyze the IP valuation data 402 to identify features of products and/or services that have been the subject of licensing deals, settlements, and/or damages awards that correspond to features of at least one intellectual-property asset that covers a product and/or service, such as the intellectual-property assets 304, 306, 310 that cover the second product 326. The intellectual-property mapping and learning system 104 may then determine valuations for one or more intellectual-property assets based on the monetary values of settlements, licensing deals, and/or damages awards regarding features of particular products and/or services that may correspond to the intellectual-property assets. In an illustrative example, the intellectual-property mapping and learning system 104 may identify a claim of the first intellectual-property asset 304 that includes at least one feature that has at least a threshold similarity to a feature of a product that was the subject of a damages award in a judicial proceeding. The intellectual-property mapping and learning system 104 may then determine the first valuation 406 based on the amount of similarity between the feature of the claim of the first IP asset 304 and the feature of the product that was the subject of the damages award.

In additional implementations, the intellectual-property mapping and learning system 104 may determine damages awards, licensing deals, and/or settlements related to a classification of products and/or services that corresponds to a classification of the first intellectual-property asset. The intellectual-property mapping and learning system 104 may then analyze the damages awards, licensing deals, and/or settlements of the products and/or services in the same classification as the first IP asset 304 to determine the first valuation 406. In particular implementations, the intellectual-property mapping and learning system 104 may determine an average amount of monetary value for settlements, damages awards, and/or licensing deals in a technology classification of the first IP asset 304 and determine the first valuation 406 based on the average amount of monetary value. Further, the intellectual-property mapping and learning system 104 may determine a similarity between at least one feature of the first IP asset 304 and features that were the subject of damages awards, settlements, and/or licensing deals in a same classification as the first IP asset 304. The intellectual-property mapping and learning system 104 may then determine a percentage or proportion of the damages awards, settlements, and/or licensing deals to allocate to the at least one feature of the first IP asset 304 based on the amount of similarity.

Figure 5:
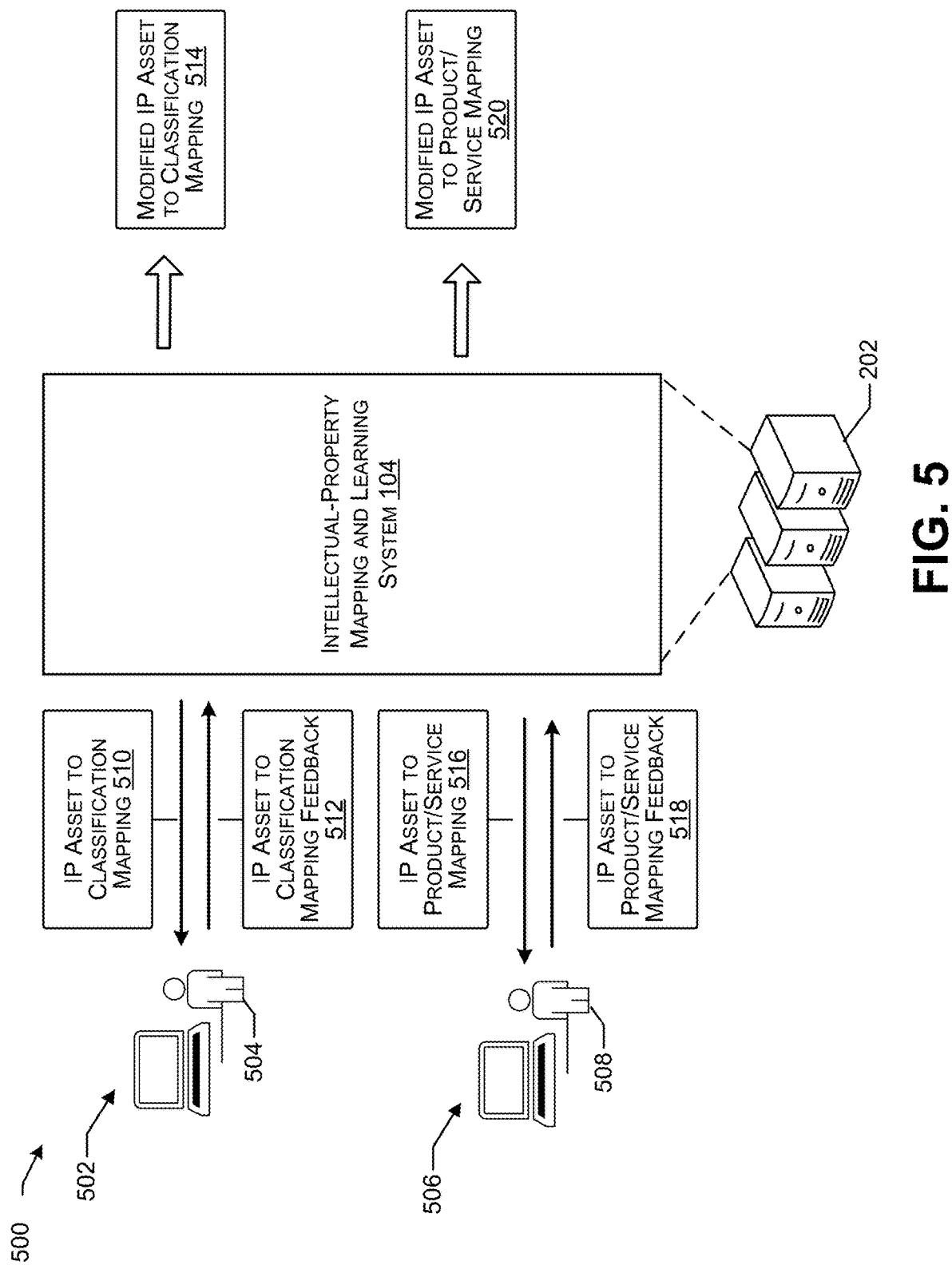
FIG. 5 illustrates an example system to modify mappings between intellectual property and taxonomy classifications and and/or between intellectual property and products/services according to some implementations.

FIG. 5 illustrates an example system 500 to modify mappings between intellectual property and taxonomy classifications and mappings between intellectual property and products/services according to some implementations. The system 500 may include the intellectual-property mapping and learning system 104 that is implemented by one or more computing devices 202. The system 500 may also include a first computing device 502 that is operated by a first user 504 and a second computing device 506 that is operated by a second user 508. In some implementations, at least one of the first user 504 or the second user 508 may be representatives of an intellectual-property services provider. In additional implementations, at least one of the first user 504 or the second user 508 may not be representatives of the intellectual-property services provider. For example, at least one of the first user 504 or the second user 508 may be a representative of another organization or part of a crowd-sourcing group. In various implementations, the first user 504 and the second user 508 may, via the first computing device 502 and the second computing device 506, respectively, provide input regarding mappings between intellectual-property assets and classifications of a technology classification system and/or provide input regarding mappings between intellectual-property assets and products and/or services.

In particular implementations, the intellectual-property mapping and learning system 104 may determine an IP asset to classification mapping 510. The IP asset to classification mapping may indicate that the IP asset has been classified according to a particular classification of a framework of classifications, such as the technology taxonomy 220 of FIG. 2. In an illustrative example, the IP asset to classification mapping 510 may indicate that a claim of a patent is classified according to a classification related to mobile device batteries. In another illustrative example, the IP asset to classification mapping 510 may indicate that a trademark is classified according to a classification related to an online gaming platform. The intellectual-property mapping and learning system 104 may send the IP asset to classification mapping 510 to the first computing device 502 in conjunction with a request for input regarding the IP asset to classification mapping 510. The request for input may be directed to an inquiry whether the classification of the IP asset is correct or not. In various implementations when the IP asset to classification mapping 510 is not correct, the request for input may ask for a different classification to assign to the IP asset.

In certain implementations, the intellectual-property mapping and learning system 104 may generate one or more user interfaces that may be displayed by the first computing device 502 and may include at least one user interface element to capture input from the first user 504 regarding the IP asset to classification mapping 510. For example, the one or more user interfaces may include at least one user interface element to capture input indicating that the IP asset to classification mapping 510 is to be modified, at least one user interface element to capture input indicating that the IP asset to classification mapping 510 is not to be modified, at least one user interface element to capture input indicating a different classification for the IP asset, or combinations thereof. The first user 504 may provide IP asset to classification mapping feedback 512 to the intellectual-property mapping and learning system 104 via the one or more user interfaces.

The intellectual-property mapping and learning system 104 may analyze the IP asset to classification mapping feedback 512 to determine whether the IP asset to classification mapping 510 is to be modified. To illustrate, the intellectual-property mapping and learning system 104 may analyze the IP asset to classification mapping feedback 512 to determine whether the IP asset to classification mapping feedback 512 indicates that the IP asset to classification mapping 510 is correct or whether the IP asset is to be classified according to a different classification. The intellectual-property mapping and learning system 104 may utilize the IP asset to classification mapping feedback 512 to modify a framework of classifications. For example, the intellectual-property mapping and learning system 104 may modify one or more criteria of a classification of the framework of classifications based on the IP asset to classification mapping feedback 512. In an illustrative example, the intellectual-property mapping and learning system 104 may add one or more criteria or remove one or more criteria from a classification based on the IP asset to classification mapping feedback 512 indicating that the IP asset to classification mapping 510 is to be modified.

In additional illustrative examples, the intellectual-property mapping and learning system 104 may modify a model that determines classifications of IP assets based on the IP asset to classification mapping feedback 512. The model may include a number of factors and respective weightings of factors that may be used to determine classifications of IP assets. In particular implementations, the model may be generated using one or more machine learning techniques. In various implementations, the intellectual-property mapping and learning system 104 may modify a model utilized to determine classifications of IP assets by removing one or more factors included in the model, adding one or more factors to the model, modifying weightings of one or more factors included in the model, or combinations thereof.

In the illustrative example of FIG. 5, the intellectual-property mapping and learning system 104 may determine a modified IP asset to classification mapping 514. The modified IP asset to classification mapping 514 may indicate that the IP asset is associated with a different classification than the classification for the IP asset in the IP asset to classification mapping 510. The intellectual-property mapping and learning system 104 may determine a different classification for the IP asset based on the IP asset to classification mapping feedback 512. For example, in situations where the IP asset to classification mapping feedback 512 indicates that the classification of the IP asset is to be modified to a particular, different classification, the intellectual-property mapping and learning system 104 may change the classification of the IP asset to the classification indicated in the IP asset to classification mapping feedback 512. In additional implementations, the intellectual-property mapping and learning system 104 may analyze the input included in the IP asset to classification mapping feedback 512 to modify a model that determines classifications of IP assets and then implement the modified model with respect to the IP asset. The modified model may then generate the modified IP asset to classification mapping 514.

Additionally, the intellectual-property mapping and learning system 104 may determine an IP asset to product/service mapping 516. The IP asset to product/service mapping 516 may indicate that at least a portion of the IP asset covers at least a portion of a product and/or service. For example, the IP asset to product/service mapping 516 may indicate that a claim of a patent covers a user interface feature of an audio application executed by a mobile communication device. In another example, the IP asset to product/service mapping 516 may indicate that a trade secret corresponds to a process of manufacturing a food product. The intellectual-property mapping and learning system 104 may send the IP asset to product/service mapping 516 to the second computing device 506 to request input from the second user 508 regarding the IP asset to product/service mapping 516. The request for input may be directed to an inquiry whether the mapping between the IP asset and the product/service is correct or not. In various implementations when the IP asset to product/service mapping 516 is not correct, the request for input may ask for a different product/service to assign to the IP asset.

The intellectual-property mapping and learning system 104 may generate one or more user interfaces that may be displayed by the second computing device 506 and may include at least one user interface element to capture input from the second user 508 regarding the IP asset to product/service mapping 516. For example, the one or more user interfaces may include at least one user interface element to capture input indicating that the IP asset to product/service mapping 516 is to be modified, at least one user interface element to capture input indicating that the IP asset to product/service mapping 516 is not to be modified, at least one user interface element to capture input indicating a different product/service that corresponds to the IP asset, or combinations thereof. The second user 508 may provide IP asset to product/service mapping feedback 518 to the intellectual-property mapping and learning system 104 via the one or more user interfaces.

The intellectual-property mapping and learning system 104 may analyze the IP asset to product/service mapping feedback 518 to determine whether the IP asset to product/service mapping 516 is to be modified. To illustrate, the intellectual-property mapping and learning system 104 may analyze the IP asset to product/service mapping feedback 518 to determine whether the IP asset to product/service mapping feedback 518 indicates that the IP asset to product/service mapping 516 is correct or whether the IP asset is to be associated with another product and/or service. The intellectual-property mapping and learning system 104 may utilize the IP asset to product/service mapping feedback 518 to modify a framework of classifications. For example, the intellectual-property mapping and learning system 104 may modify one or more criteria of a classification of the framework of classifications based on the IP asset to product/service mapping feedback 518. In an illustrative example, the intellectual-property mapping and learning system 104 may add one or more criteria or remove one or more criteria from a classification of a framework of classifications based on the IP asset to product/service mapping feedback 518 indicating that the IP asset to product/service mapping 516 is to be modified.

Further, the intellectual-property mapping and learning system 104 may modify a model that determines products and/or services that correspond to IP assets based on the IP asset to product/service mapping feedback 518. The model may include a number of factors and respective weightings of factors that may be used to determine products and/or services that are covered by IP assets. The model may be generated using one or more machine learning techniques. In particular implementations, the intellectual-property mapping and learning system 104 may modify a model utilized to determine products and/or services covered by IP assets by removing one or more factors included in the model, adding one or more factors to the model, modifying weightings of one or more factors included in the model, or combinations thereof.

In the illustrative example of FIG. 5, the intellectual-property mapping and learning system 104 may determine a modified IP asset to product/service mapping 520. The modified IP asset to product/service mapping 520 may indicate that the IP asset is associated with a different product and/or service than the product and/or service associated with the IP asset in the IP asset to product/service mapping 516. The intellectual-property mapping and learning system 104 may determine a different product and/or service covered by the IP asset based on the IP asset to product/service mapping feedback 518. For example, in situations where the IP asset to product/service mapping feedback 518 indicates that the product and/or service associated with the IP asset is to be modified to be associated with a different product and/or service, the intellectual-property mapping and learning system 104 may change the product and/or service associated with the IP asset to the product and/or service indicated in the IP asset to product/service mapping feedback 518. In additional implementations, the intellectual-property mapping and learning system 104 may analyze the input included in the IP asset to product/service mapping feedback 518 to modify a model that determines products and/or services covered by IP assets and then implement the modified model with respect to the IP asset. The modified model may then generate the modified IP asset to product/service mapping 520.

Figure 6:
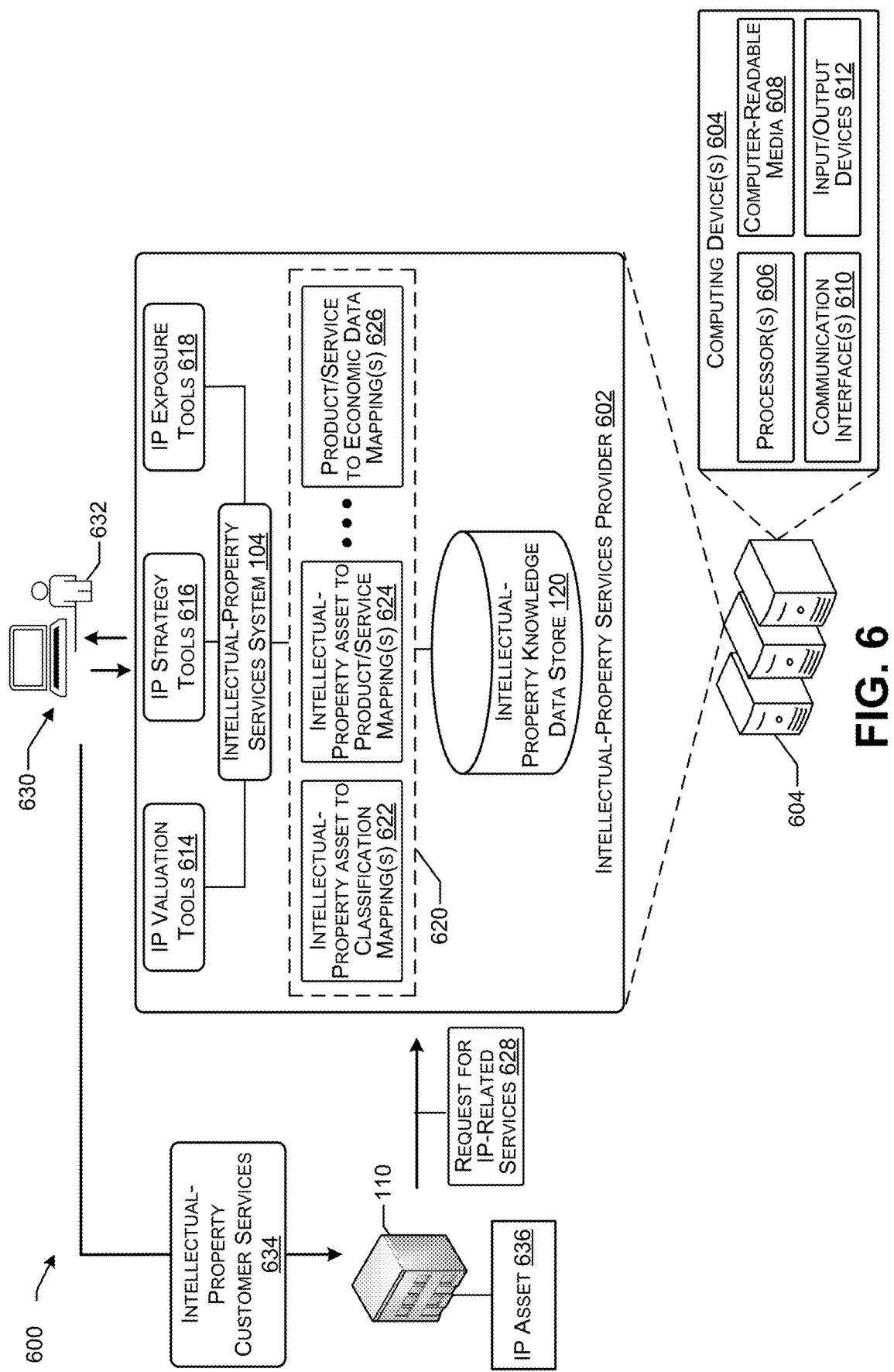
FIG. 6 illustrates an example architecture to provide services to customers using mappings between intellectual property and products/services in relation to a classification system according to some implementations.

FIG. 6 illustrates an example architecture 600 to provide intellectual property related services to customers using mappings between intellectual property and products/services in relation to a classification system according to some implementations. The architecture 600 may include an intellectual-property services provider 602. The intellectual-property services provider 602 may provide services to customers, such as the customer 110, that are related to intellectual-property assets. The intellectual-property assets may be associated with the customers of the intellectual-property services provider 602, in some scenarios. For example, customers of the intellectual-property services provider 602 may request that the intellectual-property services provider 602 provide one or more services with regard to intellectual-property assets for which the customers of the intellectual-property services provider 602 hold the ownership rights. In additional examples, the customers of the intellectual-property services provider 602 may request that the intellectual-property services provider 602 provide services with regard to intellectual-property assets with ownership rights held by organizations that are not customers of the intellectual-property services provider 602.

At least a portion of the operations performed by the intellectual-property services provider 602 may be performed by one or more computing devices 604. The one or more computing devices 604 may be any suitable type of computing device, e.g., portable, semi-portable, semi-stationary, or stationary. Some examples of the one or more computing devices 604 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

The one or more computing devices 604 may include one or more servers or other types of computing devices that can be embodied in any number of ways. For example, in the example of a server, the modules, other functional components, and data may be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the one or more computing devices 604 as being present in a single location, these components and data can alternatively be distributed across different computing devices and different locations in any manner. Consequently, the functions performed by the one or more computing devices 604 may be implemented by one or more server computing devices, with the various functionality described above distributed in various ways across the different computing devices. Multiple computing devices 604 may be located together or separately, and organized, for example, as virtual servers, server banks and/or server farms. The described functionality may be provided by the servers of an intellectual-property services provider, or may be provided by the servers and/or services of multiple different organizations.

In the illustrated example, the one or more computing devices 604 may include one or more processors 606, one or more computer-readable media 608, one or more communication interfaces 610, and one or more input/output devices 612. Each processor 606 may be a single processing unit or a number of processing units, and may include single or multiple computing units or multiple processing cores. The processor(s) 606 may be implemented as one or more microprocessors, microcomputers, microcontrollers, digital signal processors, central processing units, state machines, logic circuitries, and/or any devices that manipulate signals based on operational instructions. For example, the processor(s) 606 may be one or more hardware processors and/or logic circuits of any suitable type specifically programmed or configured to execute the algorithms and processes described herein. The processor(s) 606 may be configured to fetch and execute computer-readable instructions stored in the computer-readable media 608, which can program the processor(s) 606 to perform the functions described herein.

The computer-readable media 608 may include volatile and nonvolatile memory and/or removable and non-removable media implemented in any type of technology for storage of information, such as computer-readable instructions, data structures, program modules, or other data. Such computer-readable media 608 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that may be used to store the desired information and that may be accessed by a computing device. Depending on the configuration of the one or more computing devices 604, the computer-readable media 608 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 608 may be used to store any number of functional components that are executable by the processor(s) 606. In many implementations, these functional components comprise instructions or programs that are executable by the processor(s) 606 and that, when executed, specifically configure the one or more processors 606 to perform the actions attributed above to the intellectual-property services provider 602. Functional components stored in the computer-readable media 608 may include the intellectual-property services system 104, the data acquisition system 118, the language analysis system 122, the IP knowledge model development system 124, intellectual property (IP) valuation tools 614, IP strategy tools 616, and IP risk tools 616. The computer-readable media 608 may also store the data of the intellectual-property knowledge data store 120.

In at least one example, the computer-readable media 608 may include or maintain other functional components and data, such as other modules and data, which may include programs, drivers, one or more operating systems, etc., and the data used or generated by the functional components. Further, the one or more computing devices 604 may include many other logical, programmatic and physical components, of which those described above are merely examples that are related to the discussion herein.

The communication interface(s) 610 may include one or more interfaces and hardware components for enabling communication with various other devices, such as over one or more network(s). For example, communication interface(s) 610 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The one or more computing devices 604 may further be equipped with various input/output (I/O) devices 612. The I/O devices 612 can include speakers, a microphone, a camera, a display (e.g., a liquid crystal display, a plasma display, a light emitting diode display, an OLED (organic light-emitting diode) display, an electronic paper display, or any other suitable type of display able to present digital content thereon), and various user controls (e.g., buttons, a joystick, a keyboard, a keypad, etc.), a haptic output device, and so forth. Further, in particular implementations, the one or more computing devices 604 may include one or more sensors, such as an accelerometer, gyroscope, compass, proximity sensor, camera, microphone, and/or a switch, a GPS sensor, etc.

In particular implementations, the intellectual-property services provider 602 may generate various mappings 620 that may be used to provide intellectual property related services to customer of the intellectual-property services provider 602 For example, the mappings 620 may include one or more intellectual-property asset to classification mappings 622. The individual intellectual-property classification mappings 622 may indicate a relationship between an intellectual-property asset and a classification of a classification framework, such as a classification of the technology taxonomy 220. Additionally, the mappings 620 may include one or more intellectual-property asset to product/service mappings 624. The individual intellectual-property asset to product/service mappings 624 may indicate a relationship between an intellectual-property asset and a product and/or service. Further, the mappings 620 may include one or more product/service to economic data mappings 626. The individual product/service to economic data mappings 626 may indicate specific economic data that is related to at least one product or service. To illustrate, a product/service to economic data mapping 626 may indicate revenue of a product and/or service.

The intellectual-property services provider 602 may receive requests for IP-related services and the intellectual-property services system 104 may utilize the mappings, data stored by the intellectual-property knowledge data store, and/or additional information, such as one or more classification frameworks, to provide the services associated with the request. For example, the intellectual-property services provider 602 may receive requests from customers to obtain services related to intellectual property valuation, intellectual property strategy, and intellectual property risk. In particular implementations, the intellectual-property services provider 602 may utilize the IP valuation tools 614 to provide intellectual property valuation services to customers. The IP valuation tools 614 may include at least one of one or more user interfaces, one or more scripts, or one or more applications that may be used to analyze data related to intellectual-property assets and provide information corresponding to the values of intellectual-property assets of customers of the intellectual-property services provider 602. Additionally, the intellectual-property services provider 602 may utilize IP strategy tools 616 to provide IP strategy services to customers. The IP strategy tools 616 may include at least one of one or more user interfaces, one or more scripts, or one or more applications that may be used to analyze data related to intellectual-property assets and provide strategy related information to the customers of the intellectual-property services provider 602. Further, the intellectual-property services provider 602 may utilize the IP exposure tools 618 to provide IP risk services to customers. The IP exposure tools 618 may include at least one of one or more user interfaces, one or more scripts, or one or more applications that may be used to analyze data related to intellectual-property assets and provide risk related information to the customers of the intellectual-property services provider 602.

In an illustrative implementation, the customer 110 may send a request for IP-related services 628 to the intellectual-property services provider 602. The request for IP-related services 628 may be sent electronically to the intellectual-property services provider 602. For example, the customer 110 may send a communication, such as an email or message, to the intellectual-property services provider 602 that includes the request for IP-related services 628. In additional examples, the customer 110 may access one or more user interfaces provided by the intellectual-property services provider 602 to generate the request for IP-related services 628. The intellectual-property services provider 602 may communicate one or more aspects of the request for IP-related services 628 to an additional computing device 630 that is operated by a user 632. The user 632 may be a representative of the intellectual-property services provider 602. In particular implementations, the request for IP-related services 628 may include a number of aspects, such as requests for one or more IP valuation services, for one or more IP strategy services, and/or one or more IP risk services. Individual aspects of the request may be provided to a single representative of the intellectual-property service provider 602 or to a number of representatives of the intellectual-property services provider 602. In particular illustrative implementations, the request for IP-related services 628 may include a first request for valuations of a portfolio of intellectual-property assets, a second request for a patent landscape analysis related to an electronic device manufactured by the customer 110, a third request for a risk assessment related to invalidation of a number of intellectual-property assets of the customer 110, and a fourth request for a trade secret theft assessment related to trade secrets of the customer 110. In this scenario, the intellectual-property services provider 602 may, in some instances, assign the user 632 to provide services related to the first request, the second request, the third request, and the fourth request. In additional instances, the intellectual-property services provider 602 may assign the user 632 to provide services related to one of the first request, the second request, the third request, or the fourth request, and assign the tasks related to providing services associated with the remaining requests to other representatives of the intellectual-property services provider 602.

In a situation where the user 632 is assigned to perform services related to the valuation of intellectual-property assets, the user 632 may operate the additional computing device 630 to access the IP valuation tools 614. In various implementations, the intellectual-property services provider 602 may obtain identifiers of the intellectual-property assets for which the valuations are being determined from the additional computing device 630. The identifiers may include identifiers provided by intellectual property jurisdictions (e.g., EPO, USPTO, JPO, etc.), such as application numbers, registration numbers, patent numbers, publication numbers, or combinations thereof. The identifiers may also include titles of intellectual-property assets. Further, the identifiers may be alphanumeric strings generated by the intellectual-property services provider 602 that correspond to individual intellectual-property assets. In addition, the intellectual-property services provider 602 may obtain a situation or type of valuation to be determined. For example, the intellectual-property services provider 602 may receive information from the additional computing device 630 indicating that at least one of a valuation is to be determined for the sale of the intellectual-property assets of the customer 110, a valuation is to be determined for the licensing of the intellectual-property assets of the customer 110, or a valuation is to be determined for the intellectual-property assets of the customer 110 to be used as collateral for a loan.

After obtaining input from the additional computing device 630 via the IP valuation tools 614, the intellectual-property services system 104 may access the mappings 620, data stored by the intellectual-property knowledge data store 120, models generated by the intellectual-property services provider 602, machine learning algorithms, or combinations thereof, to provide intellectual property customer services 634 associated with the valuation of intellectual-property assets requested by the customer 110. Depending on the type of valuation being performed and the amount of information that the intellectual-property services provider 602 has already obtained with respect to the intellectual-property assets of the customer 110 for which valuations are being performed, the intellectual-property services system 104 may access one or more of the intellectual-property asset to classification mappings, 622, the intellectual-property asset to product/service mappings 624, or the product/service to economic data mappings 626 to determine valuations for the intellectual-property assets of the customer 110 that are the subject of the request for IP-related services 628.

In additional situations where the user 632 is assigned to perform strategy related services for intellectual-property assets of the customer 110, the user 632 may operate the additional computing device 630 to access the IP strategy tools 616. In these situations, the intellectual-property services system 104 may obtain identifiers of intellectual-property assets from the additional computing device, as well as indications of the type of strategy related services to provide. The intellectual-property services system 104 may then access the mappings 620, data stored by the intellectual-property knowledge data store 120, models generated by the intellectual-property services provider 602, machine learning algorithms, or combinations thereof, to provide intellectual-property customer services 634 to the customer 110 related to the IP strategy services requested by the customer 110.

In further scenarios where the user 632 is assigned to perform risk related services for intellectual-property assets of the customer 110, the user 632 may operate the additional computing device 630 to access the IP risk tools 618. In these situations, the intellectual-property services system 104 may obtain identifiers of intellectual-property assets from the additional computing device, as well as indications of the type of risk related services to provide. The intellectual-property services system 104 may then access the mappings 620, data stored by the intellectual-property knowledge data store 120, models generated by the intellectual-property services provider 602, machine learning algorithms, or combinations thereof, to provide intellectual-property customer services 634 to the customer 110 related to the IP risk services requested by the customer 110.

In an illustrative implementation, the intellectual-property services provider 602 may receive the request for IP-related services 628 from the customer 110, and the request for IP-related services 628 may include a request for valuation of an intellectual-property asset 636 of the customer 110. The intellectual-property services provider 602 may provide the request for valuation of the intellectual-property asset 636 to the additional computing device 630. In response to the request for valuation services, the user 632 may operate the additional computing device 630 to access the IP valuation tools 614. The IP valuation tools 614 may generate one or more user interfaces that include one or more user interface elements to capture information that may be used by the intellectual-property services provider 602 to determine a valuation for the IP asset 636. In various implementations, the IP valuation tools 614 may include a user interface element to capture an identifier of the IP asset 636 and a type of valuation to be determined. In a particular illustrative example, the IP asset 636 may be a US patent and the additional computing device 630 may obtain an identifier of the IP asset 636, such as a patent number of the IP asset 636, and input indicating that the type of valuation corresponds to a sale of the IP asset 636.

Based on the input obtained from the additional computing device 630, the intellectual-property services system 104 may determine whether the mappings 620 include one or more mappings related to the IP asset 636. For example, the intellectual-property services system 104 may have previously determined a classification related to the IP asset 636 and generated an intellectual-property asset to classification mapping 622 for the IP asset 636. In another example, the intellectual-property services system 104 may have previously determined a product and/or service that corresponds to the IP asset 636 and generated an intellectual-property asset to product/service mapping 624 for the IP asset 636. In additional examples, the intellectual-property services system 104 may have previously determined economic data that corresponds to the IP asset 636 and generated a product/service to economic data mapping 626. In these situations, one or more of the mappings 620 related to the IP asset 636 may be stored by the intellectual-property knowledge data store 120 and the intellectual-property services system 104 may utilize the identifier of the IP asset 636 to retrieve the mappings 620 that correspond to the IP asset 636. In situations where the mappings 620 do not include one or more mappings used to determine the valuation of the IP asset 636, the intellectual-property services system 104 may generate at least one of an intellectual-property asset to classification mapping 622 for the IP asset 636, an intellectual-property asset to product/service mapping 624 for the IP asset 636, or a product/service to economic data mapping 626 for the IP asset 636.

Continuing with the illustrative example from above, the intellectual-property services system 104 may determine an intellectual-property asset to classification mapping 622 for the IP asset 636 to determine a classification of the IP asset 636. The intellectual-property services system 104 may then identify additional intellectual-property assets having the same classification as the IP asset 636. The intellectual-property services system 104 may determine the breadth of the intellectual-property asset 636 with respect to the breadth of the other intellectual-property assets included in the same classification of the IP asset 636. The breadth of the IP asset 636 relative to the breadth of additional IP assets in the same classification as the IP asset 636 may be used to determine the valuation of the IP asset 636. In various implementations, the intellectual-property services system 104 may also obtain licensing data, damages awards, and/or settlement data for additional intellectual-property assets included in the same classification as the IP asset 636 and utilize the data to determine a valuation for the IP asset 636.

Additionally, the intellectual-property services system 104 may determine an intellectual-property asset to product/service mapping 624 for the IP asset 636 that indicates a product and/or service that corresponds to the IP asset 636. In some situations, the intellectual-property services system 104 may identify multiple intellectual-property asset to product/service mappings 624 related to the IP asset 636. In particular implementations, revenue related to one or more of the products and/or services corresponding to the IP asset 636 may be used to determine the valuation of the IP asset 636. Further, the intellectual-property services system 104 may determine a product/service to economic data mapping 626 for the IP asset 636. The product/service to economic data mapping 626 for the IP asset 636 may indicate the financial data associated with the one or more products and/or services corresponding to the IP asset 636 and may be used by the intellectual-property services system 104 to determine a valuation for the IP asset 636 in response to the request received from the additional computing device 630

In particular implementations, the intellectual-property services system 104 may generate one or more user interfaces that include one or more valuations for the IP asset 636 and make the one or more user interfaces accessible to the additional computing device 630. In certain implementations, the intellectual-property services system 104 may provide a notification to the additional computing device 630, such as an email, message, and the like, to indicate that the one or more valuations for the IP asset 636 have been determined.

In addition, the intellectual-property services system 104 may provide access to the mappings 620 related to the IP asset 636. In these situations, the user 632 may utilize additional computing device 630 to provide input regarding the mappings 620 to use in determining one or more valuations for the IP asset 636. In an illustrative example, the intellectual-property services system 104 may provide a first intellectual-property asset to classification mapping indicating that the IP asset 636 is associated with a first classification and a second intellectual-property asset to classification mapping indicating that the IP asset 626 is associated with a second classification. The additional computing device 630 may send input to the intellectual-property services provider 602 indicating selection of the first intellectual-property asset to classification mapping or the second intellectual-property asset to classification mapping. The intellectual-property services system 604 may also provide multiple intellectual-property asset to product/service mappings 624 related to the IP asset 636 to the additional computing device 630 and obtain input from the additional computing device 630 indicating at least one intellectual-property asset to product/service mapping 624 to utilize to determine a valuation for the IP asset 636. Further, the intellectual-property services system 104 may provide multiple product/service to economic data mappings 626 corresponding to one or more products and/or services related to the IP asset 636 to the additional computing device 630 and obtain input from the additional computing device 630 indicating at least one product/service to economic data mapping 626 to utilize to determine a valuation for the IP asset 636.

Figure 7:
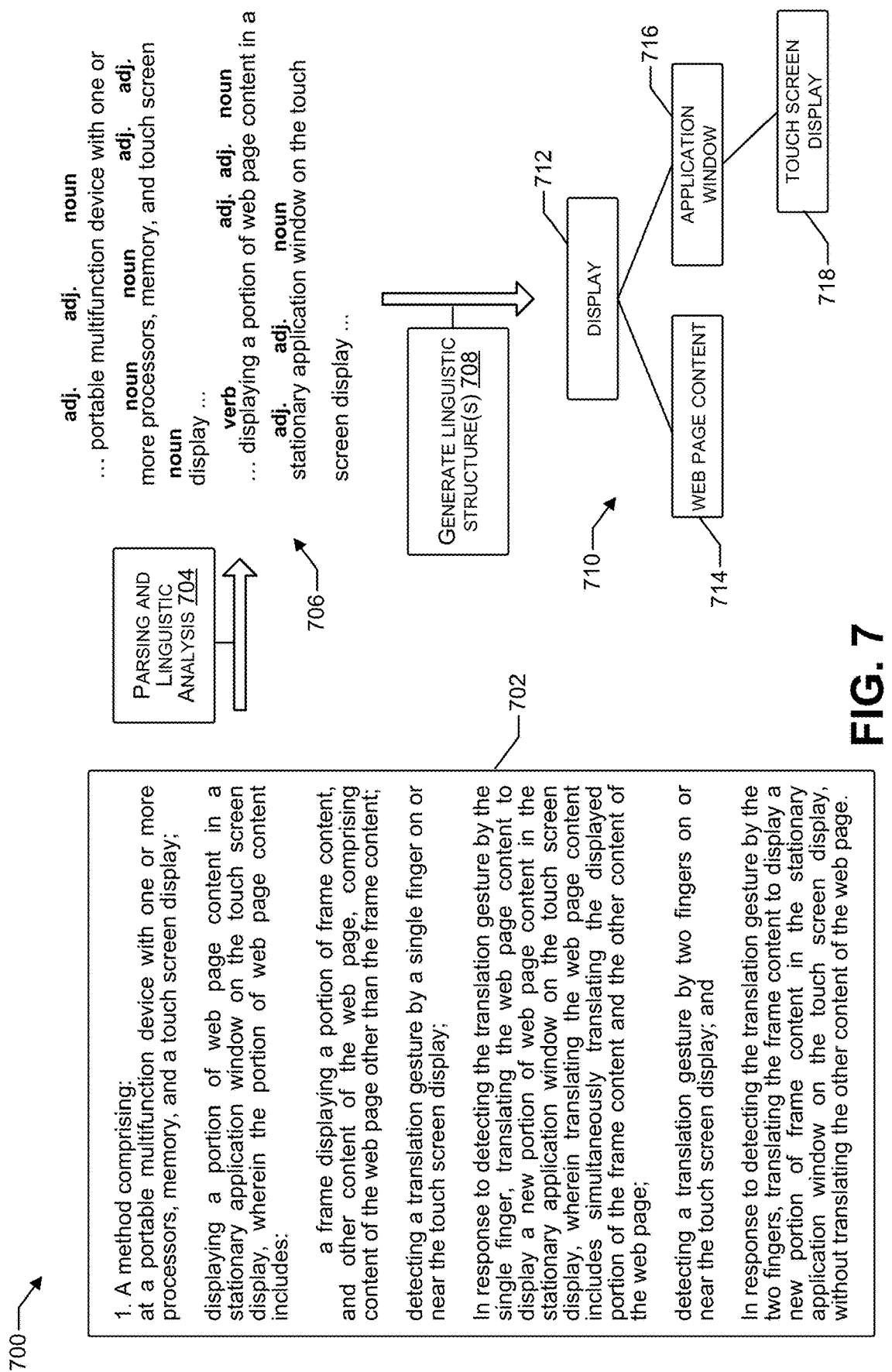
FIG. 7 illustrates an example framework to generate linguistic structures for claims of patent documents according to some implementations.

FIG. 7 illustrates an example framework 700 to generate linguistic structures for claims of patent documents according to some implementations. The framework 700 includes an intellectual-property asset 702. In the illustrative example of FIG. 7, the intellectual-property asset 702 is a claim of a patent or patent application. At 704, a parsing and linguistic analysis 704 may be performed with respect to the intellectual-property asset 702. In various implementations, the parsing and linguistic analysis 704 may be performed by the intellectual-property services system 104. In particular implementations, the parsing and linguistic analysis 704 may include identifying words of the intellectual-property asset 702 and categorizing the words of the intellectual-property asset. In illustrative examples, the parsing and linguistic analysis 704 may generate a linguistic analysis 706 for the intellectual-property asset 702 that indicates parts of speech of at least a portion of the words included in the intellectual-property asset 702. For example, the linguistic analysis 706 may indicate verbs, nouns, and adjectives of the intellectual-property asset 702. In additional scenarios, the linguistic analysis 706 may also indicate adverbs, conjunctions, prepositions, pronouns, stop words, common words, unique words, or combinations thereof, of the intellectual-property asset.

Additionally, the framework 700 may include, at 708, generating one or more linguistic structures for the intellectual-property asset 702. In particular examples, the intellectual-property services system 104 may generate the one or more linguistic structures at 708. The one or more linguistic structures may indicate relationships between words of the intellectual-property asset 702. In various implementations, multiple linguistic structures may be generated for the intellectual-property asset 702. In illustrative implementations, a linguistic structure may be generated for a plurality of features of the intellectual-property asset 702. For example, a linguistic structure may be generated for actions that are taking place in a claim. In certain implementations, the linguistic structures may be generated for individual elements included in a claim of a patent or patent application.

In the illustrative example of FIG. 7, a linguistic structure 710 may be generated for the feature of the intellectual-property asset 702 starting with "displaying a portion of web page content . . . ". This feature may include one element of a claim of the intellectual-property asset 702. The linguistic structure 710 may be a tree structure that includes a root node 712 and a number of branch nodes 714, 716, 718. The root node 712 of the linguistic structure 710 includes the word "display", which is a verb corresponding to the feature for which the linguistic structure 710 is being generated. The nodes 714 and 716 correspond to nouns that are related to the verb in the root node 712. Additionally, the node 718 corresponds to the noun and adjective included in the node 716. Although the illustrative example of the linguistic structure 710 includes a single root node with three branch nodes, the linguistic structure 710, and other linguistic structures, may include additional nodes that correspond to different words of a feature of the intellectual-property asset 702. The root node 712 may be included in a first level of the linguistic structure 710, the second node 714 and the third node 716 may be included in a second level of the linguistic structure 710, and the fourth node 718 may be included in a third level of the linguistic structure 710.

Figure 8:
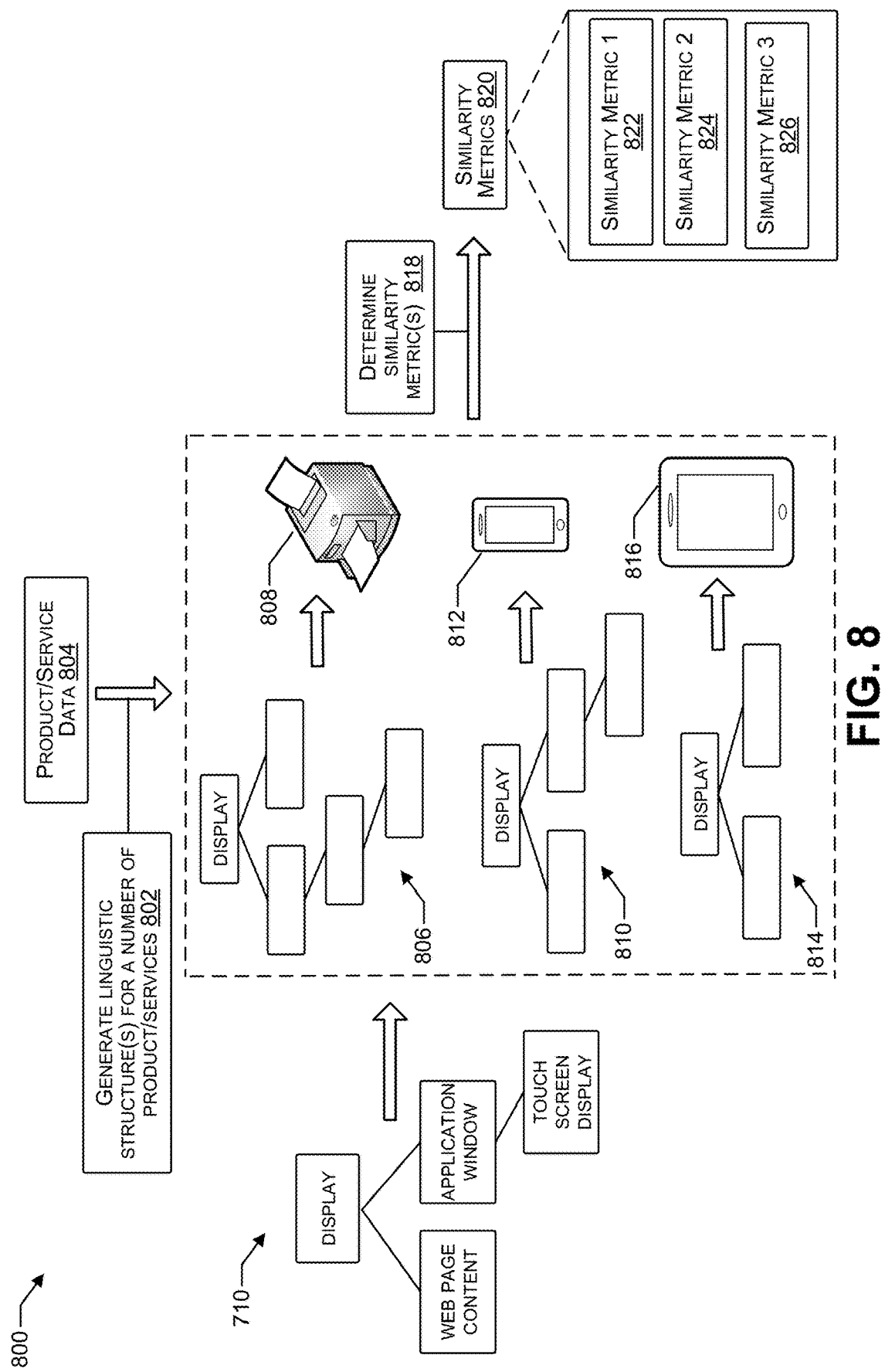
FIG. 8 illustrates an example framework to determine a similarity metric between a linguistic structure for a portion of a claim of a patent document and a linguistic structure of a product/service according to some implementations.

FIG. 8 illustrates an example framework 800 to determine a similarity metric between a linguistic structure for a portion of a claim of a patent document and a linguistic structure of a product/service according to some implementations. The framework 800 includes the linguistic structure 710 from FIG. 7 that represents a portion of a claim of the intellectual-property asset 702. Additionally, at 802, linguistic structures may be generated for a number of products and/or services using product/service data 804. The product/service data 804 may include data that includes descriptions of products and/or services. The product/service data 804 may be analyzed and parsed using natural language processing techniques to determine classifications for words included in the product/service data 804. Additionally, the product/service data 804 may be analyzed to generate linguistic structures for various features of products included in the product/service data 804. For example, a first linguistic structure 806 may be generated for at least one feature of a first product 808, a second linguistic structure 810 may be generated for at least one feature of a second product 812, and a third linguistic structure 814 may be generated for at least one feature of a third product 816. The linguistic structures 806, 810, 814 may include tree structures with a root node and one or more branch nodes.

At 818, the framework 800 may include determining similarity metrics 820 between the linguistic structure 710 and the linguistic structures 806, 810, 814. In various implementations, the similarity metrics 820 may indicate an amount of similarity between linguistic structures. The similarity metrics 820 may be determined based on similarities between words included in the linguistic structure 710 and words included in the linguistic structures 806, 810, 814. Additionally, the similarity metrics 820 may be determined based on similarities between the arrangement of nodes included in the linguistic structure 710 and the respective arrangements of nodes included in the linguistic structures 806, 810, 814. In particular, the similarity metrics 820 may include a first similarity metric 822 that corresponds to an amount of similarity between the linguistic structure 710 and the first linguistic structure 806. Additionally, a second similarity metric 824 may correspond to an amount of similarity between the linguistic structure 710 and the second linguistic structure 810. Further, the similarity metrics 820 may include a third similarity metric 826 that corresponds to an amount of similarity between the linguistic structure 710 and the third linguistic structure 814. In various implementations, the similarity metrics 820 may include numerical representations of amounts of similarity between linguistic structures. In particular implementations, the similarity metrics 820 may be designated along a numerical scale, such as 1 to 10 or 1 to 100 or represented by a percentage that indicates amounts of similarity between linguistic structures.

The amounts of similarity between the linguistic structure 710 and the linguistic structures 806, 810, 814 may be used to determine one or more of the products 808, 812, 816 that may correspond to the intellectual-property asset 702. That is, in situations where a similarity metric 822, 824, 826 is greater than a threshold amount of similarity, a mapping or other indicator of correspondence between the intellectual-property asset 702 and a respective product 806, 810, 814 may be generated. The mappings may then be used to provide various services to organizations, such as IP valuations services, IP risk-related services, and/or IP strategy-related services.

Figure 9:
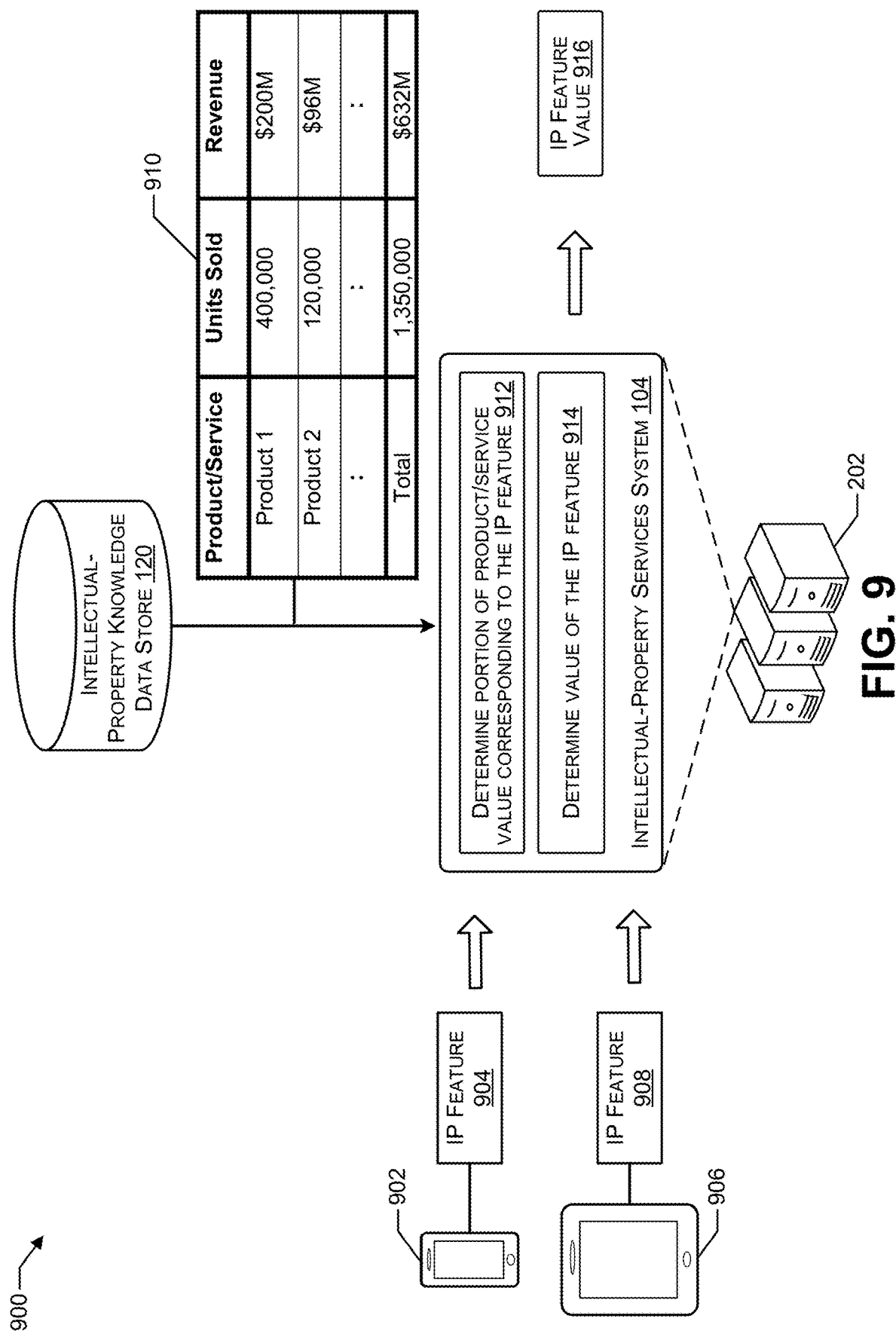
FIG. 9 illustrates an example framework to determine a value of an intellectual-property feature that corresponds to one or more products according to some implementations.

FIG. 9 illustrates an example framework 900 to a value of an intellectual property feature that corresponds to one or more products according to some implementations. The framework 900 may include a first product 902 that corresponds to a first IP feature 904 and a second product 906 that corresponds to a second IP feature 908. The first product 902 may be linked to the first IP feature 904 based on an amount of similarity between a linguistic structure of the product 902 and a linguistic structure of the first IP feature 904. Additionally, the second product 906 may be linked to the second IP feature 908 based on an amount of similarity between a linguistic structure of the second product 906 and a linguistic structure of the second IP feature 908. In illustrative examples, the first IP feature 904 may be an element of a claim of a patent or patent application and the second IP feature may be an element of a claim of another patent or patent application.

The framework 900 also includes the intellectual-property services system 104 and the intellectual-property knowledge data store 120. The intellectual-property services system 104 may retrieve financial data 910 from the intellectual-property knowledge data store 120. The financial data 910 may include information related to revenue generated by sales of various products and/or services, such as revenue information for the first product 902 and revenue information for the second product 906. The intellectual-property services system 104 may also, at 914, determine a portion of the value of a product and/or service that corresponds to an IP feature associated with the product and/or service. For example, the intellectual-property services system 104 may determine a portion of the amount of revenue of the first product 902 to attribute to the first IP feature 904. In various implementations, the amount of revenue of the first product 902 to attribute to the first IP feature 904 may be based on a measure of breadth of the IP feature 904. To illustrate, the intellectual-property services system 104 may determine a breadth of the first IP feature 904 with respect to additional intellectual property features included in a same technology classification as the first IP feature 904. Based on the measure of breadth of the first IP feature 904 in relation to the breadth of other IP features, the intellectual-property services system 104 may determine an amount of revenue of the first product 902 to attribute to the first IP feature 904. In certain situations, the higher the value of the measure of breadth of the first IP feature 904, the higher the percentage of revenue of the first product 902 to attribute to the first IP feature 904. Further, the lower the value of the measure of breadth of the first IP feature 904, the lower the percentage of revenue of the first product 902 to attribute to the first IP feature 904.

At 914, the framework 900 includes determining a value 916 for the IP feature 914. In particular implementations, the intellectual-property services system 104 may determine the value 916 of the first IP feature 904 based on the amount of revenue of the first product 902 and a portion of the revenue of the first product 902 attributed to the first IP feature 904. In various implementations, the intellectual-property services system 104 may multiple the portion of the revenue of the first product 902 attributed to the first IP feature 904 by revenue information of the first product 902 to determine the value 916 of the first IP feature 904.

FIG. 10-14 illustrate example processes of analyzing intellectual-property data. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-9, although the processes may be implemented in a wide variety of other environments, architectures and systems.

Figure 10:
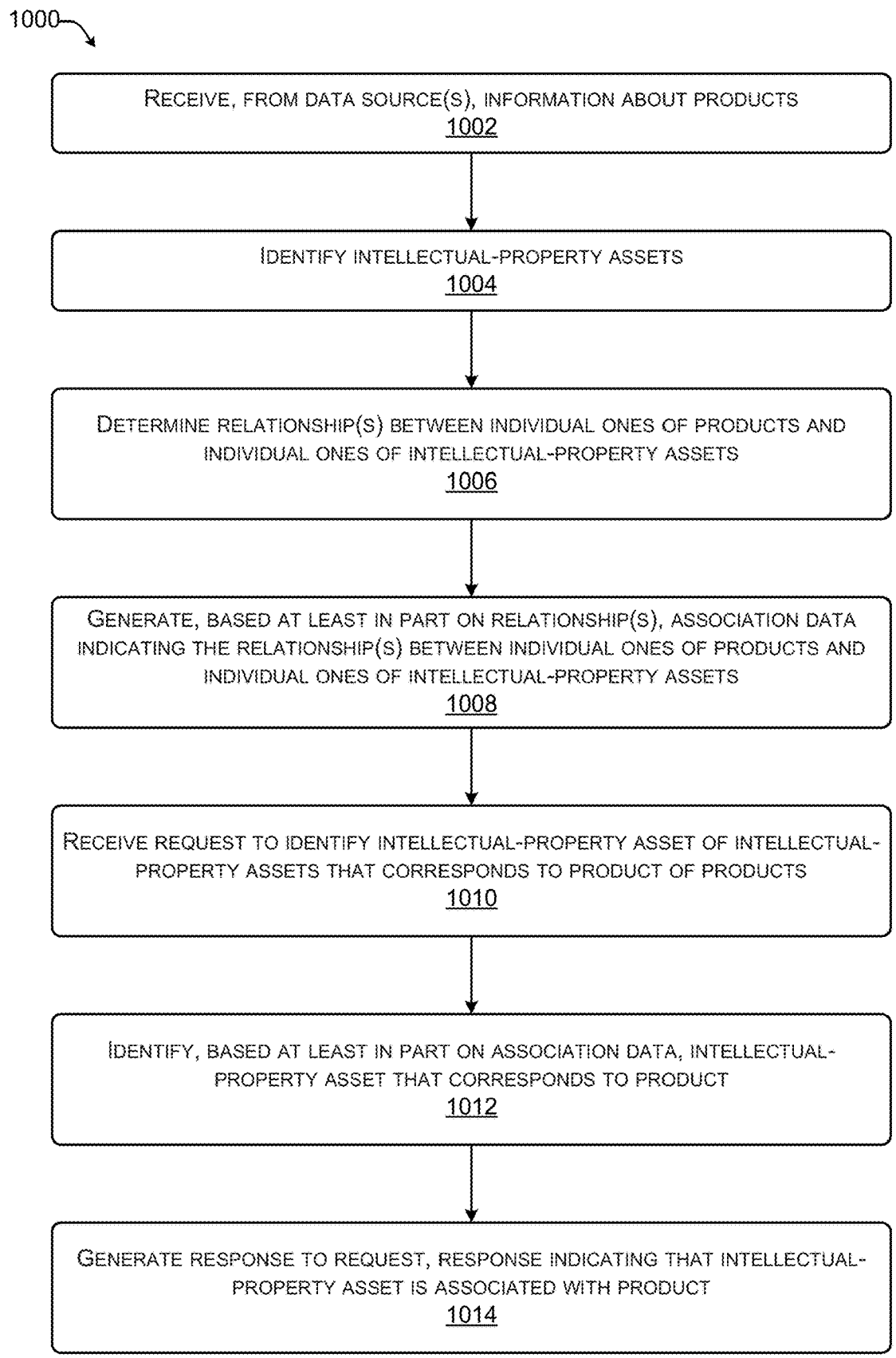
FIG. 10 illustrates an example process to determine an intellectual-property asset that corresponds to a product and/or service according to some implementations.

FIG. 10 illustrates an example process 1000 to determine an intellectual-property asset that corresponds to a product or service according to some implementations.

At 1002, the process 1000 includes receiving, from one or more data sources, information about products. In particular implementations, the one or more data sources may include a publicly accessible data source. Publicly accessible data sources may include websites that include information that may be accessed by the general public without credentials issued by the organizations maintaining and/or controlling access to the websites. For example, publicly accessible data sources may include uniform resource locators (URLs) that are available to the public without the URL(s) being first provided to individuals by the organizations themselves. In contrast, access to private data sources may be controlled more strictly than access to public data sources by restricting access to URLs associated with the private data sources and/or by requiring specific credentials to access the private data sources. In some situations, an organization may maintain and/or control a website that includes both publicly accessible information that may be accessible to the general public and privately accessible information that is accessible to customers, employees, and other individuals that have specifically been granted access by the organization. The publicly accessible data sources may include government websites, intellectual-property databases maintained by intellectual property jurisdictions, websites of companies offering products and/or services, combinations thereof, and the like. In these situations, obtaining data related to a product and/or service from the publicly accessible data source may include determining a plurality of keywords associated with the product and/or service and parsing the publicly accessible data source to identify data that corresponds to at least one keyword of the plurality of keywords. Additionally, the data that corresponds to the at least one keyword may be extracted from the publicly accessible data source and the data that corresponds to the at least one keyword may be stored in a data store of a service provider. In certain implementations, an intellectual-property services provider may obtain information from public data sources using web crawlers or other applications that may identify websites and parse the websites for specified information.

In additional implementations, the one or more data sources may include a data source of an organization that offers a product and/or service for acquisition. A data source of an organization may be a private data source that is accessible to an intellectual-property services provider based at least partly on the organization granting access by the intellectual-property service provider to the data source of the organization. The data source of the organization may be accessible via a database management application and an intellectual-property services provider may utilized the database management application to parse the data source of the organization for at least one keyword of a plurality of keywords associated with a product and/or service and to extract data corresponding to the at least one keyword from the data source of the organization. The intellectual-property services provider may then store the data obtained from the data source of the organization in a data store of an additional organization, such as a data store of the intellectual-property services provider. In various implementations, data related to a product and/or service that is stored in a data store of an organization that is offering the product and/or service for sale may be stored such that relationships between intellectual-property assets and respective product and/or services are identifiable. That is, the organization may have tracked the intellectual-property assets that are associated with particular products and/or services and stored data indicating this relationship. In this way, an intellectual-property services provider may search a data store of an organization and identify intellectual-property assets that correspond to products and/or services offered for sale by the organization using data generated by the organization.

In further implementations, data relating to products and/or services may be obtained using crowdsourcing techniques. To illustrate, an intellectual-property services provider may cause a request for information about a product and/or service to be published on a website. Individuals accessing the website may submit responses to the request via the website. In additional implementations, an intellectual-property services provider may send requests to particular individuals to obtain information about products and/or services. The requests may be included in one or more types of communication, such as email, mobile device message, instant messaging notification, phone call, combinations thereof, and so forth. In various implementations, the intellectual-property services provider may identify one or more groups of individuals to obtain information about one or more products and/or services. For example, the intellectual-property services provider may identify individuals that may be considered experts and/or have at least a threshold amount of knowledge about various products and/or services and the intellectual-property services provider may contact a respective group of individuals when the intellectual-property services provider would like to obtain information about a product and/or service for which the respective group has knowledge. In these scenarios, at least a portion of the individuals contacted by the intellectual-property services provider may provide information about one or more products and/or services to the intellectual-property services provider in response to the request(s). In some cases, information obtained about a product and/or service may indicate one or more sources of information about the product and/or service, such as one or more websites or publications that may include information about the product and/or service. Additionally, information about a product and/or service may include at least one of a description of the product and/or service, pricing information related to the product and/or service, financial information of the product and/or service.

In various implementations, an intellectual-property services provider may also provide one or more portals for individuals to submit information. For example, the intellectual-property services provider may generate one or more user interfaces that include at least one user interface element to capture information about products and/or services offered for sale by an organization and/or to capture information about intellectual-property assets of the organization. The portals may be accessible by representatives of at least one of the intellectual-property services provider or the organization. In particular implementations, the intellectual-property services provider may provide a portal that may be used to obtain information about trade secrets of the organization. In additional implementations, the intellectual-property services provider may provide a portal that may be used to obtain information about patent documents of the organization. In further implementations, the intellectual-property services provider may provide a portal that may be used to obtain information about products and/or services offered by the organization.

At block 1004, the process 1000 includes identifying intellectual-property assets. For example, the intellectual-property assets may be identified from publicly-available resources and/or from resources associated with one or more organizations.

At 1006, the process 1000 includes determining one or more relationships between individual ones of the products and individual ones of the intellectual-property assets. The relationships between the individual products or services and the individual intellectual-property assets may be determined by identifying features of the products or services and features of the intellectual-property assets. The features of the products or services may be determined by parsing descriptions of the products or services and identifying functional features, physical features, and/or technical features of the products or services. In various implementations, videos and/or images related to the products or services may be analyzed using one or more object recognition techniques to determine features of the products or services. An intellectual-property services provider may analyze features of the intellectual-property asset and features of products or services to determine similarities between the features of the products or services and the features of the intellectual-property asset. In some cases, the amount of similarity may be based on similarities of words associated with the products and or services and the intellectual-property asset. The amount of similarity may also be based on similarities in relationships between words related to features of the products or services and relationships between words related to features of the intellectual-property asset. The intellectual-property services provider may determine that there is a relationship between a product or service and an intellectual-property asset based on a similarity between the features of the product or service and the features of the intellectual-property asset is at least a threshold similarity. In an illustrative example, an intellectual-property services provider may determine features of a claim of a patent document and features of a product or service. The intellectual-property service provider may then identify a relationship between the claim and the product or service based on similarities between the features of the claim of the patent document and features of the product or service.

At 1008, the process 1000 includes generating, based at least in part on the one or more relationships, association data indicating the one or more relationships between the individual ones of the products and the individual ones of the intellectual-property assets. For example, the association data may include a framework of relationships between individual products or services and at least one intellectual-property asset that is mapped to the product or service. The framework may also indicate individual intellectual-property assets and at least one product or service that is associated with the intellectual-property asset. In this way, the framework may be searchable based on intellectual-property asset or based on product or service in order to identify products or services and intellectual-property assets that are related.

The association data may include a mapping included in the framework that indicates an intellectual-property asset that corresponds to a product or service. In various implementations, an intellectual-property services provider may receive a request to identify one or more products or services and one or more intellectual-property assets that are related. In these situations, the intellectual-property services provider may parse the framework based on identifiers of the intellectual-property assets or identifiers of the intellectual-property assets to determine relationships between products or services and intellectual-property assets. The relationships between the products or services and the intellectual-property assets may be utilized by the intellectual-property services provider to provide various intellectual property related services to a customer of the intellectual-property services provider. In particular implementations, the intellectual property related services may include valuation services for intellectual-property assets. In these scenarios, the intellectual-property services provider may determine one or more metrics related to the intellectual-property asset where the one or more metrics including at least one of a measure of breadth of one or more portions of the intellectual-property asset, a measure of risk with respect to the one or more portions of the intellectual-property asset, or a measure of coverage of the one or more portions of the intellectual-property asset. The intellectual-property services provider may also determine revenue obtained for the product or service over a period of time and then determine, based at least partly on the one or more metrics, an amount of the revenue of the product or service to attribute to one or more portions of the intellectual-property asset. After determining the amount of revenue of the product or service to attribute to the intellectual-property asset, the intellectual-property services provider may determine a value of the intellectual-property asset based at least partly the amount of revenue of the product or service obtained over the period of time and the portion of the amount of revenue of the product or service attributed to the intellectual-property asset.

At block 1010, the process 1000 includes receiving a request to identify an intellectual-property asset of the intellectual-property assets that corresponds to a product of the products. For example, a user, using a user interface, may provide input indicating a request to identify an asset that corresponds to a given product of the products. Input data corresponding to the input may be received as the request.

At block 1012, the process 1000 includes identifying, based at least in part on the association data, the intellectual-property asset that corresponds to the product. For example, the system may be utilized to determine, using the association data, which products have relationships with the intellectual-property asset.

At 1014, the process 1000 includes generating a response to the request, the response indicating that the intellectual-property asset is associated with the product. In some implementations, the user interface may also include one or more user interface elements to provide input regarding the relationships between the intellectual-property asset and the product or service. In certain implementations, input may be obtained via the user interface or via an additional user interface indicating one or modifications to the relationship between the intellectual-property asset and the product or service.

Figure 11:
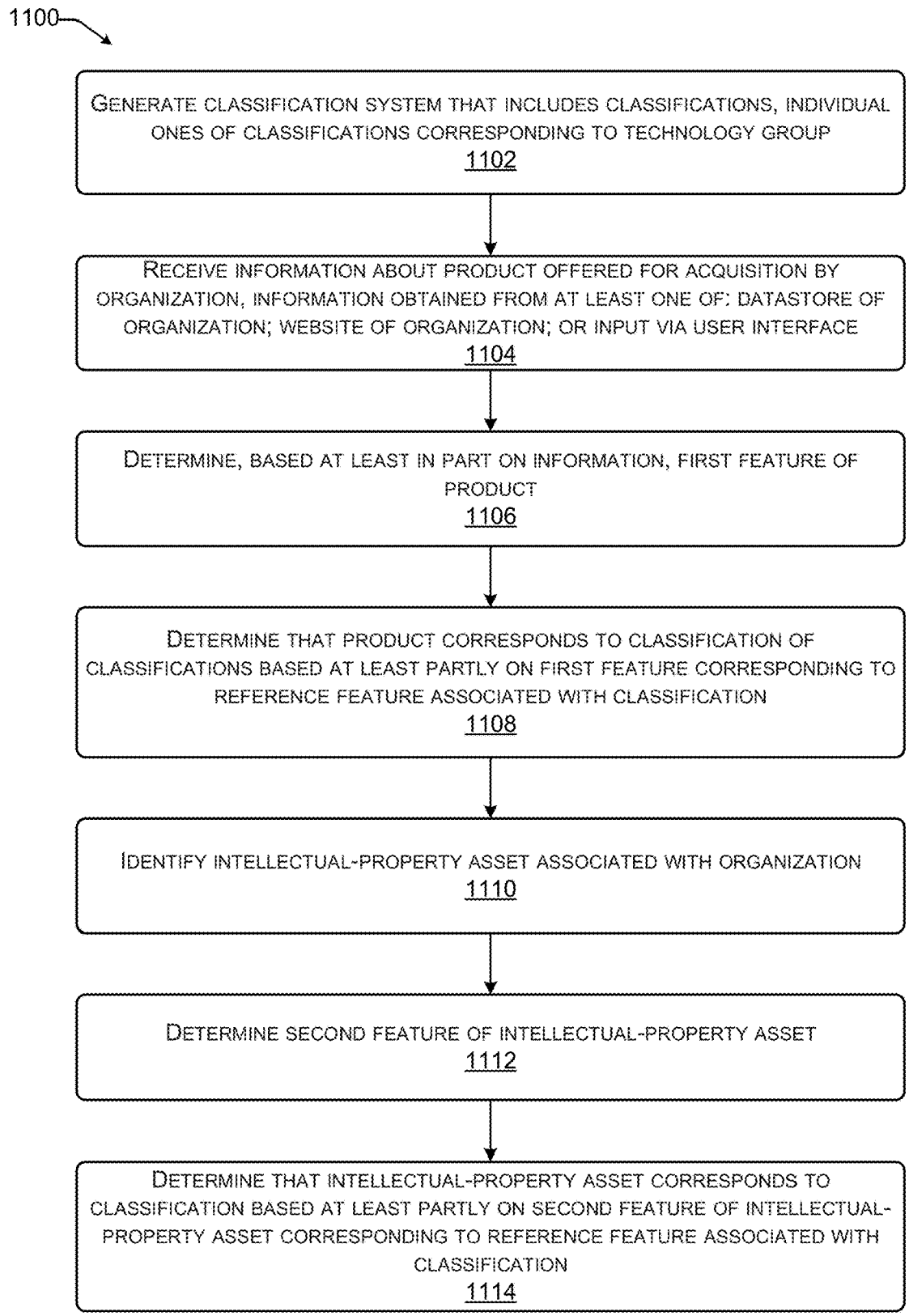
FIG. 11 illustrates an example process to determine an intellectual-property asset that corresponds to a product or service using a classification system according to some implementations.

FIG. 11 illustrates an example process 1100 to determine an intellectual-property asset that corresponds to a product or service using a classification system according to some implementations.

At 1102, the process 1100 includes generating a classification system that includes classifications, individual ones of the classifications corresponding to a technology group. In various implementations, individual classifications may be associated with one or more criteria. In illustrative implementations, the individual classifications may be associated with one or more words and each classification may be associated with different groups of words. Additionally, the individual classifications of the classification system may be associated with one or more physical features, one or more technical features, or combinations thereof. In certain implementations, the one or more physical features and/or the one or more technical features may each be related to a set of words.

At 1104, the process 1100 includes receiving information about a product offered for acquisition by an organization, the information obtained from at least one of a datastore of the organization; a website of the organization; or input via a user interface.

At 1106, the process 1100 includes determining, based at least in part on the information, a first feature of the product. The information about the product or service may be analyzed by parsing the information about the product or service to determine one or more words associated with the product or service. In particular implementations, the information about the product or service may be analyzed to determine at least one of one or more physical features or one or more technical features of the product or service. The one or more physical features and/or the one or more technical features of the product or service may be identified based at least partly on comparing words of at least one technical feature and/or words of at least one physical feature to words included in the information obtained about the product or service. In an illustrative implementation, a physical feature of the product or service may be identified based at least partly on at least one word related to the physical feature being included in the information about the product or service. In addition, a technical feature of a product or service may be identified based at least partly on at least one word related to the technical feature being included in the information about the product or service.

At 1108, the process 1100 includes determining that the product corresponds to a classification of the classifications based at least partly on the first feature corresponding to a reference feature associated with the classification. In various implementations, words associated with the first features of the product or service may be compared to additional words associated with second features of the classification. In certain implementations, a classification may be assigned to a product or service based at least partly on at least a threshold number of words of the first features of the product or service corresponding to a number of words of the second features of the classification. In particular implementations, a model may be used to determine classifications for product or services. The model may receive input including words corresponding to features of products or service and words corresponding to classifications and determine probabilities that products or services correspond to classifications of the classification system. In illustrative implementations, a classification may be assigned to a product or service when a probability that the product or service corresponds to a classification is greater than a threshold probability. In additional implementations, a classification may be assigned to a product or service when a probability that the product or service corresponds to the classification is a highest probability among a plurality of probabilities that have been determined for the product or service using the model for a plurality of classifications.

At 1110, the process 1100 includes identifying an intellectual-property asset associated with the organization. The intellectual-property asset of the organization may be identified based on information obtained from the organization. In particular implementations, an intellectual-property services provider may obtain information about the intellectual-property asset that includes a document that corresponds to the intellectual-property asset, such as a trade secret document, a patent application, a utility patent, a design patent, a plant patent, a trademark application, or a copyright submission. In additional implementations, an organization may provide identifiers of intellectual-property assets of the organization and the intellectual-property services provider may obtain information about the intellectual-property assets from one or more databases based on the identifiers.

At 1112, the process 1100 includes determining a second feature of the intellectual-property asset. The features of the intellectual-property asset may be determined by analyzing information related to the intellectual-property asset, such as documents related to the intellectual-property asset. In particular implementations, the intellectual-property asset may be a claim of a patent or patent application, and the features of the intellectual-property asset may be identified by analyzing words of the claim. Additionally, when the intellectual-property asset is a claim of a patent or patent application, the features of the intellectual-property asset may be identified by analyzing words of elements of the claim. Further, when the intellectual-property asset is a trademark, the features of the trademark may be identified by analyzing words of a description of goods or services associated with the trademark. In various implementations, the features of the intellectual-property asset may be identified by comparing words included in documents associated with the intellectual-property asset with words associated with physical features and/or technical features. An intellectual-property services provider may assign words to individual physical features and individual technical features. In certain implementations, an intellectual-property services provider may determine that an intellectual-property asset includes a technical feature or a physical feature when at least one word associated with the intellectual-property asset corresponds to at least one additional word related to the technical feature or at least one additional word related to the physical feature.

At 1114, the process 1100 includes determining that the intellectual-property asset corresponds to the classification based at least partly on the second feature of the intellectual-property asset corresponding to the reference feature associated with the classification. An intellectual-property services provider may determine that one or more third features of the intellectual-property asset correspond to the at least one fourth feature associated with the classification by comparing words of the one or more third features to words of the at least one fourth feature. In various implementations, the intellectual-property services provider may determine that the one or more third features of the intellectual-property asset correspond to the at least one fourth feature based at least partly on at least a threshold number of words of the one or more third features correspond to words of the at least one fourth feature.

In particular implementations, a model may be used to determine classifications for intellectual-property assets. The model may receive input including words corresponding to features of intellectual-property assets and words corresponding to classifications and determine probabilities that intellectual-property assets correspond to classifications of the classification system. In illustrative implementations, a classification may be assigned to an intellectual-property asset when a probability that the intellectual-property asset corresponds to the classification is greater than a threshold probability. In additional implementations, a classification may be assigned to an intellectual-property asset when a probability that the intellectual-property asset corresponds to the classification is a highest probability among a plurality of probabilities that have been determined for the intellectual-property asset using the model for a plurality of classifications.

In various implementations, models used to determine classifications for intellectual-property assets and models used to determine classifications for intellectual-property assets may be modified. For example, an intellectual-property services provider may request input regarding a classification of an intellectual-property asset. In some cases, the input may indicate that the intellectual-property asset should be classified according to a different classification. In other situations, the input may indicate that the intellectual-property asset is classified correctly. The intellectual-property services provider may then modify the model used to classify intellectual-property asset based the input. Additionally, the intellectual-property services provider may request input regarding a classification of a product or service. The input may indicate that the product or service should be classified according to a different classification. In other scenarios, the input may indicate that the product or service is classified correctly. The intellectual-property services provider may then modify the model used to classify the product or service based on the input.

Figure 12:
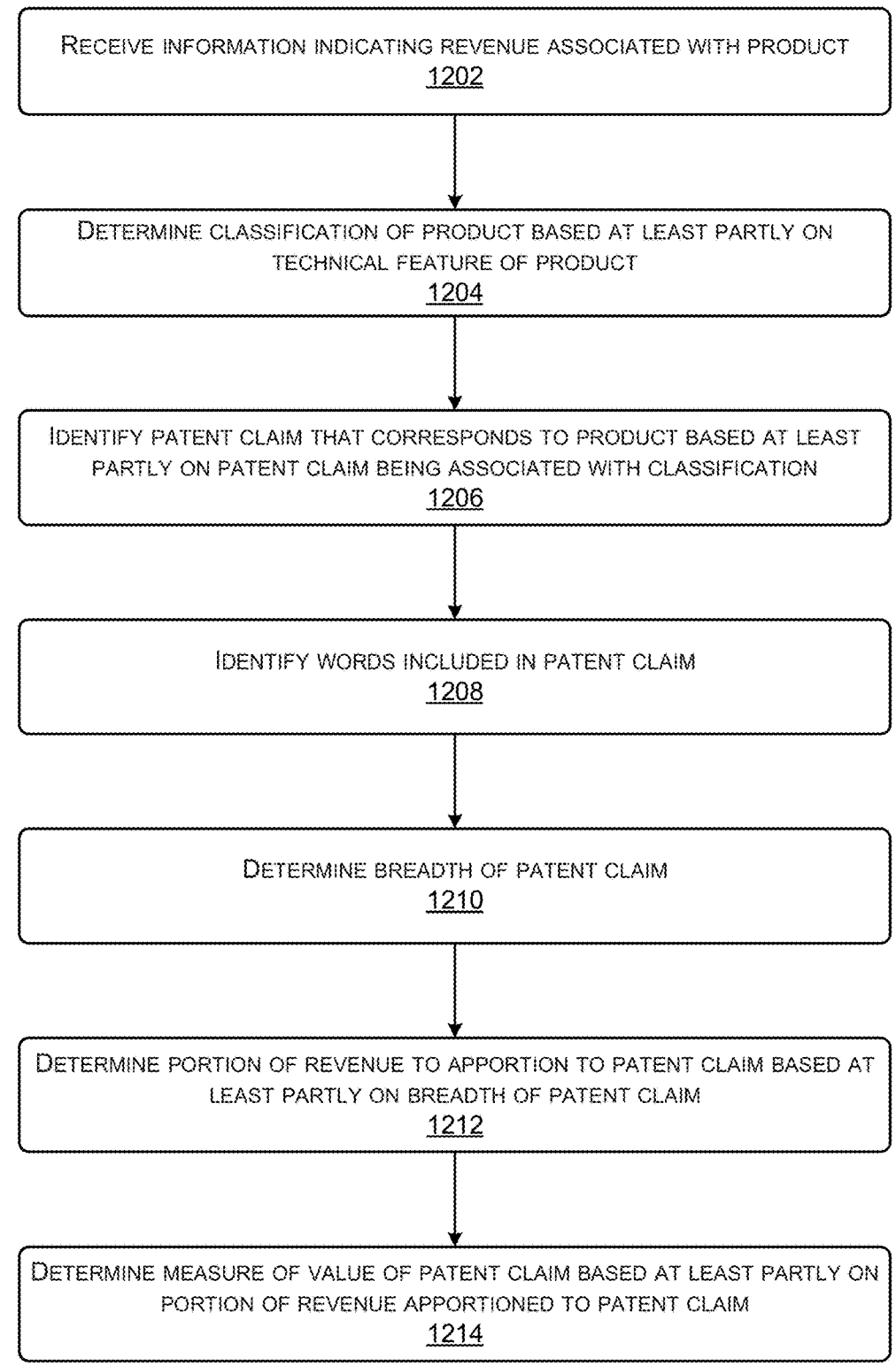
FIG. 12 illustrates an example process to perform a qualitative analysis and a quantitative analysis of intellectual-property data according to some implementations.

FIG. 12 illustrates an example process 1200 to perform a qualitative analysis and a quantitative analysis of intellectual-property data according to some implementations.

At 1202, the process 1200 includes receiving information indicating revenue associated with a product. The information may include financial data such as information regarding revenue obtained by one or more organizations through sales of the product or service. The financial data may be obtained from a variety of sources. For example, an intellectual-property services provider may provide a portal that captures information regarding financial data of products and/or services. To illustrate, the intellectual-property services provider may generate one or more user interfaces that include one or more user interface elements to capture one or more portions of the financial data. In additional implementations, the intellectual-property services provider may implement software tools to parse a datastore of an organization that offers the product or service for sale to identify portions of the financial data corresponding to the product or service. In further implementations, the intellectual-property services provider may analyze information from one or more websites to identify at least a portion of the financial data corresponding to the product or service. In illustrative examples, the intellectual-property services provider may utilize web crawlers and other website parsing tools to analyze information included in websites, including websites of one or more organizations offering the product or service for acquisition and/or third-party websites, to identify at least a portion of the financial data corresponding to the product or service.

At block 1204, the process 1200 includes determining a classification of the product based at least partly on a technical feature of the product. For example, the intellectual-property services provider may determine a classification for the product or service by determining features of the product or service and comparing the features of the product or service to criteria for a number of classifications of the classification system.

At block 1206, the process 1200 includes identifying a patent claim that corresponds to the product based at least partly on the patent claim being associated with the classification. For example, intellectual-property assets may be associated with the classification. Those intellectual-property assets may include patents, which may include claims.

Additionally, the process 1200 may include identifying, generally, an intellectual-property asset of an organization. The intellectual-property asset of the organization may include one or more intellectual-property assets having legal rights that may be enforced by the organization. In various implementations, the intellectual-property asset may be assigned to the organization. In additional implementations, the organization may have a license with respect to the intellectual-property asset. An intellectual-property services provider may determine that the intellectual-property asset corresponds to the organization based at least partly on information obtained from the organization. For example, the organization may provide a list of intellectual-property assets to the intellectual-property services provider. The list may be stored in a data store of the organization that is accessible to the intellectual-property services provider and the intellectual-property services provider may parse the data store to obtain the list. In further implementations, the organization may provide the list of intellectual-property assets to the intellectual-property services provider via a communication, such as an email or message. Also, the intellectual-property services organization may provide a customer portal by which the organization may provide a list of intellectual-property assets of the organization. In particular implementations, the intellectual-property services provider may analyze information available from public data sources, such as patent jurisdiction databases, to identify intellectual-property assets of the organization. To illustrate, the intellectual-property services provider may parse a publicly accessible datastore to identify intellectual-property assets that are assigned to the organization, intellectual-property assets where the organization is an applicant, intellectual-property assets having inventors that are related to the organization, or combinations thereof.

At block 1208, the process 1200 includes identifying words included in the patent claim. For example, the data representing the patent may be parsed and/or textual recognition techniques may be performed to identify the words that make up the patent claim.

At block 1210, the process 1200 includes determining a breadth of the patent claim. In some implementations, the intellectual-property services provider may determine the breadth of the intellectual-property asset relative to the breadth of other intellectual-property assets, such as intellectual-property assets in a same classification as the intellectual-property asset, to determine the portion of revenue of the product or service to attribute to the intellectual-property asset.

At block 1212, the process 1200 includes determining a portion of the revenue to apportion to the patent claim based at least partly on the breadth of the patent claim. For example, in order to determine the measures of breadth and/or portions of revenue of the products and/or services corresponding to the intellectual-property assets, the intellectual-property services system may utilize one or more linguistic analysis techniques and one or more machine learning techniques. An intellectual-property services provider may determine a portion of the revenue for the product or service to attribute to the intellectual-property asset based on an amount of features of the product or service that are covered by the intellectual-property asset. For example, if a product or service has a number of features, the portion of the number of features covered by the intellectual-property asset with respect to the total number of features may correspond to the portion of the revenue for the product or service to attribute to the intellectual-property asset. In an illustrative example, an intellectual-property asset may cover 2% of the features of a product or service, and the intellectual-property services provider may determine that 2% of the revenue of the product or service is to be attributed to the intellectual-property asset. In particular implementations, the proportion of the features of the product or service covered by the intellectual-property asset may serve as a starting point for determining the portion of revenue for the product or service to attribute to the intellectual-property asset In various implementations, an intellectual-property services provider may modify an initial portion of the amount of revenue of the product or service attributed to the intellectual-property asset based on a number of discount factors, which will be discussed in more detail below. In additional implementations, an intellectual-property services provider may determine a portion of the revenue for the product or service to attribute to the intellectual-property asset based on a breadth of the intellectual-property asset. In some implementations, the intellectual-property services provider may determine the breadth of the intellectual-property asset relative to the breadth of other intellectual-property assets, such as intellectual-property assets in a same classification as the intellectual-property asset, to determine the portion of revenue of the product or service to attribute to the intellectual-property asset.

At block 1214, the process 1200 includes determining a measure of value of the patent claim based at least partly on the portion of the revenue apportioned to the patent claim. For example, the measure of value for the intellectual-property asset may be determined by multiplying the revenue for the product or service by the portion of the revenue of the product or service attributed to the intellectual-property asset. In various implementations, one or more discount factors may also be used to determine the measure of value for the intellectual-property asset. The discount factors may be applied to at least one of the amount of revenue for the product or service used to determine the measure of value or the portion of the revenue for the product or service attributed to the intellectual-property asset. The one or more discount factors may reduce an initial measure of the value of the intellectual-property asset to a modified measure of value of the intellectual-property asset. In illustrative examples, one or more discount factors may be based at least partly on a first risk corresponding to invalidation of the intellectual-property asset and a second risk corresponding to a probability of litigation with respect to the intellectual-property asset. In particular implementations, the intellectual-property asset may include a patent claim and the first risk may be based at least partly on prosecution history events related to the patent claim. Additionally, in situations where the intellectual-property asset includes a patent claim, the first risk may be based at least partly on metrics of an examiner related to the patent claim relative to additional metrics of additional examiners included in a same art unit as the examiner, the metrics corresponding to at least one of a number of notices of allowance produced over a period of time, an average number of office actions before producing a notice of allowance, a number of notices of appeal filed over the period of time, a number of reversals in appeal decisions over the period of time, or combinations thereof. Further, the second risk based at least partly on a first number of litigation events taking place with respect to a number of intellectual-property assets having a same classification as the intellectual-property asset relative to a second number of litigation events taking place with respect to an additional plurality of intellectual-property assets included in a different classification of a classification system. In some illustrative examples where the intellectual-property asset includes a patent claim, a discount factor may be determined based at least partly on a number of additional patent claims assigned to the organization that correspond to the product or service. In illustrative examples where the intellectual-property asset includes a trademark, a discount factor may be based at least partly on at least one of a number of litigation events related to trademark assets included in a same classification as the trademark asset, a number of oppositions related to the trademark assets included in the same classification as the trademark asset, or metrics of an examiner associated with the trademark asset in relation to additional metrics of additional examiners associated with additional trademark assets included in the classification.

Additionally, or alternatively, the process 1200 may include determining that the product or service corresponds to the intellectual-property asset. An intellectual-property services provider may determine that the product or service corresponds to the intellectual-property asset based on obtaining input indicating that the product or service corresponds to the intellectual-property asset. For example, a representative of the organization may access a customer portal provided by the intellectual-property services provider to enter information via a user interface indicating that the product or service corresponds to the intellectual-property asset. In other examples, a representative of the intellectual-property services provider may enter information into a user interface indicating that the intellectual-property asset corresponds to the product or service. In additional implementations, the organization may store data indicating relationships between intellectual-property assets and products and/or services offered by the organization for sale. To illustrate, for each product or service of the organization, the organization may store a list of intellectual-property assets that are related to one or more features of the respective product or service. In these scenarios, the intellectual-property services provider may parse a datastore of the organization or a website of the organization that includes the list of intellectual-property assets that are related to one or more products and/or services of the organization.

In additional implementations, an intellectual-property services provider may determine a product or service that corresponds to an intellectual-property asset of the organization by determining an amount of similarity between the product or service and the intellectual-property asset. In various implementations, the intellectual-property service provider may parse an intellectual-property document associated with the intellectual-property asset to determine individual first words of the intellectual-property document and parse information related to the product or service to determine individual second words included in the information. The intellectual-property services provider may then determine a similarity metric between at least a portion of the individual first words and at least a portion of the individual second words. The intellectual-property services provider may determine that the product or service corresponds to the intellectual-property asset based at least partly on determining that the similarity metric is at least a threshold similarity metric. In further implementations, the intellectual-property services provider may analyze information about the product or service and information about the intellectual-property asset to determine physical and/or technical features of the product or service and physical and/or technical features of the intellectual-property asset. The intellectual-property services provider may determine that the intellectual-property asset corresponds to the product or service based at least partly on similarities between physical features and/or technical features of the product or service and physical features and/or technical features of the intellectual-property asset.

In particular implementations, the intellectual-property services provider may determine that both the product or service and the intellectual-property asset are associated with a same classification of a classification system before analyzing the information of the product or service and the information of the intellectual-property asset to determine similarities between the intellectual-property asset and the product or service. In various implementations, the intellectual-property services provider may determine a classification for the product or service by determining features of the product or service and comparing the features of the product or service to criteria for a number of classifications of the classification system. Additionally, the intellectual-property services provider may determine a classification for the intellectual-property asset by determining features of the intellectual-property asset and comparing the features of the intellectual-property asset to criteria for a number of classifications of the classification system. In various implementations, the intellectual-property services provider may determine first similarity metrics indicating amounts of similarity between the features of the product or service and the criteria of the classifications and determine second similarity metrics indicating amounts of similarity between the features of the intellectual-property asset and the criteria of the classifications. The intellectual-property services provider may then utilize the first similarity metrics to determine a classification for the product or service and the second similarity metrics to determine a classification for the intellectual-property asset. The intellectual-property services provider may determine a classification for the product or service and a classification for the intellectual-property asset based on a threshold similarity metric such that a first similarity metric and/or a second similarity metric for a particular classification that is above the threshold similarity metric may indicate that product or service and/or the intellectual-property asset corresponds to the classification. In additional implementations, the intellectual-property services provider may determine a first similarity metric having a highest value among the first similarity metrics to determine that the classification related to the highest value first similarity metric corresponds to the product or service. The intellectual-property services provider may also determine a second similarity metric having a highest value among the second similarity metrics to determine that the classification related to the highest value second similarity metric corresponds to the intellectual-property asset.

Figure 13:
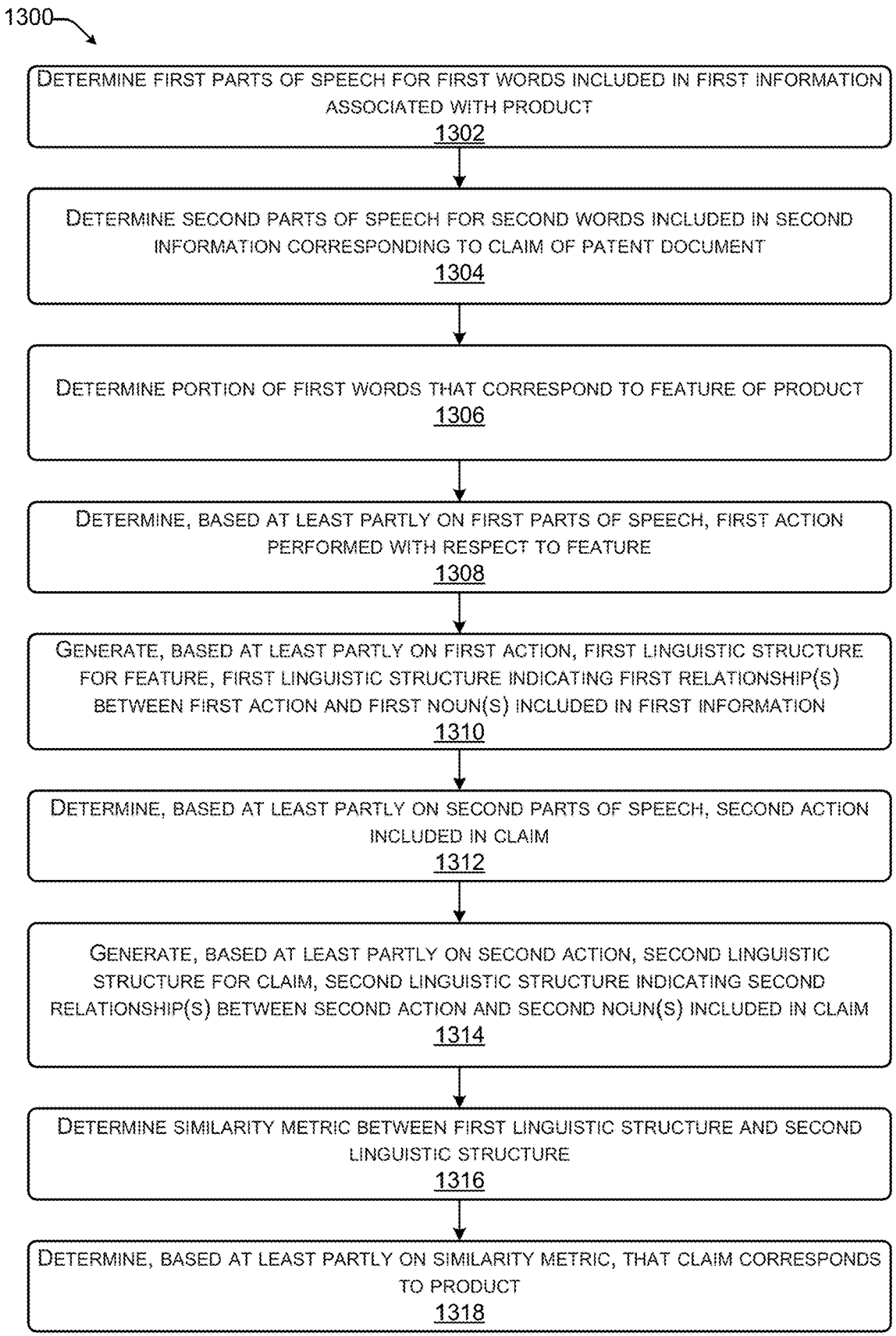
FIG. 13 illustrates an example process to determine an intellectual-property asset that corresponds to a product and/or service using a linguistic structure of the intellectual-property asset and a linguistic structure of the product and/or service according to some implementations.

FIG. 13 illustrates an example process 1300 to determine an intellectual-property asset that corresponds to a product or service using a linguistic structure of the intellectual-property asset and a linguistic structure of the product or service according to some implementations.

At 1302, the process 1300 includes determining first parts of speech for first words included in first information associated with a product. In various implementations, natural language processing techniques may be used to determine the individual words included in the first information and the parts of speech associated with the individual words. In particular implementations, an intellectual-property services provider may determine at least one of nouns, verbs, adjectives, adverbs, prepositions, conjunctions, or pronouns included in the first information. Additionally, the intellectual-property services provider may determine relationships between the words included in the first information. For example, the intellectual-property services provider may identify the words included in a same sentence. The intellectual-property services provider may also identify words included in a same paragraph. Additionally, the intellectual-property services provider may identify one or more adjectives that modify individual nouns and one or more adverbs that modify individual verbs. Further, the intellectual-property services provider may store data indicating the relationships between words. To illustrate, the intellectual-property services provider may assign an identifier to individual words included in the first information and assign codes or classes to the individual words. In a particular example, the intellectual-property services provider may assign a code to a word included in the first information indicating that the word is a noun and also store in a table related to the word, an identifier of an adjective related to the word. The table may also include identifiers of words in a same sentence or element as the noun.

At block 1304, the process 1300 includes determining second parts of speech for second words included in second information corresponding to a claim of a patent document. Determining the second parts of speech may be performed in the same or a similar manner as determining the first parts of speech, as described above.

At block 1306, the process 1300 includes determining a portion of the first words that correspond to a feature of the product. For example, a catalog of features may be associated with the product, and the intellectual-property services provider may analyze the first words in association with the features to determining which of the words correspond to at least one of the features associated with the product.

At block 1308, the process 1300 includes determining, based at least partly on the first parts of speech, a first action performed with respect to the feature. For example, the intellectual-property services provider may determine which of the words is a verb acting on a given feature. The verb may indicate the action performed with respect to the feature.

At 1310, the process 1300 includes generating, based at least partly on the first action, a first linguistic structure for the feature, the first linguistic structure indicating one or more first relationships between the first action and one or more first nouns included in the first information. In particular examples, the linguistic structure may include a tree structure with a root node and one or more branch nodes. The root node may be in a first level of the tree structure and the one or more branch nodes may be included in subsequent levels of the tree structure. In the tree structure, each node that is a branch of another node is related to the initial node. That is, the tree structure may include parent nodes and child nodes that are related to the parent nodes. In an illustrative example, a noun included in a first node on a first level of the tree structure may be associated with a first adjective included in a second node and a second adjective in a third node of the tree structure, where the second node and third node are child nodes of the first node and are included in a second level of the tree structure. In various implementations, a linguistic structure of the intellectual-property asset may be generated with respect to an action related to the intellectual-property asset in a root node with the words corresponding to the action being included in the branch nodes. In an illustrative example, a verb corresponding to the action may be included in a root node on a first level of the linguistic structure and nouns and adjectives related to the verb may be included in branch nodes of the linguistic structure on second and/or third levels of the linguistic structure. In situations where the intellectual-property asset is a patent claim, the intellectual-property services provider may generate a linguistic structure for individual elements included in the patent claim.

At 1312, the process 1300 includes determining, based at least partly on the second parts of speech, a second action included in the claim. That is, an intellectual-property services provider may analyze the words included in the second information and identify at least one of nouns, verbs, adjectives, adverbs, prepositions, conjunctions, or pronouns included in the second information. In particular implementations, the intellectual-property services provider may utilize natural language processing techniques to determine the individual words and the respective parts of speech of the words included in the second information.

At 1314, the process 1300 includes generating, based at least partly on the second action, a second linguistic structure for the claim, the second linguistic structure indicating one or more second relationships between the second action and one or more second nouns included in the claim. The second and/or additional linguistic structure generated based on the second information may have a tree structure with a root node and one or more branch nodes. The root node may be in a first level of the tree structure and the one or more branch nodes may be included in subsequent levels of the tree structure. In the tree structure, each node that is a branch of another node is related to the initial node. That is, the tree structure may include parent nodes and child nodes that are related to the parent nodes. In an illustrative example, a noun included in a first node on a first level of the tree structure may be associated with a first adjective included in a second node and a second adjective in a third node of the tree structure, where the second node and third node are child nodes of the first node and are included in a second level of the tree structure. In various implementations, a linguistic structure of the product or service may be generated with respect to an action performed with respect to the product or service being in a root node with the additional words corresponding to the action being included in the branch nodes. In an illustrative example, a verb corresponding to the action may be included in a root node on a first level of the additional linguistic structure and nouns and adjectives related to the verb may be included in branch nodes of the additional linguistic structure on second and/or third levels of the additional linguistic structure. In some implementations, the intellectual-property services provider may generate a linguistic structure for individual technical features of the product or service, for individual physical features of the product or service, or both.

At 1316, the process 1300 includes determining a similarity metric between the first linguistic structure and the second linguistic structure. For example, one or more components of the first linguistic structure may be compared to one or more components of the second linguistic structure. When the components of the linguistic structures correspond to each other, the similarity metric may indicate a high degree of similarity. When the components do not correspond and/or differences exist as between the linguistic structures, the similarity metric may indicate a low degree of similarity. The measure of similarity between the first linguistic structure and the second linguistic structure may be determined by comparing similarities in the configuration of the first linguistic structure and the configuration of the second linguistic structure. For example, an intellectual-property services provider may determine the measure of similarity based on a number of levels included in the first linguistic structure and a number of levels included in the second linguistic structure. The intellectual-property services provider may also determine the measure of similarity based on a number of nodes in each level of the first linguistic structure and a number of nodes in each level of the second linguistic structure. To illustrate, the intellectual-property services provider may compare a number of nodes in a second level of the first linguistic structure with a number of nodes in a second level of the second linguistic structure.

The intellectual-property services provider may also determine the measure of similarity based on similarities between words included in the first linguistic structure and the words included in the second linguistic structure. To illustrate, the intellectual-property services provider may compare one or more words included in a root node of the first linguistic structure with one or more words included in a root node of the second linguistic structure. In these situations, the measure of similarity may be based on whether the one or more words included in the root node of the first linguistic structure and the one or more words included in the root node of the second linguistic structure are the same, similar, synonyms, and the like. Additionally, the intellectual-property services provider may compare words in the branch nodes of the first linguistic structure and the words in the branch nodes of the second linguistic structure to determine the measure of similarity. In particular implementations, the intellectual-property services provider may compare words included in individual levels of the first linguistic structure with words included in individual levels of the second linguistic structure.

At 1318, the process 1300 includes determining, based at least partly on the similarity metric, that the claim corresponds to the product. In some illustrative examples, the intellectual-property services provider may determine that the product or service and the intellectual-property asset are in a same classification of a classification system before comparing the first linguistic structure and the second linguistic structure. Additionally, in various situations, the intellectual-property service provider may generate multiple linguistic structures for the product or service and multiple linguistic structures for the intellectual-property asset. In these scenarios, the intellectual-property services provider may compare one or more linguistic structures of the product or service with one or more linguistic structures of the intellectual-property asset to determine a measure of similarity between the product or service and the intellectual-property asset. In further implementations, the measure of similarity, such as a similarity metric, between the first linguistic structure and the second linguistic structure may be modified based on user input. For example, the intellectual-property services provider may receive input indicating that the product or service does not correspond with the intellectual-property asset. In these situations, the intellectual-property services provider may modify the measure of similarity and/or modify a model used to generate the measure of similarity based on the input. In additional implementations, the intellectual-property services provider may determine that an intellectual-property asset and a product or service do not correspond to each other and the intellectual-property services provider may receive input indicating that the additional product or service and the additional intellectual-property asset do correspond to one another. Accordingly, the intellectual-property services provider may modify an additional measure of similarity between one or more linguistic structures of the product or service and one or more linguistic structures of the intellectual-property asset or a mode used to generate the additional measure of similarity based on the input.

Figure 14:
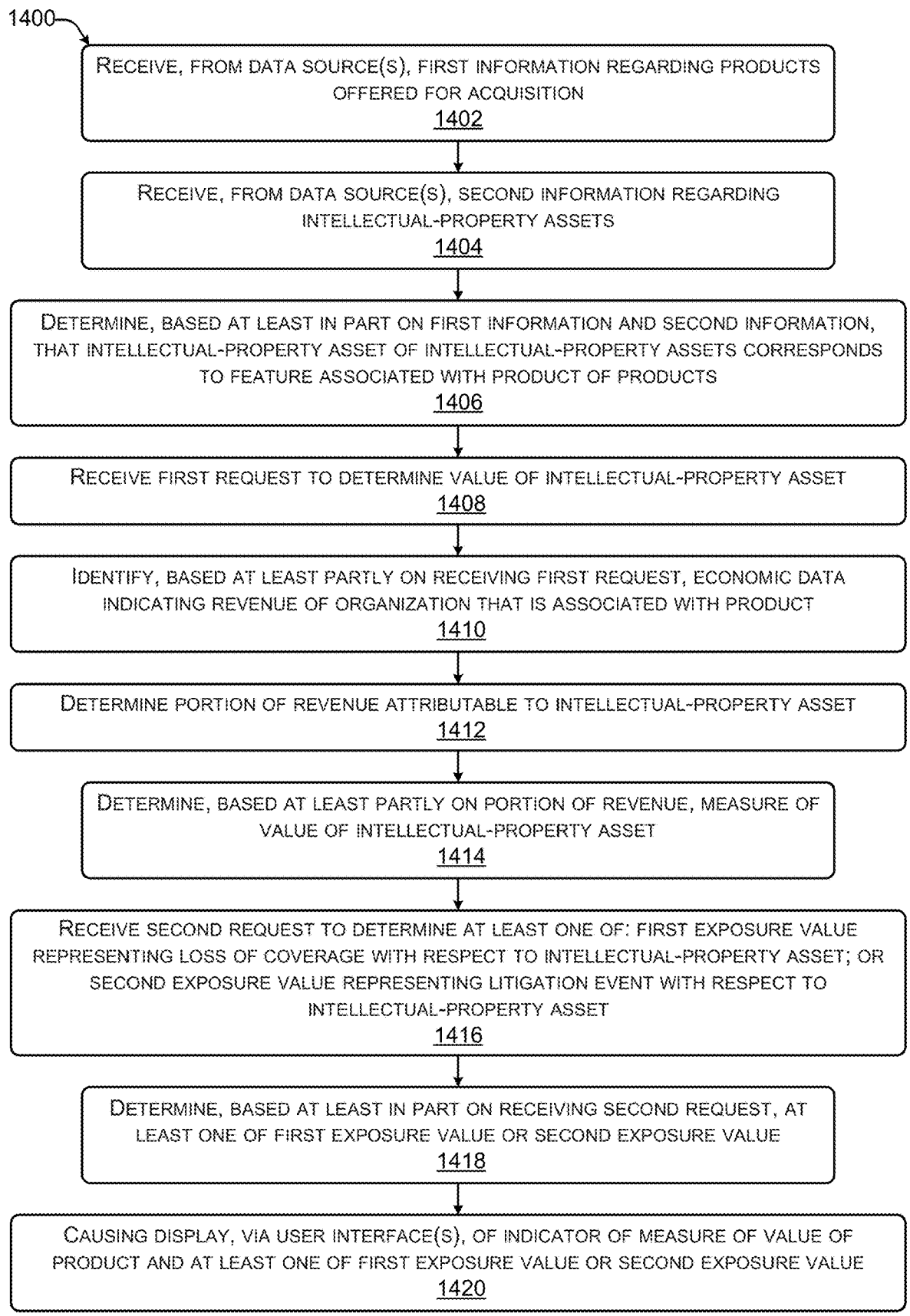
FIG. 14 illustrates an example process to provide services to a customer based on relationships between a product and/or service and an intellectual-property asset according to some implementations.

FIG. 14 illustrates an example process 1400 to provide services to a customer based on relationships between a product or service and an intellectual-property asset according to some implementations.

At 1402, the process 1400 includes receiving, from one or more data sources, first information regarding products offered for acquisition. The information may include details associated with the products and/or the sources of the products, for example.

At 1404, the process 1400 includes receiving, from the one or more data sources, second information regarding intellectual-property assets. For example, the information may include documents and/or data associated with the intellectual-property assets and/or that correspond to the intellectual-property assets.

At 1406, the process 1400 includes determining, based at least in part on the first information and the second information, that an intellectual-property asset of the intellectual-property assets corresponds to a feature associated with a product of the products. The comparisons between the individual intellectual-property assets and the individual products and/or services may be used by the intellectual-property services provider to determine similarity metrics between the individual intellectual-property assets and the individual products and/or services. In situations, where a similarity metric is greater than a threshold metric or has a highest value among a number of similarity metrics associated with a particular classification, the intellectual-property services provider may determine that there is a relationship between the intellectual-property asset and the product or service. In illustrative implementations, the intellectual-property services provider may generate linguistic structures using natural language processing techniques to determine similarity metrics for respective intellectual-property assets and respective products or services.

In various implementations, an intellectual-property services provider may generate a framework that indicates relationships between intellectual-property assets and products and/or services. In these scenarios, the intellectual-property services provider may receive a request to determine a product or service that corresponds to an intellectual-property asset. The intellectual-property services provider may receive an identifier of the product or service and then parse the framework using the identifier of the product or service to identify one or more intellectual-property assets that the framework indicates have a relationship with the product or service. Additionally, the intellectual-property services provider may receive a request including an identifier of an intellectual-property asset. In these cases, the intellectual-property services provider may parse the framework using the identifier and identify one or more products or services that the framework indicates have a relationship with the intellectual-property asset.

At 1408, the process 1400 includes receiving a first request to determine a value of the intellectual-property asset. In various implementations, the request may be provided via one or more tools offered by the intellectual-property services provider. In various implementations, the intellectual-property services provider may generate one or more user interfaces by which requests for services may be made by customers of the intellectual-property services provider and/or by representatives of the intellectual-property services provider.

At 1410, the process 1400 includes identifying, based at least partly on receiving the first request, economic data indicating revenue of an organization that is associated with the product. The economic data may indicate, for a given product, the amount of the organization's revenue that is attributable to the product.

At block 1412, the process 1400 includes determining a portion of the revenue attributable to the intellectual-property asset. In illustrative examples, the intellectual-property services provider may determine a breadth of the intellectual-property asset with respect to the breadth of additional intellectual-property assets, such as intellectual-property assets included in a same technology category as the intellectual-property asset. In these situations, the intellectual-property services provider may determine the portion of revenue of the product or service to attribute to the intellectual-property asset based at least partly on the breadth of the intellectual-property asset relative to the breadth of the additional intellectual-property assets. A higher relative breadth score of the intellectual-property asset with respect to the additional intellectual-property assets may cause the intellectual-property services provider to apportion a larger amount of the revenue of the product or service to the intellectual-property asset in relation to an amount of the revenue of the product or service attributed to the intellectual-property asset in situations where the relative breadth of the intellectual-property asset is lower.

At 1414, the process 1400 includes determining, based at least partly on the portion of the revenue, a measure of value of the intellectual-property asset. For example, the portion of the revenue attributable to the intellectual-property may be utilized as a factor to determine an overall value of the asset, in addition to, in examples, revenues of other products attributable to the asset and/or characteristics of the asset, such as breadth, coverage, and/or exposure factors.

At 1416, the process 1400 includes receiving a second request to determine at least one of: a first exposure value representing loss of coverage with respect to the intellectual-property asset; or a second exposure value representing a litigation event with respect to the intellectual-property asset.

At 1418, the process 1400 includes determining, based at least in part on receiving the second request, at least one of the first exposure value or the second exposure value. The exposure value associated with the intellectual-property asset may be based on a probability of a litigation event occurring with respect to the intellectual-property asset. In additional implementations, the exposure value associated with the intellectual-property asset may correspond to a probability that the scope of the intellectual-property asset may be reduced. In further implementations, the amount of exposure associated with the intellectual-property asset may correspond to a probability that the intellectual-property asset may be invalidated in whole or in part. In illustrative examples, the higher the amount of exposure related to the intellectual-property asset, the higher the discount applied to the portion of the revenue of the product or service attributed to the intellectual-property asset. In situations where the intellectual-property asset is a trade secret, the intellectual-property services provider may determine a discount to apply to the portion of the revenue of the product or service attributed to the intellectual-property asset based on probability of theft of the trade secret.

At 1420, the process 1400 includes causing display, via one or more user interfaces, of an indicator of the measure of value of the product and the at least one of the first exposure value or the second exposure value. For example, the measure of value of the intellectual-property asset may be determined using the revenue of the product or service received by one or more organizations via sales of the product or service over a period of time and the portion of revenue of the product or service attributed to the intellectual-property asset. In particular implementations, the measure of value may be updated. For example, as the intellectual-property services provider obtains updated revenue information for the product or service, the intellectual-property services provider may update the measure of value for the intellectual-property asset based on the updated revenue. Additionally, the intellectual-property services provider may obtain information that may be used to update the discount applied to the portion of the revenue of the product or service to attribute to the intellectual-property asset and the intellectual-property service system may corresponding update the measure of value based on the modified discount to apply. In certain implementation, the intellectual-property services provider may obtain feedback indicating an accuracy of the measure of value and modify the measure of value based on the feedback.

In various implementations, the measure of value for the intellectual-property asset may be based on a type of valuation for the intellectual-property asset. To illustrate, a first measure of value may be determined when the intellectual-property asset is being valued as part of a sale of the intellectual-property asset and a second measure of value may be determined when the intellectual-property asset is being valued as collateral for a loan. In other examples, a third measure of value may be determined when the intellectual-property asset is being valued as part of a sale of an organization or a merger of an organization that holds the legal rights to enforce the intellectual-property asset.

In particular implementations, additional services may be provided by the intellectual-property services provider. For example, the intellectual-property services provider may receive a request to identify a number of intellectual-property assets of an organization that are associated with a particular technology group. In other examples, the intellectual-property services provider may receive requests to determine one or more risks corresponding to the intellectual-property services provider. In additional examples, the intellectual-property services provider may receive a request to identify one or more organizations that have intellectual property in a particular technology group or in a particular classification of a system of classifications. In illustrative examples, the intellectual-property services provider may utilize a framework indicating relationships between intellectual-property assets and products or services to provide response to the requests. In various situations, the intellectual-property services provider may obtain identifiers of intellectual-property assets, identifiers of organizations, identifiers of products or services, identifiers of technology groups, or combinations thereof to utilize to parse the framework and provide responses to the requests for services. In particular illustrative scenarios, the various identifiers may include alphanumeric strings that include a series of characters. In additional implementations, the requests for services may include keywords that the intellectual-property services provider may utilize to parse the framework and generate the responses to the requests for services.

Furthermore, the foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A method comprising:
   determining, utilizing natural language understanding processing, first parts of speech for first words from first text data associated with a product, wherein the first text data is obtained from a first data source associated with a data processing system;
   determining, utilizing the natural language understanding processing, second parts of speech for second words from second text data corresponding to one or more claims in a portfolio of patent documents, wherein the second text data is generated from a second data source;
   determining a portion of the first words that correspond to a feature of the product;
   determining, based at least partly on the first parts of speech, a first action performed with respect to the feature;
   generating, based at least partly on the first action, first data representing a first linguistic structure for the feature, the first linguistic structure indicating one or more first relationships between second data representing the first action and third data representing one or more first nouns included in the first text data, the first linguistic structure including nodal links in a hierarchy;
   determining, based at least partly on the second parts of speech, a second action included in the one or more claims;
   generating, based at least partly on the second action, fourth data representing a second linguistic structure for the one or more claims, the second linguistic structure indicating one or more second relationships between fifth data representing the second action and sixth data representing one or more second nouns included in the one or more claims;
   determining a similarity metric between the first linguistic structure and the second linguistic structure, the similarity metric indicating a similarity of an arrangement of nodes as between the first linguistic structure and the second linguistic structure; and
   determining, based at least partly on the similarity metric, a portion of the portfolio of patent documents that corresponds to the product.

2. The method of claim 1, further comprising:
   determining a first amount of similarity between the first action and the second action; and
   wherein the similarity metric is determined at least partly based on the first amount of similarity.

3. The method of claim 1, further comprising:
   determining an amount of similarity between a first word of a second node of the second level and a second word of a fifth node associated with the second level; and
   wherein the similarity metric is determined at least partly based on the amount of similarity.

4. The method of claim 1, wherein the one or more claims include elements, the action corresponds to an element of the elements, and the method further comprises determining that the element corresponds to the feature based at least partly on the similarity metric.

5. The method of claim 1, further comprising:
   receiving input data corresponding to an amount of similarity between the portion of the portfolio and the product; and
   modifying, based at least partly on the amount of similarity, the similarity metric.

6. A system comprising:
   one or more processors; and
   one or more non-transitory computer-readable media storing instructions executable by the one or more processors, wherein the instructions, when executed by the one or more processors, cause the one or more processors to perform operations comprising:
      receiving first data representing one or more claims of a portfolio of patent documents, wherein the first data is obtained from a first data source;
      determining, utilizing automatic speech recognition techniques, words included in the one or more claims;
      determining, utilizing natural language understanding processing, parts of speech for the words;
      determining, based at least partly on the parts of speech, an action included in the one or more claims, the action associated with a verb, and the parts of speech including a noun that corresponds to the verb;
      generating second data representing a first linguistic structure for the claim, the first linguistic structure indicating one or more relationships between the verb and one or more additional words included in the one or more claims, the linguistic structure representing nodal links in a hierarchy;
      determining a similarity metric between the first linguistic structure and a second linguistic structure associated with a product, the similarity metric indicating a similarity of an arrangement of nodes as between the first linguistic structure and the second linguistic structure; and
      determining, based at least partly on the similarity metric, a portion of the portfolio of patent documents that corresponds to the product.

7. The system of claim 6, wherein the action comprises a first action, the verb comprises a first verb, the noun comprises a first noun, the one or more additional words comprise one or more first additional words, the one or more relationships comprise first one or more relationships, and the operations further comprise:
   determining, based at least partly on the parts of speech, a second action included in the claim, the second action associated with a second verb and a second noun included in the claim; and
   generating third data representing a third linguistic structure for the one or more claims, the third linguistic structure indicating one or more second relationships between the second verb and one or more second additional words included in the one or more claims.

8. The system of claim 7, wherein the information comprises first information, the action comprises a first action, and the operations further comprise:
   receiving fourth data representing at least one of the product or a service, the fourth data including a second action performed with respect to a feature of the at least one of the product or the service.

9. The system of claim 8, the operations further comprising:
- determining, based at least partly on the similarity metric being less than a threshold similarity metric, that the at least one of the product or the service is unassociated with the one or more claims;
- receiving input data indicating that the at least one of the product or the service corresponds with the one or more claims; and
- increasing a value of the similarity metric based at least partly on the input data.

10. The system of claim 8, the operations further comprising:
- determining, based at least partly on the similarity metric being at least a threshold similarity metric, that the at least one of the product or the service corresponds to the one or more claims;
- receiving input data indicating that the at least one of the product or the service is unassociated with the one or more claims; and
- decreasing a value of the similarity metric based at least partly on the input data.

11. The system of claim 8, the operations further comprising:
- determining a classification for the one or more claims; and
- determining that the at least one of the product or the service is associated with the classification; and
- determining, based at least in part on the at least one of the product or the service being associated with the classification, that the one or more claims are associated with the at least one of the product or the service.

12. The system of claim 11, wherein determining that the at least one of the product or service is associated with the classification is based at least in part on the comparison.

13. A method comprising:
- receiving first data associated with at least one of a product or a service, wherein the first data is received from a first data source associated with a data processing system;
- determining, utilizing automatic speech recognition techniques, words included in the information;
- determining, utilizing natural language understanding processing, parts of speech for the words;
- determining a portion of the words that correspond to a feature of the at least one of the product or the service;
- determining, based at least partly on the parts of speech, an action performed with respect to the feature;
- generating, based at least partly on the parts of speech, second data representing a first linguistic structure for the at least one of the product or the service, the linguistic structure indicating one or more relationships between the action and the words, the first linguistic structure representing nodal links in a hierarchy;
- determining a similarity metric between the first linguistic structure and a second linguistic structure associated with one or more claims in a portfolio of patent documents, the similarity metric indicating a similarity of an arrangement of nodes as between the first linguistic structure and the second linguistic structure; and
- determining, based at least partly on the similarity metric, a portion of the portfolio of patent documents that corresponds to the product.

14. The method of claim 13, wherein:
a first level of the nodal links includes a first node;
the first node corresponds to a verb of the words, the verb corresponding to the action; and
a second level of nodal links includes a second node, the second node indicating a noun that corresponds to the verb.

15. The method of claim 14, wherein:
the noun comprises a first noun;
the second level includes a third node that indicates a second noun that corresponds to the verb; and
a third level of the levels includes a fourth node that indicates a third noun that is associated with the first noun.

\* \* \* \* \*